(12) United States Patent
Motoyama et al.

(10) Patent No.: US 7,512,681 B2
(45) Date of Patent: Mar. 31, 2009

(54) DATABASE FOR MULTIPLE IMPLEMENTATION OF HTTP TO OBTAIN INFORMATION FROM DEVICES

(75) Inventors: Tetsuro Motoyama, Cupertino, CA (US); Avery Fong, Castro Valley, CA (US)

(73) Assignee: Ricoh Company Limited, Tokyo (JP)

( * ) Notice: Subject to any disclaimer, the term of this patent is extended or adjusted under 35 U.S.C. 154(b) by 584 days.

(21) Appl. No.: 11/234,319

(22) Filed: Sep. 26, 2005

(65) Prior Publication Data

US 2007/0073863 A1 Mar. 29, 2007

(51) Int. Cl.
G06F 15/173 (2006.01)
(52) U.S. Cl. .......... 709/224; 709/217; 709/223; 709/218; 370/466; 370/467; 370/468; 370/469
(58) Field of Classification Search ........... 709/223, 709/224, 217, 218
See application file for complete search history.

(56) References Cited

U.S. PATENT DOCUMENTS

| | | | |
|---|---|---|---|
| 6,317,848 B1 | 11/2001 | Sorens et al. | |
| 6,421,608 B1 | 7/2002 | Motoyama et al. | |
| 6,889,264 B2 | 5/2005 | Clough et al. | |
| 6,925,571 B1 | 8/2005 | Motoyama et al. | |
| 7,053,767 B2 | 5/2006 | Petite et al. | |
| 2002/0152028 A1 | 10/2002 | Motoyama et al. | |
| 2002/0152235 A1 | 10/2002 | Motoyama et al. | |
| 2002/0152292 A1 | 10/2002 | Motoyama et al. | |
| 2003/0055952 A1 | 3/2003 | Motoyama et al. | |
| 2003/0055953 A1 | 3/2003 | Motoyama et al. | |
| 2003/0167323 A1 | 9/2003 | Motoyama et al. | |
| 2003/0177227 A1 | 9/2003 | Motoyama et al. | |
| 2004/0088405 A1* | 5/2004 | Aggarwal ........... | 709/224 |
| 2004/0128315 A1 | 7/2004 | Motoyama et al. | |
| 2004/0128365 A1 | 7/2004 | Motoyama et al. | |
| 2004/0139183 A1 | 7/2004 | Motoyama et al. | |
| 2004/0254915 A1 | 12/2004 | Motoyama et al. | |
| 2004/0255014 A1 | 12/2004 | Motoyama et al. | |

(Continued)

OTHER PUBLICATIONS

U.S. Appl. No. 09/453,937, filed May 17, 2000, Motoyama et al.

(Continued)

Primary Examiner—Jude J Jean Gilles
(74) Attorney, Agent, or Firm—Oblon, Spivak, McClelland, Maier & Neustadt, P.C.

(57) ABSTRACT

A method, system, and computer program product for extracting status information related to a monitored device communicatively coupled to a network using an HTTP communication protocol. The method includes the steps of retrieving, from a first memory, vendor and model information of the monitored device; retrieving, based on the vendor and model information, at least one implementation identifier, each implementation identifier identifying a corresponding access function configured to access the monitored device using the HTTP protocol to obtain the status information, wherein the at least one implementation identifier identifies at least one of (1) a first access function configured to obtain the device information from between tags in a web page stored on the monitored device, and (2) a second access function configured to obtain the device information from within a script in the web page; and accessing the monitored device using the HTTP protocol, the parameter values, and the access function corresponding to the implementation identifier to attempt to obtain the status information.

10 Claims, 55 Drawing Sheets

U.S. PATENT DOCUMENTS

| | | |
|---|---|---|
| 2004/0255021 A1 | 12/2004 | Motoyama et al. |
| 2004/0255023 A1 | 12/2004 | Motoyama et al. |
| 2005/0071444 A1 | 3/2005 | Motoyama |
| 2005/0071483 A1 | 3/2005 | Motoyama |
| 2005/0165926 A1 | 7/2005 | Motoyama et al. |
| 2005/0165927 A1 | 7/2005 | Motoyama et al. |
| 2005/0177642 A1 | 8/2005 | Motoyama et al. |
| 2005/0246425 A1 | 11/2005 | Motoyama et al. |
| 2005/0246426 A1 | 11/2005 | Motoyama et al. |
| 2005/0251554 A1 | 11/2005 | Fong et al. |
| 2005/0251692 A1 | 11/2005 | Motoyama et al. |
| 2007/0056020 A1* | 3/2007 | Ward .............................. 726/3 |
| 2007/0073863 A1 | 3/2007 | Motoyama et al. |

OTHER PUBLICATIONS

U.S. Appl. No. 09/953,357, filed Sep. 17, 2001, Motoyama et al.
U.S. Appl. No. 09/921,707, filed Aug. 6, 2001, Motoyama.
U.S. Appl. No. 10/142,986, filed May 13, 2002, Motoyama et al.
U.S. Appl. No. 10/142,992, filed May 13, 2002, Motoyama et al.
U.S. Appl. No. 10/142,989, filed May 13, 2002, Motoyama et al.
U.S. Appl. No. 10/157,904, filed May 31, 2002, Motoyama et al.
U.S. Appl. No. 10/162,402, filed Jun. 5, 2002, Motoyama.
U.S. Appl. No. 10/225,290, filed Aug. 22, 2002, Motoyama.
U.S. Appl. No. 10/372,939, filed Feb. 26, 2003, Motoyama.
U.S. Appl. No. 10/764,582, filed Jan. 27, 2004, Motoyama et al.
U.S. Appl. No. 10/927,283, filed Aug. 27, 2004, Motoyama et al.
U.S. Appl. No. 10/927,158, filed Aug. 27, 2004, Motoyama et al.
U.S. Appl. No. 10/927,257, filed Aug. 27, 2004, Motoyama et al.
U.S. Appl. No. 11/032,039, filed Jan. 11, 2005, Motoyama et al.
U.S. Appl. No. 11/032,192, filed Jan. 11, 2005, Motoyama et al.
U.S. Appl. No. 11/032,016, filed Jan. 11, 2005, Motoyama et al.
U.S. Appl. No. 11/032,063, filed Jan. 11, 2005, Motoyama et al.
U.S. Appl. No. 11/032,088, filed Jan. 11, 2005, Motoyama et al.
U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.
U.S. Appl. No. 11/234,323, filed Sep. 26, 2005, Motoyama et al.
U.S. Appl. No. 11/182,889, filed Jul. 18, 2005, Motoyama et al.
U.S. Appl. No. 11/455,663, filed Jun. 20, 2006, Motoyama.
U.S. Appl. No. 11/517,363, filed Sep. 8, 2006, Motoyama, et al.
U.S. Appl. No. 11/517,430, filed Sep. 8, 2006, Motoyama, et al.
U.S. Appl. No. 11/517,362, filed Sep. 8, 2006, Motoyama, et al.
U.S. Appl. No. 11/517,378, filed Sep. 8, 2006, Motoyama, et al.
U.S. Appl. No. 11/517,428, filed Sep. 8, 2006, Motoyama, et al.
U.S. Appl. No. 11/681,831, filed Mar. 5, 2007, Fong, et al.
U.S. Appl. No. 11/833,671, filed Aug. 3, 2007, Motoyama, et al.
U.S. Appl. No. 11/867,741, filed Oct. 5, 2007, Motoyama, et al.
U.S. Appl. No. 11/940,785, filed Nov. 15, 2007, Motoyama, et al.
U.S. Appl. No. 12/062,146, filed Apr. 3, 2008, Motoyama, et al.

* cited by examiner

Vector of CAbsProtocol*
500

| CAbsProtocol* 502 | CAbsProtocol* 504 | CAbsProtocol* 506 | ... |
|---|---|---|---|

FIG. 22

Status Information Map
724

| 726 | 728 |
|---|---|
| infoType | pair<string, int> |
| infoType | pair<string, int> |
| infoType | pair<string, int> |
| . . . | . . . |

FIG. 28 m_ImplementationMap std::map<CAbsHTTPImplementation *, bool>

| CAbsHTTPImplementation * | bool |
|---|---|
| Pointer to CTagHTTPImplementation | true |
| Pointer to CScriptHTTPImplementation | false |
| . . | . . |

FIG. 34 m_VendorModelSupportMap std::map<std::string, std::vector<CAbsHTTPImplementation * > >

| std::string (Vendor+Model) | std::vector<CAbsHTTPImplementation *> |
|---|---|
| HPLaserJet 9000 | |
| HPColorLaserJet 4550N | |
| XEROXPhaser 7300 | |
| XEROXN4025 | |
| ⋮ | |

FIG. 35 m_VendorModelWebInfoMap
std::map<std::string, std::map<std::string, std::vector<SWebPageInfo> > >

| Vendor | Map of Key = Model, Value = Vector of SWebPageInfo ||
|---|---|---|
| | Model | Vector of SWebPageInfo |
| Ricoh | Aficio X | Vector of <br> struct SWebPageInfo { <br>   std::string m_sWebPage; <br>   std::vector<std::pair<SPreconKeyValueInfo, int> > <br>   m_KeyValueInfoVector; <br> }; |
| | | |
| | | |
| Xerox | | |

```
Struct SPreconKeyValueInfo{
    std::string m_sPrecondition
    infoType   m_infoType;
    std::string m_sKey;
    int        m_nPosition;
    std::string m_sType;
    std::string m_sDelimiter;
    int        m_nInLinePosition;
    void clear(void);
};
```

FIG. 39

```
<html>
<head><meta charset="utf-8">
<style>body {margin-top=20;margin-left=20;}</style>
</head>
<SCRIPT SRC="/java.js">
</SCRIPT>
<SCRIPT LANGUAGE="JavaScript">
<!--
var modelVer = 1795;
var TimeoutErr = "I/O Timeout Value Is Wrong.";
var TimeoutRangeErr = "I/O Timeout Value Is Out Of Range";
var TimeoutMin = 0;
var TimeoutMax = 300;

function RemainTonerOption()
{
    if((modelVer != 0x0701)&&(modelVer != 0x0702)&&(modelVer != 0x0703)&&(modelVer != 0x0711))
    {
        document.write('<tr><td width="10" height="35"></td><td width="263" height="35"><font size="2" face="Arial">Remain Toner :(0%)</font></td>');
        document.write('<td width="381" height="35" colspan="2"><table border="1" width="300" cellspacing="0" cellpadding="0"><tr><td width="300" height="17">');
        document.write('<table border="0"  height="100%" width="300" cellspacing="0" cellpadding="0"><tr>');
        document.write('<td width="15" bgcolor="#FFFFFF"></td><td width="15" bgcolor="#FFFFFF"></td>');

...

document.write('<td width="15" bgcolor="#FFFFFF"></td><td width="15" bgcolor="#FFFFFF"></td>');
        document.write('</tr></table></td></tr></table><table border="0" width="300" cellspacing="0" cellpadding="0">');
        document.write('<tr><td width="100"><font face="Arial" size="2">0%</font></td>');
        document.write('<td width="100" align="center"><font face="Arial" size="2">50%</font></td>');
        document.write('<td width="100" align="right"><font face="Arial" size="2">100%</font></td></tr></table></td></tr>');
    }
    else
    {
        var CyanTonerPer    =    100;
        var MagentaTonerPer=    100;
        var YellowTonerPer =    100;
        var BlackTonerPer   =    100;

BeforeTonerPerOption("Cyan");
        document.write('<font size="2" face="Arial">('+CyanTonerPer+'%)</font>');
        BeforeRemainTonerOption();
        DisplayReminedToner(CyanTonerPer,"#00FFFF");
        AfterRemainTonerOption();

...

}
}
// -->
</SCRIPT>
<body bgcolor="white">
<FORM METHOD="POST" ACTION="SetSetupMenu.cgi" onSubmit="return ValidateInput()">
<table border="0" width="496" cellspacing="0" cellpadding="0" height="190">

...

<script language="JavaScript">OPC_CR_TIMEOUT_FUSERCLEAIN_Option();</script>
    <tr>
      <td height="35" colspan="4" width="490">
        <hr color="#5f9ea0" noShade SIZE="1">
      </td>
    </tr>
    <script language="JavaScript">RemainTonerOption();</script>
    <script language="JavaScript">CountResetAlarmShortOption();</script>

...
</table>
</FORM>
</body>
</html>
```

FIG. 41

```html
<html dir="ltr">
<head>
<meta http-equiv="Pragma" content="no-cache">
<meta http-equiv="Cache-Control" content="no-cache">
<meta http-equiv="Expires" content="0">
<meta http-equiv="Content-Type" content="text/html; charset=iso-8859-1">
<meta http-equiv="Content-Style-Type" content="text/css">
<meta http-equiv="Content-Script-Type" content="text/javascript">
<title></title>

...

<body bgcolor="#ffffff" marginheight=0 marginwidth=0 topmargin=0 leftmargin=0>

<script language="JavaScript" type="text/javascript">
var PtrVal = Array()
PtrVal[0] = "FS-3830N";
PtrVal[1] = "1";
var KMOEM = 0;
HeaderStatus(PtrVal, KMOEM );
var NavSet = "Start";
GlobalNavAll(NavSet);
</script>

...

<table cellpadding=4 cellspacing=0 border=0 width="100%" bgcolor="#eeeeee" height=52>

<script language="JavaScript" type="text/javascript">
var TColor = Array();var TLevel = Array();
TColor[0] = "Black"; TLevel[0] = 100;
TonerLevel(TColor, TLevel);
</script>

...

<script language="JavaScript" type="text/javascript">
AddLineOne();
AddTableTitle(PrinterGen[21]);
AddLineOne();
StartTable();
AddLineTwo();
var sData = Array();
sData[0] = "172.30.4.60";
sData[1] = "KyceraFS3830";
sData[2] = "0, 2:40:9";
sData[3] = "00:C0:EE:58:8B:5C";
sData[4] = "158.03";
sData[5] = "EB21KA002";
sData[6] = "ABU4502933";
sData[7] = "";
sData[8] = "6";
RO2ColRow(TCPIP[1],sData[0]);
RO2ColRow(TCPIP[0],sData[1]);
RO2ColRow(PrinterGen[22],sData[2]);
RO2ColRow(PrinterGen[71],sData[3]);
RO2ColRow(PrinterGen[4],sData[4]);
RO2ColRow(PrinterGen[5],sData[5]);
RO2ColRow(PrinterGen[2],sData[6]);
RO2ColRow(PrinterGen[3],sData[7]);
RO2ColRow(Counters[2], sData[8]);
document.write('</table>');
document.write('<br>');
AddTableTitle(Media[0]);
var CassName = Array();
CassName[0] = "Multi Purpose Tray";
CassName[1] = "Cassette 1";

...

</div>
</body>
</html>
```

FIG. 43 m_VendorModelInfoMap
std::map<std::string, std::vector<SModelInfo> >

| Vendor | Vector of SModelInfo |
|---|---|
| KYOCERA | Vector < <br> {std::string    m_sVendor; <br> std::string    m_sWebPage; <br> CAbsScriptProcess *    m_pScriptProcess}> |
|  |  |

FIG. 45 m_UniqueIDInfoMap
std::map<std::string, SUniqueIDInfo>

| Vendor + Model | SUniqueIDInfo |
|---|---|
| KYOCERAFS3830 | {std::string         m_sVendor;<br>std::string         m_sModel;<br>std::string         m_sWebPage;<br>CAbsScriptProcess *  m_pScriptProcess;} |
|  |  |

FIG. 46 m_StatusMap
std::map<std::string, std::vector<SWebPageStatus> >

| Vendor + Model | Vector of SWebPageStatus |
|---|---|
| KYOCERAFS3830 | std::vector<<br>{<br>   std::string                    m_sWebPage;<br>   std::map<infoType, int>  m_InfoTypeMap;<br>   CAbsScriptProcess *     m_pScriptProcess<br>}<br>> |
|  |  |

FIG. 47

XXX corresponds to the names of the following tables of the support database:
HTTPSupportedVendorModelDelay,
ScriptVendorModel,
ScriptUniqueIDWebPage,
ScriptVendorModelWebPage,
ScriptStatus YYY correspond to the following names:
SamsungPrinterDetail,
SamsungStatusCLP550,
SamsungStatusML2550,
KyoceraModel,
KyoceraUniqueID,
KyoceraFS3830

**Vector of SInfoStructure to obtain color toner levels for the Samsung CLP 550 printer –
CSamsungStatusCLP550ScriptProcess**

```
m_nENUM - 700
m_sDelimiter – "=;"
m_nInLinePosition – 1
m_sPar1 = "RemainTonerOption"
m_sPar2 = "else"
m_sPar3 = "BlackTonerPer"
m_State - eStart
```

```
m_nENUM - 701
m_sDelimiter – "=;"
m_nInLinePosition – 1
m_sPar1 = "RemainTonerOption"
m_sPar2 = "else"
m_sPar3 = "MagentaTonerPer"
m_State - eStart
```

```
m_nENUM - 702
m_sDelimiter – "=;"
m_nInLinePosition – 1
m_sPar1 = "RemainTonerOption"
m_sPar2 = "else"
m_sPar3 = "CyanTonerPer"
m_State - eStart
```

```
m_nENUM - 703
m_sDelimiter – "=;"
m_nInLinePosition – 1
m_sPar1 = "RemainTonerOption"
m_sPar2 = "else"
m_sPar3 = "YellowTonerPer"
m_State - eStart
```

**SInfoStructure to obtain black toner level for
the Samsung ML 2550 printer –
CSamsungStatusML2550ScriptProcess**

```
m_nENUM - 700
m_sDelimiter – ":(%"
m_nInLinePosition – 1
m_sPar1 = "RemainTonerOption"
m_sPar2 = "Remain Toner"
m_State - eStart
```

FIG. 52

```
<html>
<head><meta charset="utf-8">
<style>body {margin-top=20;margin-left=20;}</style>
</head>
<SCRIPT SRC="/java.js">
</SCRIPT>
<SCRIPT LANGUAGE="JavaScript">
<!--
var modelVer = 1795;
var TimeoutErr = "I/O Timeout Value Is Wrong.";
var TimeoutRangeErr = "I/O Timeout Value Is Out Of Range";
var TimeoutMin = 0;
var TimeoutMax = 300;

function RemainTonerOption()                    <<<--- m_sPar1 found and
                                                      state changes to ePrecon1
{
    if((modelVer != 0x0701)&&(modelVer != 0x0702)&&(modelVer != 0x0703)&&(modelVer != 0x0711))
    {
        document.write('<tr><td width="10" height="35"></td><td width="263" height="35"><font size="2"
face="Arial">Remain Toner :(0%)</font></td>');
        document.write('<td width="381" height="35" colspan="2"><table border="1" width="300" cellspacing="0"
cellpadding="0"><tr><td width="300" height="17">');
        document.write('<table border="0" height="100%" width="300" cellspacing="0" cellpadding="0"><tr>');
        document.write('<td width="15" bgcolor="#FFFFFF"></td><td width="15" bgcolor="#FFFFFF"></td>');

...

document.write('<td width="15" bgcolor="#FFFFFF"></td><td width="15" bgcolor="#FFFFFF"></td>');
        document.write('</tr></table></td></tr></table><table border="0" width="300" cellspacing="0"
cellpadding="0">');
        document.write('<tr><td width="100"><font face="Arial" size="2">0%</font></td>');
        document.write('<td width="100" align="center"><font face="Arial" size="2">50%</font></td>');
        document.write('<td width="100" align="right"><font face="Arial" size="2">100%</font></td></tr></
table></td></tr>');
    }
    else                                        <<<--- m_sPar2 found and
                                                      state changes to ePrecon2
    {
        var CyanTonerPer       =       100;     <<<--- m_sPar3 found and
                                                      status information extracted
        var MagentaTonerPer=   100;
        var YellowTonerPer =   100;
        var BlackTonerPer      =       100;

BeforeTonerPerOption("Cyan");
        document.write('<font size="2" face="Arial">('+CyanTonerPer+'%)</font>');
        BeforeRemainTonerOption();
        DisplayRemindedToner(CyanTonerPer,"#00FFFF");
        AfterRemainTonerOption();
    ...
``` struct SInfoStructure
m_sDelimiter = "="
m_nInLinePosition = 1
m_sPar1 = "RemainTonerOption"
m_sPar2 = "else"
m_sPar3 = "CyanTonerPer"

FIG. 53

```
SInfoStructure {
    std::string m_sPar1;
    std::string m_sPar2;
    std::string m_sPar3;
    std::string m_sPar4;
    std::string m_sPar5
    std::string m_sDelimiter;
    int         m_nInlinePosition;
    infoType    m_nENUM;
    EState      m_State;
    SInfoStructure();
    ~SInfoStructure();
    void init();
}
```

FIG. 55A

```
SInfoStructure {
    m_sPar1  = RemainTonerOption
    m_sPar2  = else
    m_sPar3  = CyanTonerPer
    m_sPar4  =
    m_sPar5  =
    m_sDelimiter = "=;"
    m_nInlinePosition = 1
    m_nENUM = eCyan
    m_State     = eStart
    SInfoStructure();
    ~SInfoStructure();
    void init();
}
```

FIG. 55B

DATABASE FOR MULTIPLE IMPLEMENTATION OF HTTP TO OBTAIN INFORMATION FROM DEVICES

CROSS-REFERENCE TO RELATED APPLICATIONS

This application is related to the following commonly owned co-pending U.S. patent applications:

1. Ser. No. 09/453,937 entitled "Method and System of Remote Diagnostic, Control, and Information Collection using a Dynamic Linked Library of Multiple Formats and Multiple Protocols with Intelligent Formatter," filed May 17, 2000;

2. Ser. No. 09/756,120 entitled "Method and System of Remote Support of Device Using Email," filed Jan. 9, 2001;

3. Ser. No. 09/782,064 entitled "Method and System of Remote Diagnostic, Control, and Information Collection using a Dynamic Linked Library of Multiple Formats and Multiple Protocols with Three-Level Formatting," filed Feb. 14, 2001;

4. Ser. No. 09/921,707 entitled "Universal Controller in The Wireless Networked Environment," filed Aug. 6, 2001;

5. Ser. No. 09/953,358 entitled "Method and System of Remote Support of Device Using Email Through Data Transfer Module," filed Sep. 17, 2001;

6. Ser. No. 09/953,359 entitled "Method and System for Remote Support of Device using Email for Sending Information Related to a Monitored Device," filed Sep. 17, 2001;

7. Ser. No. 09/975,935 entitled "Method and System for Remote Support of Device Using Email Based Upon Pop3 With Decryption Capability Through Virtual Function," filed Oct. 15, 2001;

8. Ser. No. 10/068,861 entitled "Method and Apparatus Utilizing Communication Means Hierarchy to Configure or Monitor an Interface Device," filed Feb. 11, 2002;

9. Ser. No. 10/142,989 entitled "Verification Scheme for Email Message Containing Information About Remotely Monitored Devices," filed May 13, 2002;

10. Ser. No. 10/142,992 entitled "Method for Scrambling Information about Network Devices That is Placed in Email Message," filed May 13, 2002;

11. Ser. No. 10/157,903 entitled "Method and Apparatus for Modifying Remote Devices Monitored by a Monitoring System," filed May 31, 2002;

12. Ser. No. 10/162,402 entitled "Method and System to Use HTTP and Html/Xml for Monitoring the Devices," filed Jun. 5, 2002;

13. Ser. No. 10/167,497 entitled "Method and System of Remote Position Reporting Device," filed Jun. 13, 2002, which is a continuation of Ser. No. 09/575,702 (U.S. Pat. No. 6,421,608);

14. Ser. No. 10/225,290 entitled "Method and System for Monitoring Network Connected Devices with Multiple Protocols," filed Aug. 22, 2002;

15. Ser. No. 10/328,003 entitled "Method of Accessing Information from Database to be used to Obtain Status Information from the Web Pages of Remotely Monitored Devices," filed Dec. 26, 2002;

16. Ser. No. 10/328,008 entitled "Method of using Internal Structure to Store Database Information for Multiple Vendor and Model Support for Remotely Monitored Devices," filed Dec. 26, 2002;

17. Ser. No. 10/328,026 entitled "Method of using Vectors of Structures for Extracting Information from the Web Pages of Remotely Monitored Devices," filed Dec. 26, 2002;

18. Ser. No. 10/372,939 entitled "Method and System for Monitoring Network Connected Devices with Multiple Protocols," filed Feb. 26, 2003;

19. Ser. No. 10/460,150 entitled "Method for Efficiently Storing Information used to Extract Status Information from a Device Coupled to a Network in a Multi-Protocol Remote Monitoring System," filed Jun. 13, 2003;

20. Ser. No. 10/460,151 entitled "Method for Efficiently Extracting Status Information Related to a Device Coupled to a Network in a Multi-Protocol Remote Monitoring System," filed Jun. 13, 2003;

21. Ser. No. 10/460,404 entitled "Method for Parsing an Information String to Extract Requested Information Related to a Device Coupled to a Network in a Multi-Protocol Remote Monitoring System," filed Jun. 13, 2003;

22. Ser. No. 10/460,408 entitled "Method and System for Extracting Vendor and Model Information in a Multi-Protocol Remote Monitoring System," filed Jun. 13, 2003;

23. Ser. No. 10/670,505 entitled "Method and System for Extracting Information from Networked Devices in a Multi-Protocol Remote Monitoring System," filed Sep. 26, 2003;

24. Ser. No. 10/670,604 entitled "Method and System for Supporting Multiple Protocols Used to Monitor Networked Devices in a Remote Monitoring System," filed Sep. 26, 2003;

25. Ser. No. 10/764,467 entitled "Method and System for Determining the Type of Status Information to Extract from Networked Devices in a Multi-Protocol Remote Monitoring System," filed Jan. 27, 2004;

26. Ser. No. 10/764,527 entitled "Method and System for Managing Protocols Used to Obtain Status Information from a Network Device," filed Jan. 27, 2004;

27. Ser. No. 10/764,569 entitled "Method and System for Managing Vendor and Model Information in a Multi-Protocol Remote Monitoring System," filed Jan. 27, 2004;

28. Ser. No. 10/764,582 entitled "Method and System for Initializing Protocol Information Used to Extract Status Information from Networked Devices," filed Jan. 27, 2004;

29. Ser. No. 10/927,158, filed Aug. 27, 2004;

30. Ser. No. 10/927,257, filed Aug. 27, 2004;

31. Ser. No. 10/927,283, filed Aug. 27, 2004;

32. Ser. No. 10/032,039, filed Jan. 11, 2005;

33. Ser. No. 10/032,016, filed Jan. 11, 2005;

34. Ser. No. 10/032,063, filed Jan. 11, 2005;

35. Ser. No. 10/032,008, filed Jan. 11, 2005;

36. Ser. No. 10/032,192, filed Jan. 11, 2005;

37. Application Ser. No. 11/234,322, entitled "Method and System for Use of Abstract Classes for Script Implementation of HTTP to Obtain Information from Devices," filed concurrently with the present application;

38. Application Ser. No. 11/234,224, entitled "Method and System for Script Implementation of HTTP to Obtain Information from Remote Devices," filed concurrently with the present application; and 39. Application Ser. No. 11/234,323, entitled "Method and System for Script Processing in Script Implementation of HTTP to Obtain Information from Devices," filed concurrently with the present application.

The disclosures of each of the above U.S. patents and patent applications are incorporated herein by reference in their entirety.

The present invention includes the use of various technologies referenced and described in the references identified in the following LIST OF REFERENCES by the author(s) and year of publication of the reference:

LIST OF REFERENCES

[1] Goldfart, C., *The SGML Handbook*. Clarendon Press (1990);

[2] Castro, E., *HTML for the World Wide Web*, Peachpit Press, Berkeley (1996); and

[3] Megginson, D., *Structuring XML Documents*, Prentice Hall, N.J. (1998).

The entire contents of each reference listed in the LIST OF REFERENCES are incorporated herein by reference.

BACKGROUND OF THE INVENTION

1. Field of the Invention

This invention relates to the monitoring of devices connected to a network. More particularly, it relates to a method, system, and computer program product for the remote monitoring of network-connected devices using multiple protocols.

2. Discussion of the Background

As is generally known, computer systems include hardware and software. Software includes a list of instructions that are created to operate and manage hardware components that make up a computer system. Typically, computer systems include a variety of hardware components/devices that interface with one another. The computer system can be a stand-alone type or a networked type. In a networked-type computer system, a plurality of distinct devices are connected to a network and thus communication between these distinct devices is enabled via the network.

Further, software for operating the hardware devices must be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is controlling, configuring, or monitoring the plurality of distinct devices or hardware devices would be referred to as a monitoring device and the hardware devices that are being controlled, configured, or monitored by the monitoring device would be referred to as "monitored devices."

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for the monitoring and management of devices on data communication networks, telecommunication systems and other globally reachable devices. Practically every organization dealing with computers and related devices expects to be able to centrally monitor, diagnose, and configure each such device across local- and wide-area networks. SNMP is the protocol that enables this interaction.

In order for a device to respond to SNMP requests, it is desirable to equip the device with the software that enables it to properly interpret an SNMP request, perform the actions required by that request, and produce an SNMP reply. The SNMP agent software is typically a subsystem software module residing in a network entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.1D bridges, to name a few.

Using SNMP for monitoring devices is difficult as private MIB's include values that are hard to decipher without a valid key. A company using SNMP for monitoring various devices connected to its network creates a unique identifier/key that is maintained as proprietary information of the company. For the most part, the results are displayed as binary or integer values. Thus, using SNMP, results received from the devices that are being monitored ("monitored devices") fail to provide a user with the status of the monitored devices in a user comprehensible manner.

Further, using SNMP, it is difficult for one to obtain detailed information about a monitored device without a valid key or access to a private MIB to decipher the results obtained as binary or integer values. In addition, a given protocol (e.g., SNMP or HTTP/HTML) may fail for various reasons, such as time out or lost packets. Also, some information extracted from a given device using the multiple protocols may be duplicated for each protocol. Accordingly, if the extraction of data from the device is not properly managed in such situations, time and memory inefficiencies result since some protocols require more resources than other protocols. In addition, information extraction using some protocols may require much less processing and memory than using others. Furthermore, some information obtained through one protocol may be more useful for the monitoring device than the one obtained through another protocol.

SUMMARY OF THE INVENTION

The system and method of the present invention addresses solutions to the above-identified problems by enabling monitoring of devices that are connected to a network. Accordingly, a method of monitoring a device among distinct devices communicatively coupled to a network is described.

The method includes accessing a first database via a hardware access module, the first database being configured to support a plurality of communication protocols. The first database is stored with information used by the plurality of communication protocols in order to obtain various information, such as manufacturer and model information of a monitored device. A communication protocol is selected from among a plurality of communication protocols, and the selected communication protocol is configured to receive status information from the monitored device. The method further includes accessing the monitored device using the selected communication protocol and information from the first database, receiving status information from the accessed device, and storing the received status information in a second database (DeviceODBC).

In another embodiment, the present invention provides a method of monitoring a device among distinct devices communicatively coupled to a network. A plurality of communication protocols may be used to retrieve information from a monitored device. For example, an SNMP protocol is first selected to access a monitored device, and device information that is configured to be efficiently retrieved using the SNMP protocol is obtained. Subsequently, HTTP and FTP protocols are selected to obtain information that was incapable of efficient retrieval using the SNMP protocol if the device supports the additional protocols. The selection of protocols is performed by a protocol manager in conjunction with support information stored in a database.

In the present invention, a monitoring system enables the monitoring of at least one device (monitored device) connected to a network, such as, for example, a LAN or a WAN. The monitored device is configured to have a unique IP address. The IP address allocated to the monitored device, and the details of the vendor/manufacturer for the monitored device, are stored in a database. By scanning the network and interrogating the devices the IP addresses of the devices can be obtained. Such methods are known. Therefore, it is assumed that IP addresses of the devices to be monitored are already acquired and stored in a database.

The present invention specifies how to extract necessary information from the HTML information received from a monitored device. Once a web page location of the monitored device is accessed (i.e., through the IP address and the specified port), a specific web page corresponding to the monitored device is displayed. Information in the web page is in the form of key and value pairs. For example, the toner level may be shown as "Black 100%" in the color printer web page. An HTML/XML parser is used to parse the page in order to retrieve required information from the information in the web page. The required information and parameter values extracted from the web page using the HTML/XML parser are stored in the support database.

The present invention also identifies various vendors of monitored devices and the device models that are supported by the monitoring system as described herein. Since various vendors of the monitored devices present information about a monitored device in a vendor-specific manner, the present invention enables the identification of the vendor and model of the monitored device to determine the operational status of the monitored device.

According to one aspect of the present invention, there is provided a method, system, and computer program product for extracting information related to a monitored device communicatively coupled to a network using an HTTP communication protocol, comprising: retrieving, from a first memory, vendor and model information of the monitored device; determining, based on the vendor and model information, at least one access function configured to access the monitored device using the HTTP protocol to obtain device information of the monitored device, wherein the at least one access function includes at least one of (1) a first access function configured to obtain the device information from between tags in a web page stored on the monitored device, and (2) a second access function configured to obtain the device information from within a script in the web page; accessing the monitored device using the HTTP protocol and each access function of the at least one access function to attempt to obtain the device information; and storing, in a second memory, the device information obtained in the accessing step, in association with the vendor and model information.

According to another aspect of the present invention, there is provided a method, system, and computer program product for extracting status information from within a script of a web page stored on a monitored device using an abstract class interface, the abstract class interface including a first function configured to obtain support information used to extract the status information and a second function configured to extract the status information from within the script of the web page using the support information, the method comprising: (1) retrieving, from a first memory, vendor and model information of the monitored device; (2) determining, based on the vendor and model information, at least one type of status information to obtain from the monitored device; (3) obtaining, based on the web page and the vendor and model information, the support information using the first function of the abstract class interface; (4) accessing the monitored device using the HTTP protocol, the obtained support information, and the second function of the abstract class interface to obtain the at least one type of status information from within the script of the web page; and (5) storing, in a second memory, the status information obtained in the accessing step in association with the vendor and model information.

According to another aspect of the present invention, there is provided a method, system, and computer program product for extracting status information related to a monitored device communicatively coupled to a network using an HTTP communication protocol, comprising: retrieving, from a first memory, vendor and model information of the monitored device; retrieving, based on the vendor and model information, at least one implementation identifier, each implementation identifier identifying a corresponding access function configured to access the monitored device using the HTTP protocol to obtain the status information, wherein the at least one implementation identifier identifies at least one of (1) a first access function configured to obtain the device information from between tags in a web page stored on the monitored device, and (2) a second access function configured to obtain the device information from within a script in the web page; selecting an implementation identifier of the at least one implementation identifier; retrieving, from the first memory based on the vendor and model information and the selected implementation identifier, parameter values used to obtain the status information from the web page using the access function corresponding to the implementation identifier; accessing the monitored device using the HTTP protocol, the parameter values, and the access function corresponding to the implementation identifier to attempt to obtain the status information; and storing, in a second memory, the status information obtained in the accessing step, in association with the vendor and model information.

According to another aspect of the present invention, there is provided a method, system, and computer program product for extracting status information from within a script of a web page stored on a monitored device communicatively coupled to a network using an HTTP communication protocol, comprising: (1) obtaining, based on vendor and model information, an identification of the web page and at least one parameter string used to extract the status information from within the script of the web page; (2) accessing the web page using the identification of the web page and the HTTP protocol to obtain a line of the web page within the script; (3) parsing the obtained line of the web page to determine if a parameter string of the at least one parameter string is located within the obtained line; (4) if the parsing step determines that the parameter string is not located within the obtained line, repeating the accessing and parsing steps until the parameter string is located; (5) if the parsing step determines that the parameter string is located within the obtained line, determining whether all parameter strings in the at least one parameter string have been located; (6) if the determining step determines that all parameter strings in the at least one parameter string have not been located, repeating the accessing, parsing, repeating, and determining steps until all parameter strings in the at least one parameter string have been located; and (7) if the determining step determines that all parameter strings have been located within the script, extracting the status information from the web page based on the location of a last located parameter string.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 22 illustrates a data structure used in the HWaccess module of FIG. 21 to maintain information necessary to access the monitored devices and to obtain status information from the monitored devices according to one embodiment of the present invention;

FIG. 28 illustrates the data structures used to store and maintain the status information of a monitored device of a specific vendor and model for each protocol according to one embodiment of the present invention;

FIG. 34 illustrates the data structure m_ImplementationMap of the CHTTPProtocol class;

FIG. 35 illustrates the data structure m_VendorModelSupportMap of the CHTTPProtocol class;

FIG. 39 illustrates the map structure m_VendorModelWebInfoMap of the CScriptHTTPImplementation class;

FIG. 41 shows part of the HTML tags and java scripts which generate the display of the web page of FIG. 40;

FIG. 43 shows part of the HTML tags and java scripts that generate the display of the web page of FIG. 42;

FIGS. 45-47 are data structures of the CScriptHTTPImplementation class used for obtaining the model name, unique ID, and status information from the web page of a device.

FIG. 52 shows sample data structures used by two derived classes of CAbsScriptProcess;

FIG. 53 shows how a derived class of CAbsScriptProcess processes the web page of a device containing java script;

FIG. 55A shows the members of the structure SInfoStructure used to extract information from the web page; and FIG. 55B shows the sample values of the member of the structure SInfoStructure of FIG. 55A.

DETAILED DESCRIPTION OF THE PREFERRED EMBODIMENTS

Figure 1:
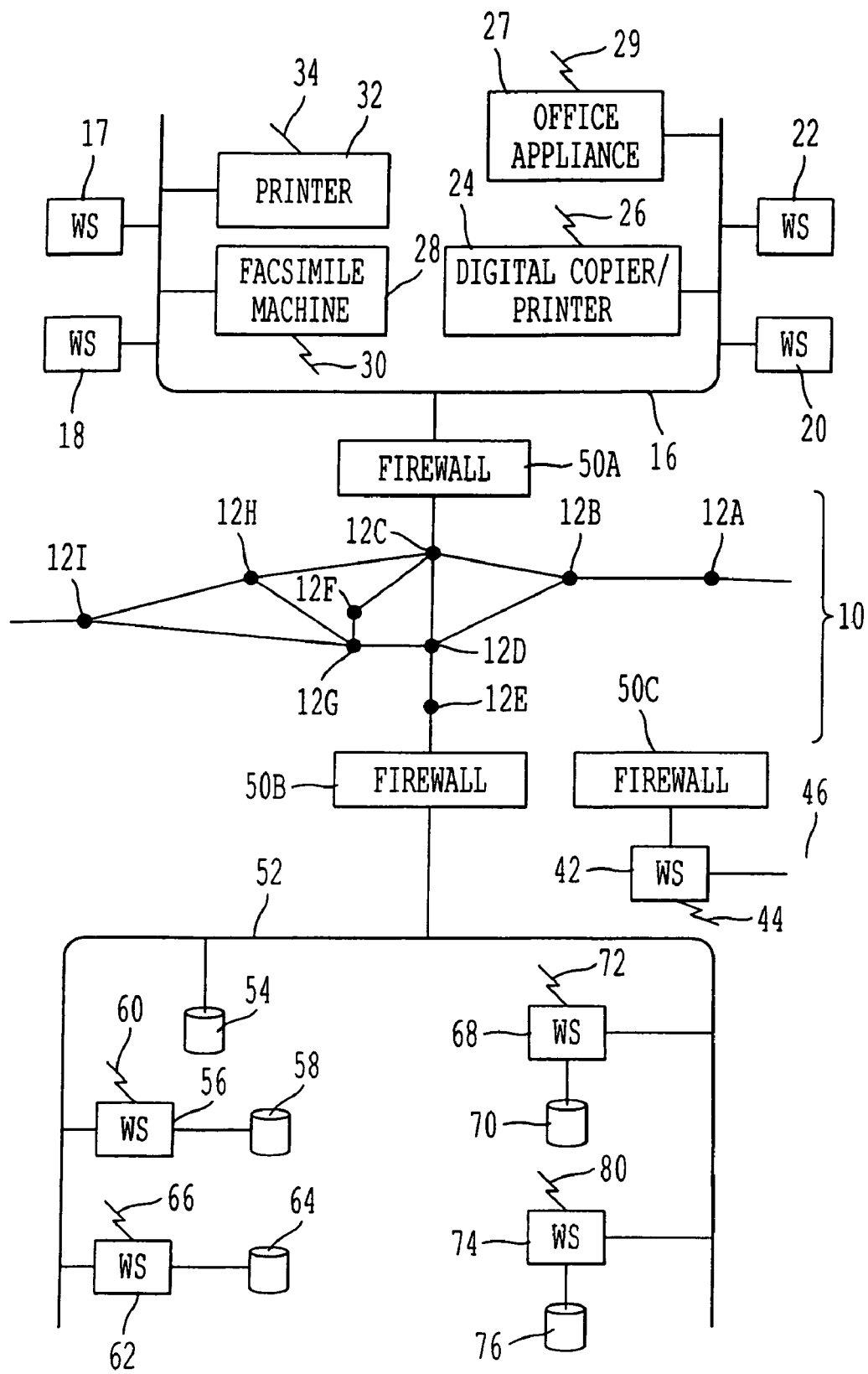
FIG. 1 illustrates networked business office devices connected to a network of computers and databases through the Internet.

FIG. 1 illustrates a schematic having various devices and computers for monitoring, diagnosing, and controlling the operation of the devices. Specifically, FIG. 1 includes a first network 16, such as a Local Area Network (LAN) connected to computer workstations 17, 18, 20, and 22. The workstations can be any type of computers including, e.g., Personal Computer devices, Unix-based computers, Linux-based computers, or Apple Macintoshes. Also connected to the network 16 are a digital image-forming apparatus 24, a facsimile machine 28, and a printer 32. As would be appreciated by one of ordinary skill in the art, two or more of the components of the digital copier/printer 24 and the facsimile machine 28 can be combined into a unified "image forming apparatus." For example, the copier/printer 24, facsimile machine 28, the printer 32, and the workstations 17, 18, 20, and 22 may be referred to as machines or monitored devices. In some configurations, one or more workstations may be converted to business office appliances. In addition, any network business office appliance/device can be attached to the network 16. Also, any workstation 17, 18, 20, and 22, and office appliance 27 can function as an intermediate monitoring device to poll the monitored devices on the network 16 and to send the collected data to the monitoring device.

One example of such a business office appliance is eCabinet® from Ricoh Corporation. Also, a facsimile server (not illustrated) may be connected to the network 16 and have a telephone, cable, or wireless connection. Each of the digital copier/printer 24, facsimile machine 28, and printer 32, in addition to being connected to the network 16, may also include conventional telephone and/or cable and/or wireless connections 26, 30, and 34, respectively. As explained below, the monitored devices 24, 28, and 32, communicate with a remote monitoring, diagnosis, and control station, also referred to as a monitoring device, through, for example, the Internet via the network 16 or by a direct telephone, wireless, or cable connection.

In another exemplary business environment, monitored devices may include such devices as a multi-function imaging device, a scanner, a projector, a conferencing system, and a shredder. In another application, the network 16 may be a home network where monitored devices are meters (electricity, gas, water) or appliances such as, for example, microwave oven, washer, dryer, dishwasher, home entertainment system, refrigerator, rice cooker, heater, air condition, water heater, security camera.

In FIG. 1, a wide area network (WAN) (e.g., the Internet or its successor) is generally designated by 10. The WAN 10 can be either a private WAN, a public WAN, or a hybrid type. The WAN 10 includes a plurality of interconnected computers and routers designated by 12A-12I. The manner of communicating over a WAN is known through a series of Request for Comments (RFC) documents available from the Internet Engineering Task Force (IETF) at www.ietf.org/rfc.html, including RFC 821, entitled "Simple Mail Transfer Protocol"; RFC 822, entitled "Standard for the Format of ARPA Internet Text Message"; RFC 959, entitled "File Transfer Protocol (FTP)"; RFC 2045, entitled "Multipurpose Internet Mail Extensions (MIME) Part One: Format of Internet Message Bodies"; RFC 1894, entitled "An Extensible Message Format for Delivery Status Notifications"; RFC 1939, entitled "Post Office protocol—Version 3"; RFC 2068, "Hypertext Transfer Protocol—HTTP/1.1"; and RFC 2298, entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W.R. Stevens, from Addison-Wesley Publishing Company, 1994, the entire contents of which is incorporated herein by reference. Volumes 1-3 of "Internetworking with TCP/IP" by Corner and Stevens are also incorporated herein by reference in their entirety.

Continuing to refer to FIG. 1, a firewall 50A is connected between the WAN 10 and the network 16. A firewall is a device that allows only authorized computers on one side of the firewall to access a network, computers, or individual parts on the other side of the firewall. Firewalls are known and commercially available devices and/or software (e.g., ZoneAlarm from Zone Labs). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, AddisonWesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68, and 74. These workstations may be located in a distributed fashion within different departments (e.g., sales, order processing, accounting, billing, marketing, manufacturing, design engineering, and customer service departments) within a single company. In addition to the workstations connected via the network 52, a workstation 42 that is not directly connected to the network 52 is also provided. Information in a database stored in a disk 46 connected to the workstation 42 may be shared using proper encryption and protocols over the WAN 10 to the workstations connected directly to the network 52. Also, the workstation 42 includes a direct connection to a telephone line and/or a cable network and/or a wireless network 44, and the database in disk 46 may be accessed through the telephone line, the cable network, or via the wireless network 44. The cable network used by this invention may be implemented using a cable network that is typically used to carry television programming, a cable that provides for high-speed communication of digital data typically used with computers or the like, or any other desired type of cable.

In another embodiment, the workstation 42 can be a laptop computer, a PDA, a palm top computer, or a cellular phone with network capability. These devices may be used to access information stored in the database stored in the disk 46.

Information related to digital copier/printer 24, office appliance 27, facsimile machine 28, or printer 32, respectively, may be stored in one or more of the databases stored in the disks 46, 54, 58, 64, 70, and 76. Known databases include (1) SQL databases by Microsoft, IBM, Oracle, and Sybase; (2) other relational databases; and (3) non-relational databases (including object-oriented databases from Objectivity, JYD Software Engineering, and Orient Technologies). Each of the sales, order processing, accounting, billing, customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. For example, disk 64 may be stored with a marketing database, disk 58 may be stored with a manufacturing database, disk 70 may be stored with an engineering database, and disk 76 may be stored with a customer service database. Alternatively, the disks 54 and 46 may be stored with one or more of the databases.

In addition to the workstations 56, 62, 68, 74, and 42 being connected to the WAN 10, these workstations may also include a connection to a telephone line, cable, or wireless networks for providing a secure connection to a machine/device being monitored, diagnosed, and/or controlled. Additionally, if one of the communication media is not operating properly, one of the others may be automatically used, as a backup, for communication.

A feature of the present invention is the use of a "store-and-forward" mode of communication (e.g., Internet electronic mail, also referred to herein as e-mail) or transmission between a machine and a computer/monitoring system for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
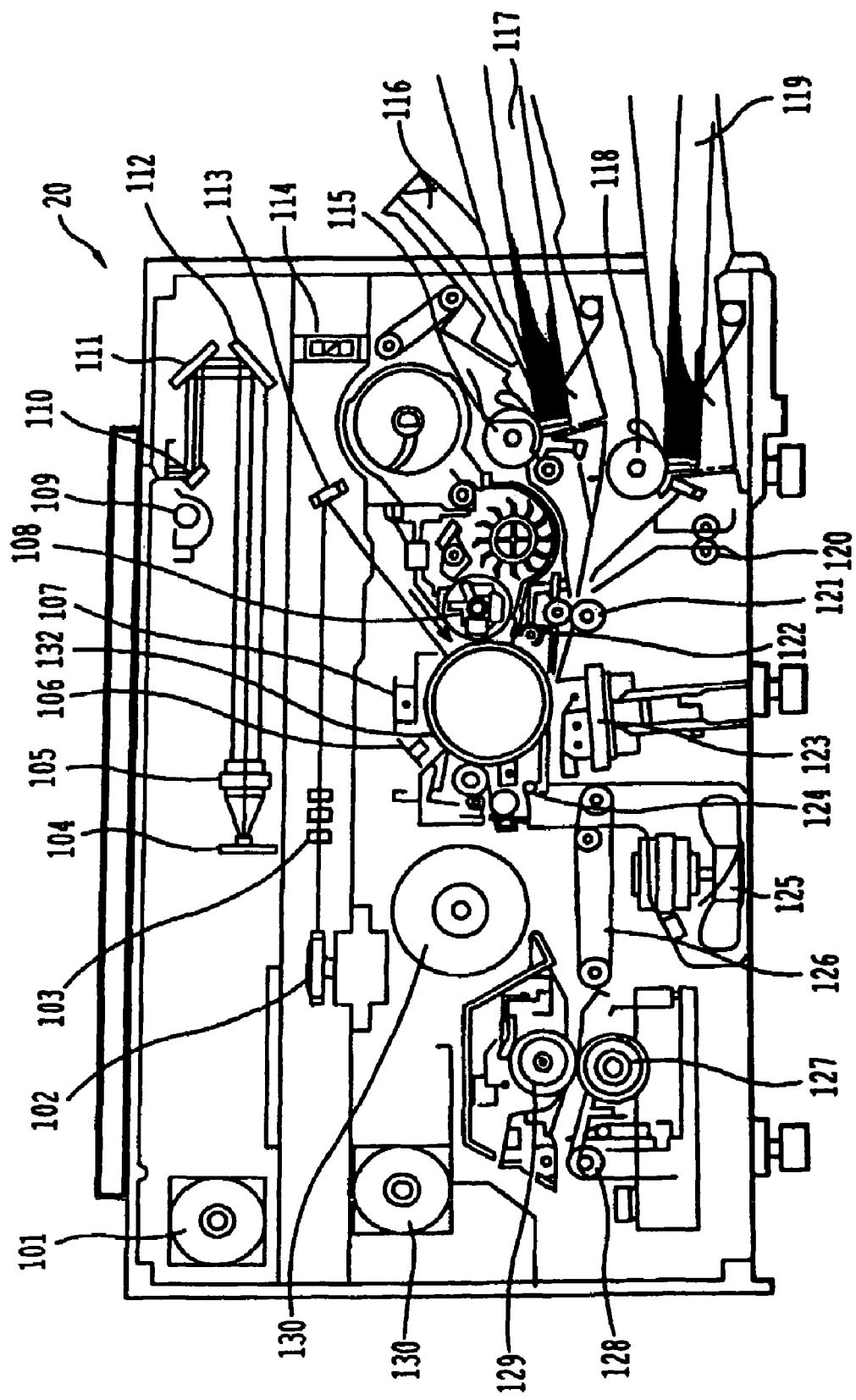
FIG. 2 illustrates the components of a digital image forming apparatus.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an F θ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and elements 110, 111, and 112 designate mirrors for reflecting light onto the sensor 104. A drum mirror 113 is provided to reflect light to the photoconductive drum 132 originating from the polygon mirror 102. A fan 114 is used to cool the charging area of the digital image forming apparatus, and a first paper feed roller 115 is used for feeding paper from the first paper cassette 117, and a reference numeral 116 designates a manual feed table. Similarly, a second feed paper feed roller 118 is used in conjunction with the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. A hot roller 129 is used to fix toner onto the paper, 130 designates an exhaust fan, and a main motor 131 is used to drive the digital copier/printer 24.

Figure 3:
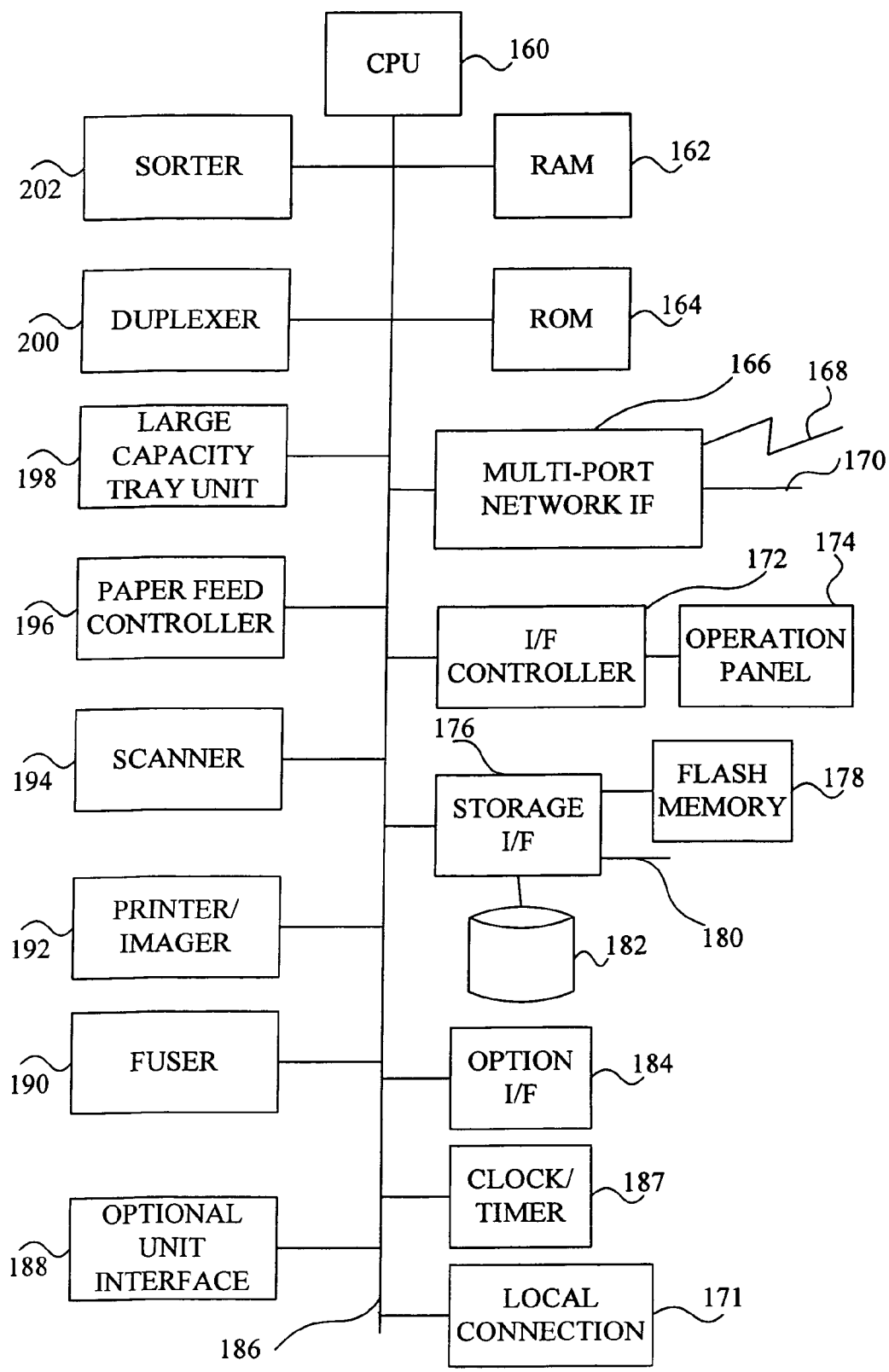
FIG. 3 illustrates the electronic components of the digital image forming apparatus illustrated in FIG. 2.

FIG. 3 is a block diagram illustrating the electronic components of the digital copier/printer 24 of FIG. 2, wherein CPU 160 is a microprocessor that acts as a controller of the apparatus. Random access memory (RAM) 162 stores dynamically changing information including operating parameters of the digital copier/printer 24. A non-volatile memory (e.g., a read only memory (ROM) 164 or a Flash Memory) stores program code used to run the digital copier/printer as well as static-state data, describing the copier/printer 24 (e.g., the model name, model number, serial number of the device, and default parameters).

A multi-port network interface 166 is provided to enable the digital copier/printer 24 to communicate with external devices through at least one communication network. Reference number 168 represents a wireless or cellular network, and numeral 170 represents another type of network different from the network identified at 168. Additional details of the multi-port network interface are set forth with respect to FIG. 4. An interface controller 172 is used to connect an operation panel 174 to a system bus 186. The operation panel 174 includes standard input and output devices found on a digital copier/printer 24 including a copy button, keys to control the operation of the image forming apparatus such as, for example, number of copies, reduction/enlargement, darkness/lightness, etc. Additionally, a liquid crystal display may be included within the operation panel 174 to display parameters and messages of the digital copier/printer 24 to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. For example, the storage devices include a flash memory 178, which can be substituted by a conventional Electrically Erasable Programmable Read Only Memory (EEPROM), and a disk 182. The disk 182 may be a hard disk, optical disk, and/or a floppy disk drive. Additional memory devices may be connected to the digital copier/printer 24 via connection 180. The flash memory 178 is used to store semi-static state data that describes parameters of the digital copier/printer 24 that infrequently change over the life of the apparatus 24. Such parameters include, for example, the options and configuration of the digital copier/printer. An option interface 184 allows additional hardware, such as an external interface, to be connected to the digital copier/printer 24. A clock/timer 187 is utilized to keep track of both the time and date and also to measure elapsed time.

FIG. 3 also illustrates the various sections making up the digital copier/printer 24. Reference numeral 202 designates a sorter and contains sensors and actuators that are used to sort the output of the digital copier/printer 24. A duplexer 200 allows performance of a duplex operation. The duplexer 200 includes conventional sensors and actuators. A large capacity tray unit 198 is provided for allowing paper trays holding a large number of sheets. As with the duplexer 200, the tray unit 198 includes conventional sensors and actuators as well.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. A printer/imager 192 prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device. Other elements include a GPS unit that can identify the location of the device.

Figure 4:
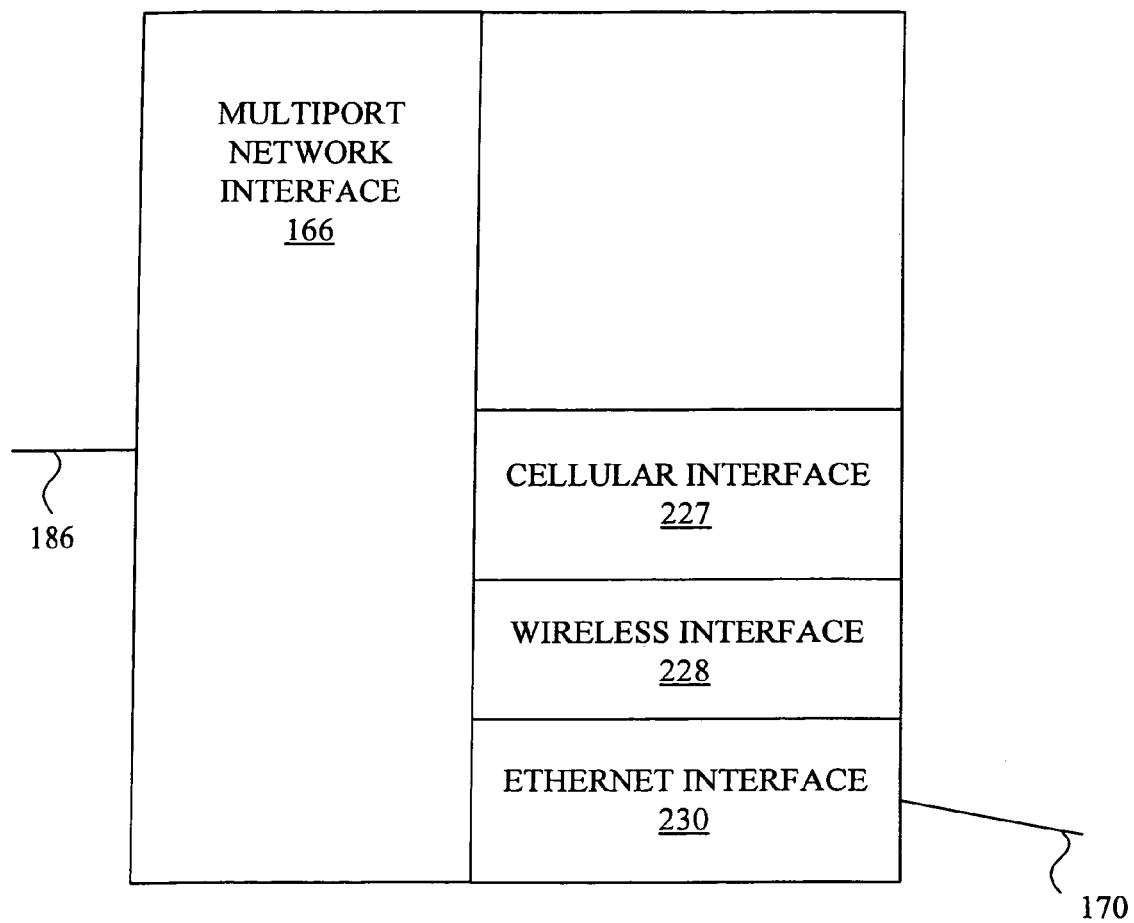
FIG. 4 illustrates details of a multi-port communication interface illustrated in FIG. 3.

FIG. 4 illustrates details of the multi-port network interface 166. The digital image forming device may communicate to external devices through a cellular interface 227, a wireless interface 228, or an Ethernet interface 230, which connects to a LAN 170. Other interfaces may include, but are not limited to, a Digital Subscriber Line (DSL) (original DSL, concentric DSL, and asymmetric DSL). A single device which connects to both a Local Area Network and a telephone line is commercially available from Intel and is known as Intel Pro 10/100+Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162, the flash memory 178, or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, projector, conferencing equipment, shredder, or other business office machines, a business office appliance, or other appliances (e.g., a microwave oven, VCR, DVD, digital camera, digital camcorders, cellular phone, palm top computer). Additionally, the present invention includes other types of devices that operate using store-and-forward or direct connection-based communication. Such devices include metering systems (including gas, water, or electricity metering systems), vending machines, or any mechanical device (e.g., automobiles, motorcycles, washer, dryer) that needs to be monitored during operation or remote diagnosis. In addition to monitoring special purpose machines and computers, the invention can be used to monitor, control, and diagnose a general purpose computer that would be the monitored and/or controlled device.

Figure 5:
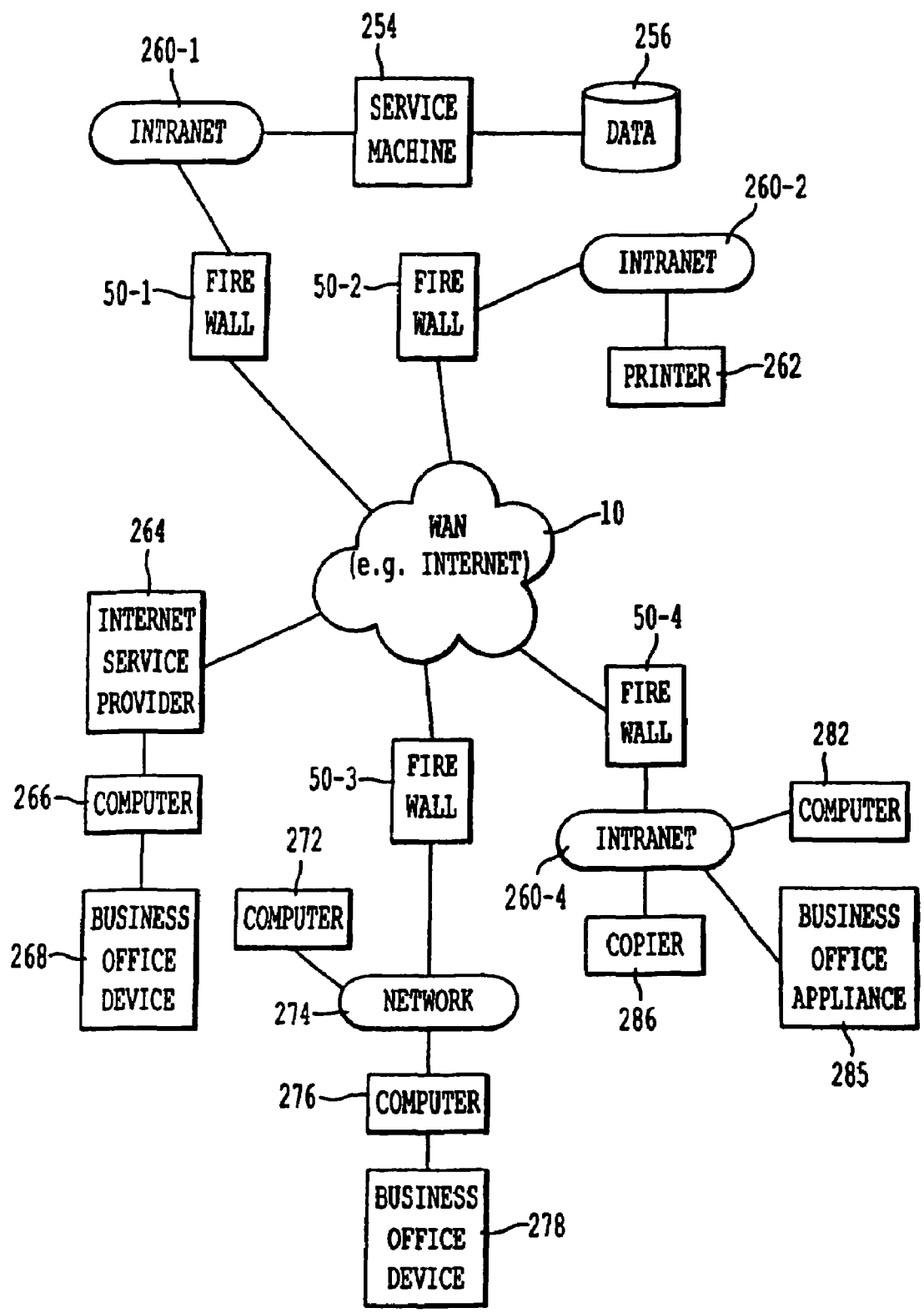
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up of the monitored devices, or configuration information such as which components or optional equipment is included with the monitored devices. The service machine 254 may be implemented as the device or computer that requests the monitored devices to transmit data, or that requests that remote control and/or diagnostic tests be performed on the monitored devices. The service machine 254 may be implemented as any type of device, and is preferably implemented using a computerized device such as a general purpose computer. Also, Service Machine 254 may consist of multiple computers over the network with diverse database including billing, accounting, service processing, parts tracking and reports.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264, which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Asymmetric Digital Subscriber Line (ADSL), modems that use frame relay communication, wireless modems such as a radio frequency modem, a fiber optic modem, or a device that uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token ring network). Networking software that may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278.

Communication between the business office device 278 and the computer 276 may be accomplished using wire-based or wireless methods including, but not limited to, radio frequency connections, electrical connections, and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique disclosed in the Bluetooth Specification (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired. For the monitoring and controlling of the networked equipment, any computers (266, 272, or 282) can be used instead of 254. In addition, any computer may access 254 to retrieve necessary device information or usage information through the web.

Figure 6A:
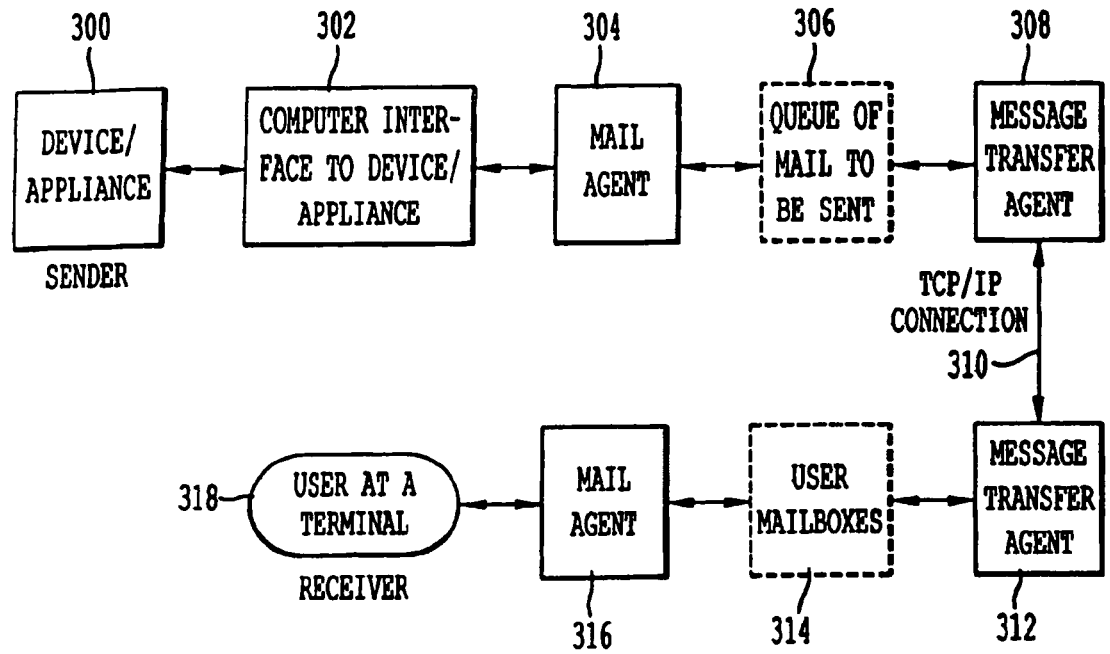
FIG. 6A is a block diagram illustrating a flow of information to and from an application unit using electronic mail.

FIG. 6A illustrates a device/appliance 300 connected to a typical e-mail exchange system, which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not need to interface with the device/appliance 300 at all. The computer interface 302 then interacts with a mail agent 304. Popular mail agents for Unix include MR, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment the present invention, elements 302 and 304 of FIG. 6A reside in the library to monitor the usage of the application unit.

From the message transfer agent 312, e-mail messages are stored in user mailboxes 314, which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such delays in responsiveness may generally be unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include Telnet, File Transfer Protocol (FTP), and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available and may be used with the present invention. For example, a C++ library function, crypt( ), is available from Sun Microsystems for use with the Unix operating system. Encryption and decryption software packages are known and commercially available and may also be used with this invention. One such package is PGP available from PGP Corporation.

Figure 6B:
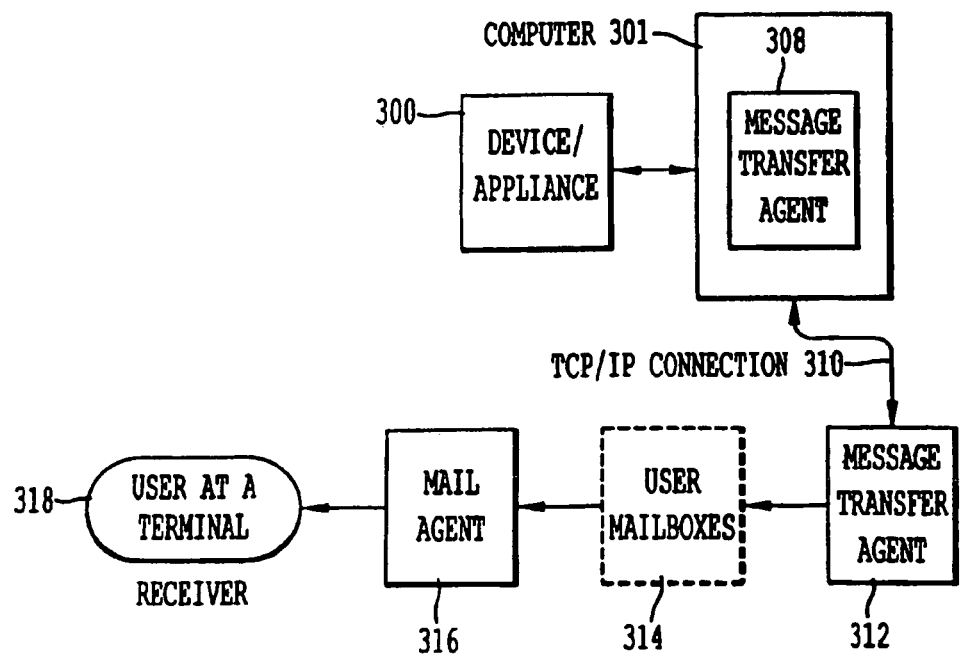
FIG. 6B illustrates an alternative way of communicating using electronic mail in which a computer that is connected to the application unit also serves as a Message Transfer Agent (MTA)

As an alternative to the general structure of FIG. 6A, a single computer that functions as the computer interface 302, the mail agent 304, the mail queue 306, and the message transfer agent 308 may be used. As illustrated in FIG. 6B, the device/appliance 300 is connected to a computer 301, which includes the message transfer agent 308.

Figure 6C:
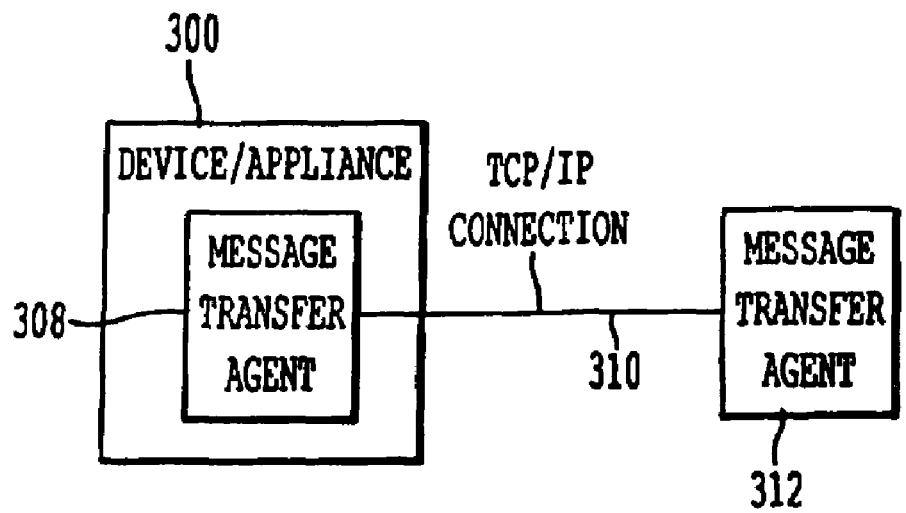
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
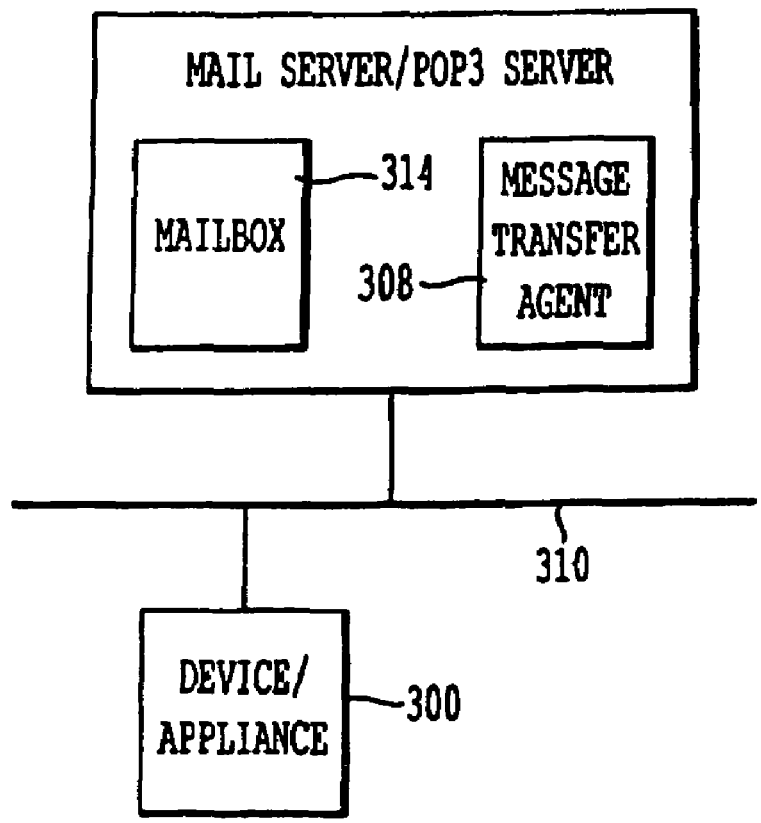
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
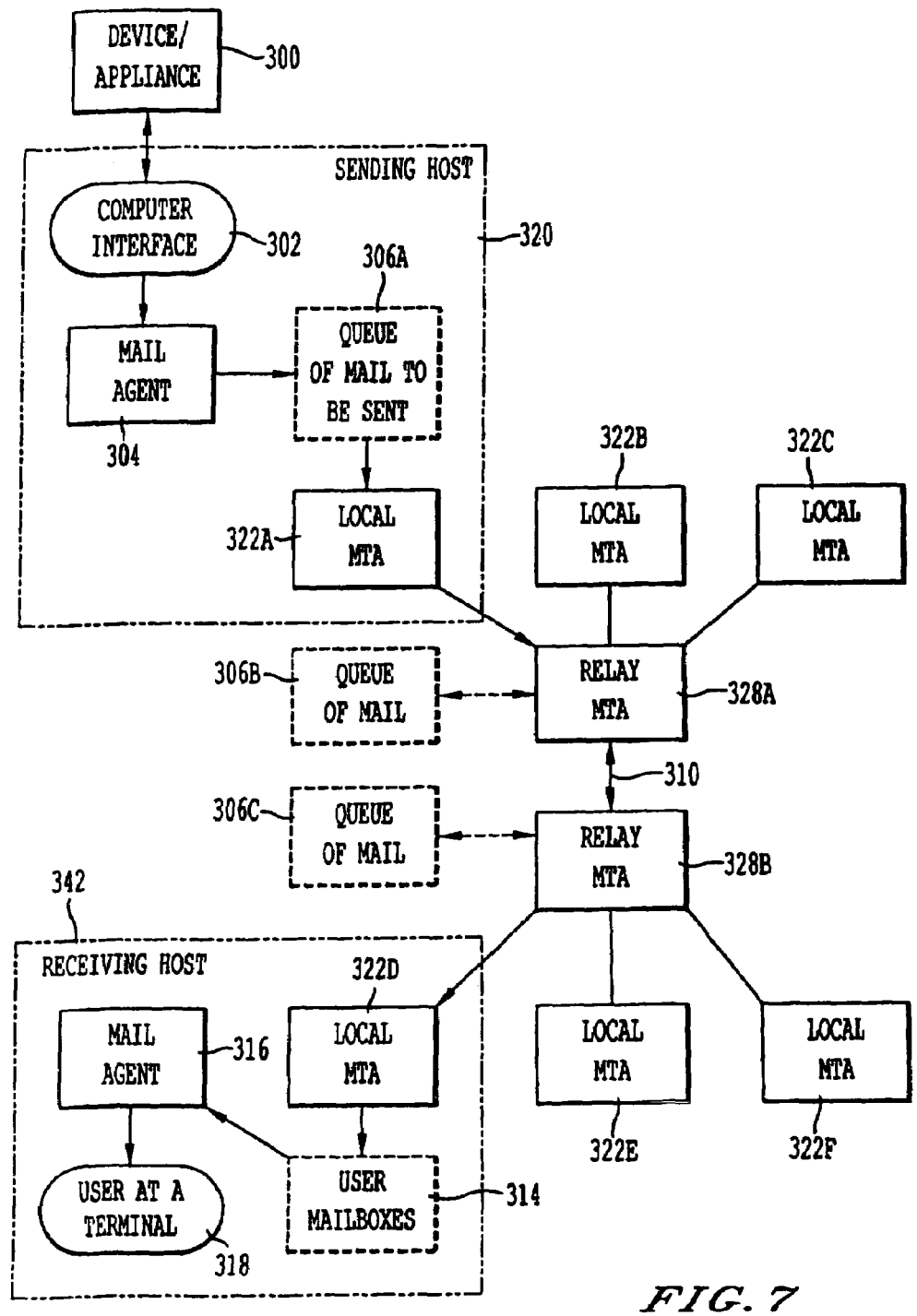
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E, and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
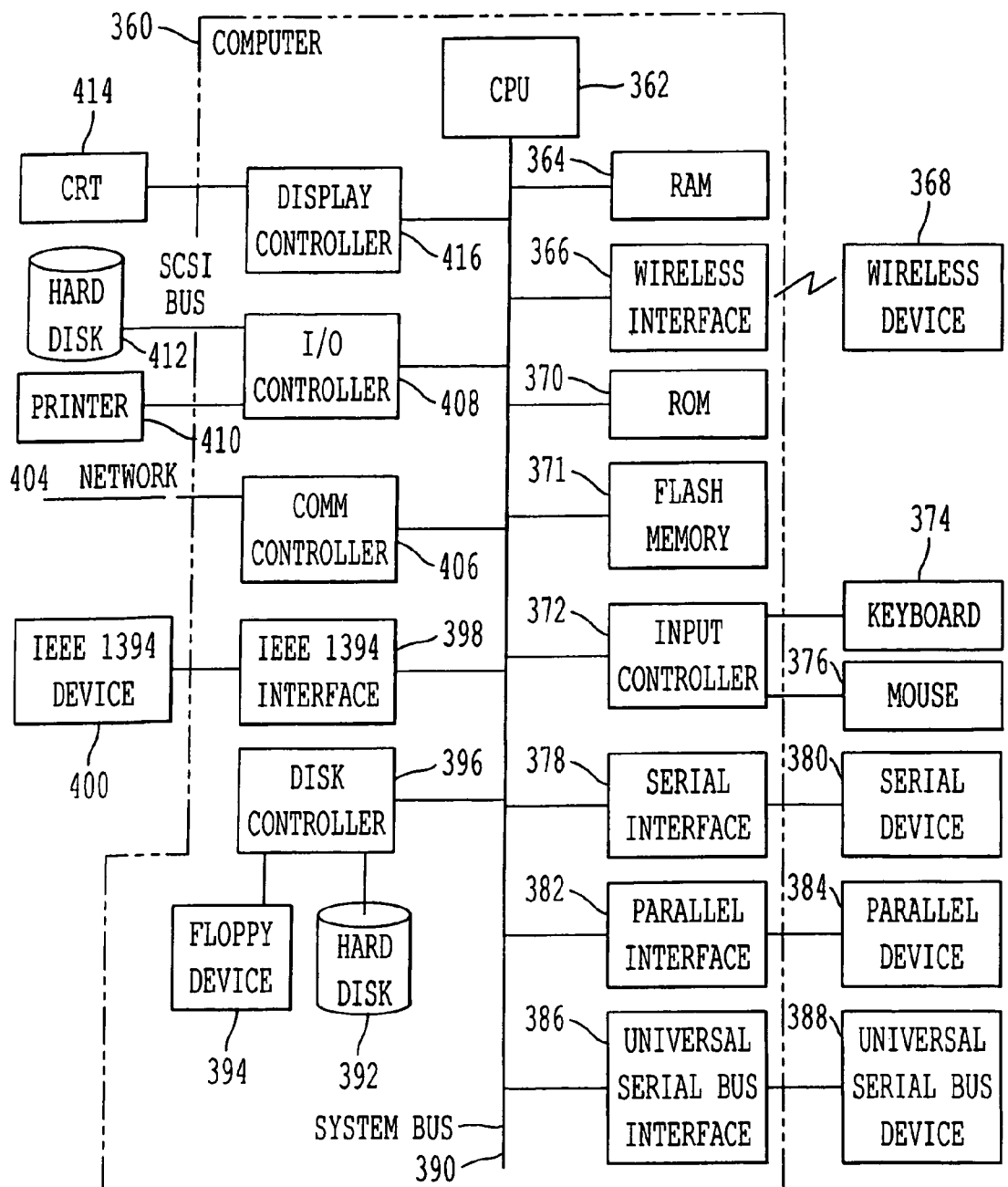
FIG. 8 illustrates an exemplary computer which may be connected to an appliance/device and used to communicate electronic mail messages.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 that communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

Computer 360 includes a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. A system bus 390 connects the various elements of the computer 360. A disk controller 396 is connected to a floppy disk drive 394 and a hard disk drive 392. A communication controller 406 allows the computer 360 to communicate with other computers (e.g., by sending e-mail messages) over a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
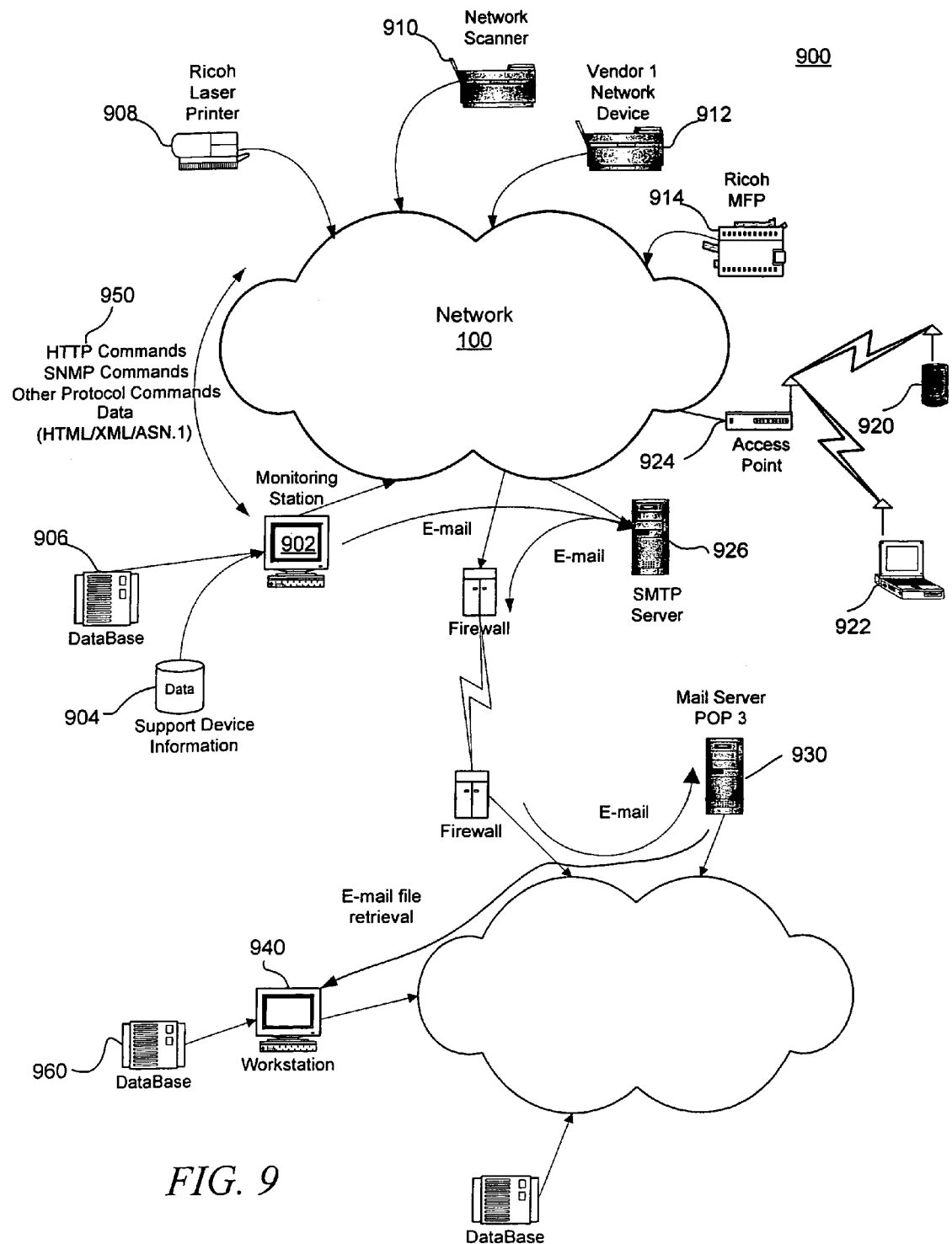
FIG. 9 is a schematic representation of the overall system in accordance with an exemplary embodiment of the present invention.

Referring now to FIG. 9, there is shown a schematic representation of the overall system 900 in accordance with an exemplary embodiment of the present invention. System 900 is shown to include a plurality of devices, for example, a laser printer 908, a scanner 910, a network device 912, and a multi-function printer 914, all connected to a network 100. The plurality of devices are generally referred to herein as "monitored devices." The system 900 also includes a workstation/monitoring system 902 (hereinafter referred to as a controller 902), connected to the network 100 for monitoring and controlling the monitored devices 908, 910, 912, and 914. Each of the monitored devices 908, 910, 912, and 914 are given a unique address. For example, an IP address assigned to a device serves as a unique address for the device. Thus, a user at controller 902 is able to access a respective device among the monitored devices 908-914 by accessing the unique IP address assigned to the respective monitored device. It will be appreciated that the present invention is not limited to using IP addresses to uniquely identify devices connected to a network.

The controller 902, upon accessing a device among the monitored devices 908-914, obtains various information through SNMP or/and HTTP protocols. Such information includes detailed information about the operational status of the device including troubleshooting information. For example, controller 902 accesses and obtains the jam location of a particular device and sends a message to the person in charge of the device to clear the jam. The operational status/details of the laser printer 908 include such details as toner level, indication of paper jam, quantity of print paper in printer trays, etc.

It will be appreciated that the controller 902 may be either physically connected or wirelessly coupled to the network 100. For example, a personal digital assistant (PDA) 920 or a laptop computer 922, shown to be wirelessly coupled to the network 100, may also be used as a controller 902. An access point 924 acts as an interface to enable wireless communications between the network 100 and PDA 922 or laptop computer 922. Henceforth, the present invention will be described with the assumption that the controller 902 will be controlling and monitoring the status of the monitored devices connected to the network.

The network 100 facilitates communication between the controller 902 and the monitored devices 908-914 to enable monitoring and control of such monitored devices. The number of devices that are connected to the network is not limiting of the present invention. It will be appreciated that the network 100 may be a local area network (LAN) or a wide area network (WAN). Likewise, the monitored devices 908, 910, 912, and 914 are shown to be merely exemplary.

The controller 902 is communicatively coupled to a storage device 904 and a database 906. The storage device 904 includes a hard disk, optical disk, and/or an external disk drive. The database 906 is communicatively linked to the storage device 904, and includes a Relational Database Management System (RDBMS) for easy search and retrieval of data stored in the storage device 904. The storage device 904 preferably stores detailed information about each of the monitored devices 908-914. For example, detailed information, such as the make, model, and various functions and trouble-shooting details of the laser printer 908 are stored in the storage device 904. Also, deviation values about the operational status of the laser printer compared to predetermined reference values may also be stored in the storage device 904. Although the database 906 and the storage device 904 are described to be communicatively coupled to the controller 902, it will be appreciated that the controller 902 may be built with the storage device and the database installed therein. In such a case, the storage device 906 and the database 904 would be depicted as being internal to the controller 902.

The controller 902 is installed with software in order to facilitate monitoring and control of the plurality, of devices 908-914. Simple Network Management Protocol (SNMP), File Transfer Protocol (FTP) and Hyper Text Transfer Protocol (HTTP) are used by the controller 902 for monitoring the plurality of devices 908-914 and the data received from the plurality of devices 908-914 is presented in the form of ASN.1 Binary format or HTML or XML formats, as shown in 950.

Although FIG. 9 illustrates only the imaging devices, the network for communicating information between the monitoring device and the plurality of monitored devices may include the home network where the appliances and meters are connected to the network. It will be appreciated that data collected by the controller/workstation 902 can be sent through e-mail, FTP, or any other communication protocol means to a remote device for further processing. Though the monitoring station 902, PDA 920, or the laptop 922 can be the controller that collects the data and stores the data or sends the data through a communication protocol, it will be appreciated that the controller can be any of the devices connected to the network. Any of the network devices (e.g. printers) can contain the monitoring system capable of monitoring the status of other devices in the network, storing the collected data and/or sending the collected data through any other communication protocol means (e.g., e-mail, FTP). The Xerox DocuPrinter 4025 and BP LaserJet 9000 are both capable of sending e-mail.

The monitoring station 902 can send the status information to a remote location by e-mail via SMTP. As shown in FIG. 9, the monitoring station 902 sends the status information in an e-mail via SMTP server 926 to a remote location or remote network. The remote location has a POP3 server 930 to receive the email. A workstation 940 communicates with the POP3 server 930 to retrieve the email containing the status information. The workstation 940 may store the status information in a database 960. Email allows the status information to be easily transmitted to a remote location. The status information may be in the email message or in an attachment. The status information may be encoded to provide secure transmission of the data. Other protocols such as FTP, HTTP, or web service can be used to transmit the information to a remote location.

Monitoring System Architecture

Figure 10:
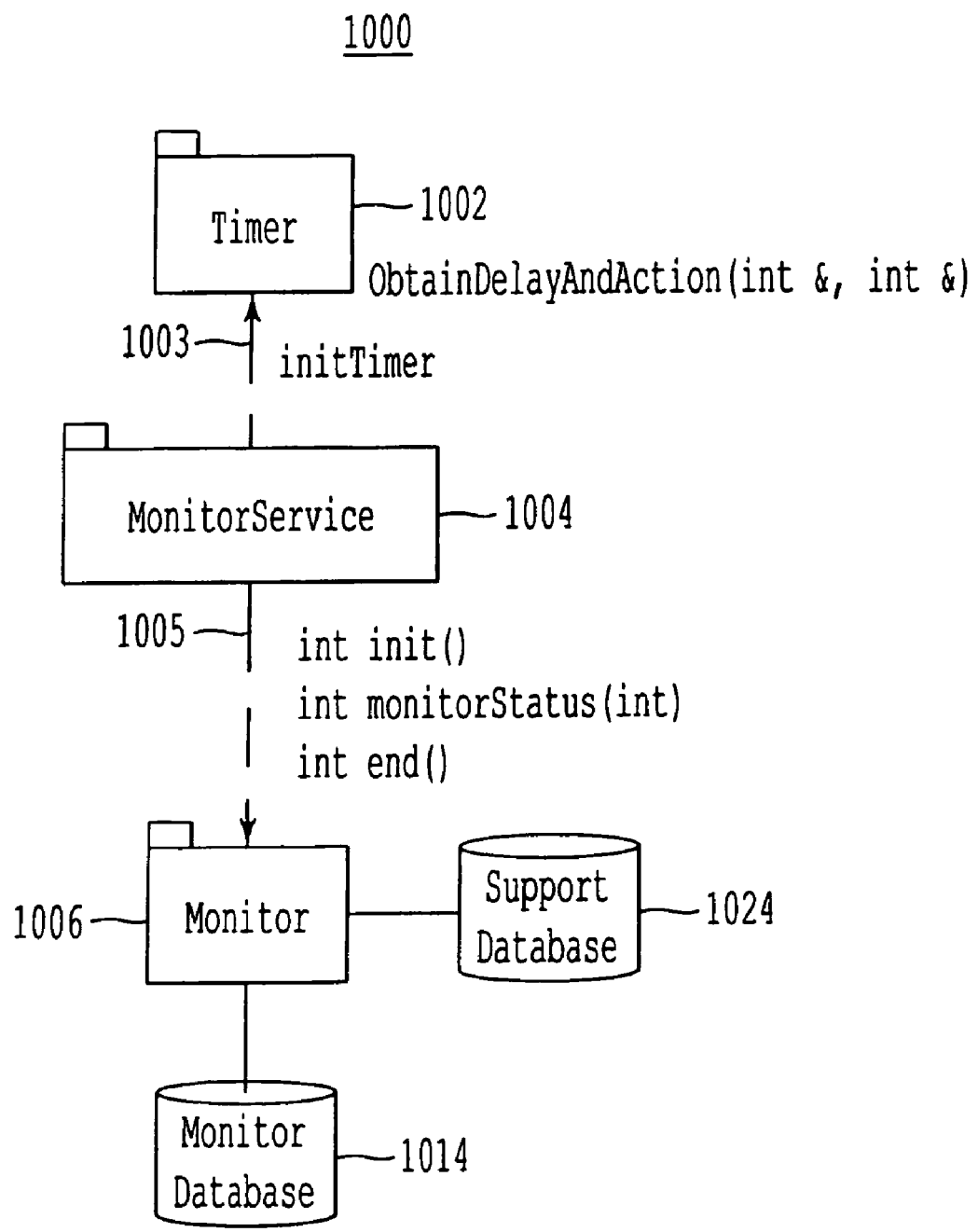
FIG. 10 illustrates modules used in the monitoring of the data and their interface functions in accordance with an exemplary embodiment of the present invention.
Figure 13:
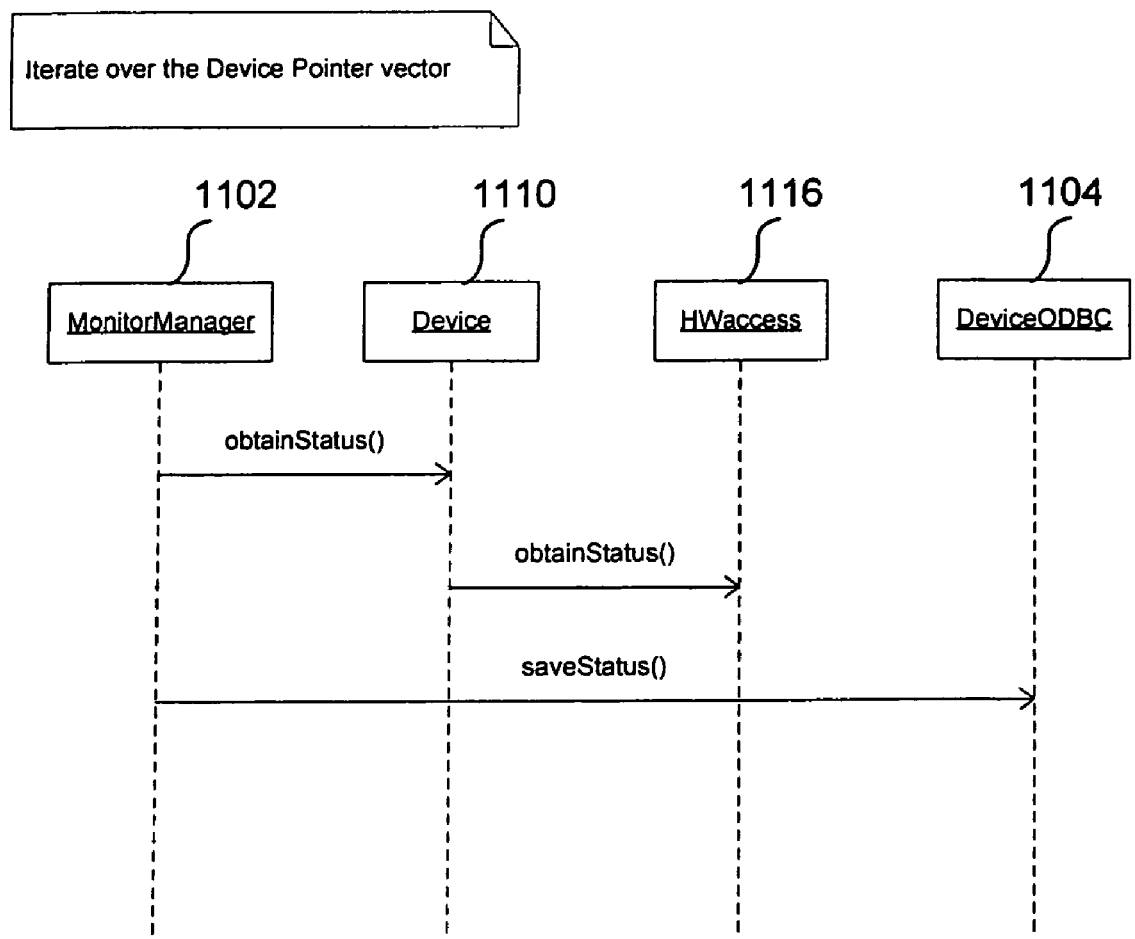
FIG. 13 shows an exemplary sequence of the status monitor function to determine the status of a monitored device by the MonitorManager, as shown in FIG. 11.

FIG. 10 illustrates a monitoring system 1000 (and associated interface functions) used in the monitoring of data associated with remote devices according to an exemplary embodiment of the present invention. The monitoring system 1000 includes the software module MonitorService 1004, which is a computer resident program such as Service in NT or Windows 2000, and Daemon in Unix. In a preferred embodiment, the monitoring system is implemented using an objected-oriented software environment. Also included in the monitoring system 1000 are a Timer module 1002 and Monitor module 1006. Timer module 1002 and Monitor module 1006 are library functions to be called by the MonitorService module 1004. For example, MonitorService 1004 initializes the Timer module 1002 by calling the InitTimer 1003 function and obtains delay and action parameters by calling obtainDelayAndAction (int &, int &) function. The init( ) function is also called by the MonitorService module 1004 to initialize various modules in the Monitor module 1006, as illustrated in FIG. 13. The init( ) function can be used to obtain the IP address and paramameter value assigned to a monitored device through an external source containing IP addresses, parameter names and values collected through known methods. The Monitor module 1006 is communicatively coupled to a support database 1024 and to a monitor database 1014, which are described in more detail below.

Once the IP address of a monitored device is obtained, the IP address is used by the monitoring system to contact the monitored device to obtain information such as, manufacturer (vendor) and model information. Some of the functions executed by the monitoring system 1000 include:

void initTimer(void)

This function initializes the Timer. In particular, this function triggers the Timer object to get the timing information from the registry.

void obtainDelayAndAction(int & out_nDelay, int & out_nAction)

This function returns the delay time in seconds for ::Sleep function (need to multiply 1000) and the action indicator. The action indicator is defined as follows: 0=event checking; 1=sending the monitored data; and 2=monitoring and storing the data into the local database.

int init(void)

This function initializes the Monitor. In addition, it creates the devices to be monitored. The return int is the error code in which zero is defined as no error.

int monitorStatus(int in_nAction)

This function monitors the preset information. The return int is the error code in which zero is defined as no error.

int end(void)

This function cleans up the Monitor before closing the objects. The return int is the error code in which zero is defined as no error.

Monitor Module

Figure 11:
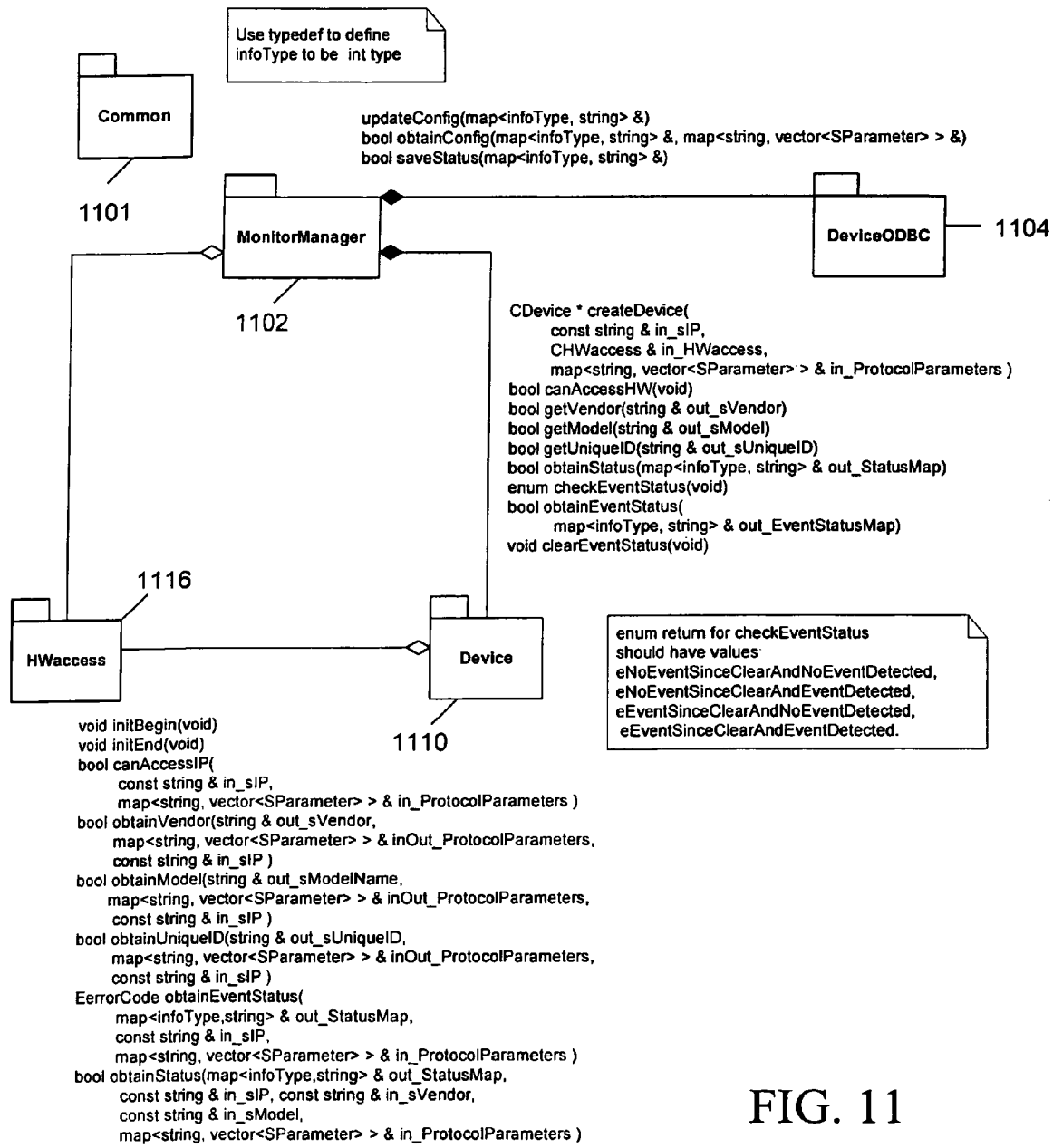
FIG. 11 shows details within the Monitor module and their calling functions between the sub-modules.

FIG. 11 shows the structural details of the Monitor module 1006, including the various software sub-modules, and the calling functions between the sub-modules of the Monitor module 1006. The Monitor module 1006 includes a Common module 1101 that contains classes used by many modules, a MonitorManager module 1102 that manages the other sub-modules (including the DeviceODBC module 1104, the Device module 1110, and the HWaccess module 1116) to complete the tasks defined by interface functions as illustrated in FIG. 10. Specifically, the DeviceODBC module 1104 is accessed in order to access external device information through the standard interface. The HWaccess module 1116 obtains vendor, model, unique ID, and status information from the monitored devices using a selected communication protocol from among a plurality of communication protocols (e.g., HTTP, SNMP, and FTP). Each of the Monitor software modules will be described in more detail below.

The following is a partial listing and description of the interfaces among the Monitor modules discussed above. For example, some modules may need to have "init" functions or additional functions in order to obtain the information in convenient formats.

void updateConfig(std::map<infoType, std::string> &)

Before this function is called, the calling function is preferred not to replace the vendor and model entries if obtain functions return a null string. This function updates the device information database of the current record in the Device- ODBC 1104. This function is most efficient when the ObtainConfig below is called initially. First, this function checks if the IP address is the same as at the DeviceODBC 1104. If the IP address fields are not the same, the record with the correct IP address is obtained from the database. Then, the other fields are copied and the record is updated.

bool obtainConfig(std::map<infoType, std::string> &, std::map<std::string, std::vector<SParameter>> &)

This function obtains the map from DeviceODBC 1104 for the device information in the given format and the map of protocols and associated parameters. The function returns true if there is data returned, false if there is no more data.

bool saveStatus(std::map<infoType, std::string> &)

This function saves the status information into the DeviceODBC 1104. The function returns true when saving is successful, false otherwise.

CDevice * createDevice(const std::string & in_sIP, CHWaccess & in_HWaccess, std::map<std::string, std::vector<SParameter>> & in_ProtocolParameters)

This function creates the device based upon in_sIP and in_ProtocolParameters. The created device is connected to the hardware through CHWaccess. If the device can not be created, the function returns 0. Therefore, the calling object should check if the return object pointer is 0 or not.

bool canAccessHW(void)

This function returns true when the hardware can be accessed through the network, false otherwise.

bool getVendor(std::string & out_sVendor)

This function returns the vendor name. If the device is not supported by the system, but it can be accessed through one of the protocols, the string shall contain "GENERIC." If the error is detected in the process, the function returns false with null string. Otherwise, the function returns true.

bool getModel(std::string & out_sModel)

This function gets the model of the device. If the model is obtained, the function returns true. If the error is detected in the process, the function returns false with null string.

bool getUniqueID(std::string & out_sUniqueID)

This function returns the unique ID of the device. If the Unique ID is obtained, the function returns true. If the error is detected in the process, the function returns false with null string.

bool obtainStatus(map<infoType, std::string> & out_StatusMap)

This function returns the status map. The function returns true when the status is returned, false when status could not be obtained. Note that this function returns the different maps from the HWaccess and Device modules. In the Device module, event status information is added to the map returned from HWaccess and is cleared.

enum checkEventStatus(void)

This function triggers to obtain the event of the network device. The enum type and values should be defined in the classes. The enum values should include values eNoEventSinceClearAndNoEventDetected, eNoEventSinceClearAndEventDetected, eEventSinceClearAndNoEventDetected, eEventSinceClearAndEventDetected.

bool obtainEventStatus(std::map<infoType, std:: string> & out_EventStatusMap)

This function obtains event status information. The function returns true when the status is returned, false when status could not be obtained.

void clearEventStatus(void)

This function clears the event status accumulated since the last obtainStatus function call or clearEventStatus.

void initBegin(void)

This function starts the initialization process through HWaccess, in particular, to create the software device objects.

void initEnd(void)

This function ends the initialization process through HWaccess signifying that the device object creation is finished.

bool canAccessIP(const std::string & in_sIP, std:: map<std::string, std::vector<SParameter>> & in_ProtocolParameters)

This function returns true when the device can be accessed at the IP address, false otherwise.

bool obtainVendor(std::string & out_sVendor, std:: map<std::string, std::vector<SParameter>> & in Out_ProtocolParameters, const std::string & in_sIP)

This function obtains the Vendor. The function returns true if the operation is successful, false with the empty string otherwise. During this function call, the protocols are examined and if a particular protocol can not be used for status monitoring, the protocol shall be deleted from the in Out_ProtocolParameters.

bool obtainModel(std::string & out_sModelName, std:: map<std::string, std::vector<SParameter>> & in Out_ProtocolParameters, const std::string & in_sIP)

This function obtains the Model name. The function returns true if the operation is successful, false with the empty string otherwise. During this function call, the protocols are examined, and if a particular protocol can not be used for status monitoring, the protocol shall be deleted from the in Out_ProtocolParameters.

bool obtainUniqueID(std::string & out_sUniqueID, std:: map<std::string, std::vector<SParameter>> & in Out_ProtocolParameters, const std::string & in_sIP)

This function obtains the Unique ID. The function returns true if the operation is successful, false with the empty string otherwise. During this function call, the protocols are examined and if a particular protocol can not be used for status monitoring, the protocol shall be deleted from the in Out_ProtocolParameters.

EerrorCode obtainEventStatus(std::map<infoType, std:: string> & out_StatusMap, const std::string & in_sIP, std:: map<std::string, std::vector<SParameter>> & in_ProtocolParameters)

This function obtains the event status. The EerrorCode is defined below.

bool obtainStatus(std::map<infoType, std::string> & out_StatusMap, const std::string & in_sIP, const std::string & in_sVendor, const std::string & in_sModel, std::map<std:: string, std::vector<SParameter>> & in_ProtocolParameters)

This function obtains the status of the device. The function returns true if the operation is successful, false with the empty map otherwise.

Figure 12:
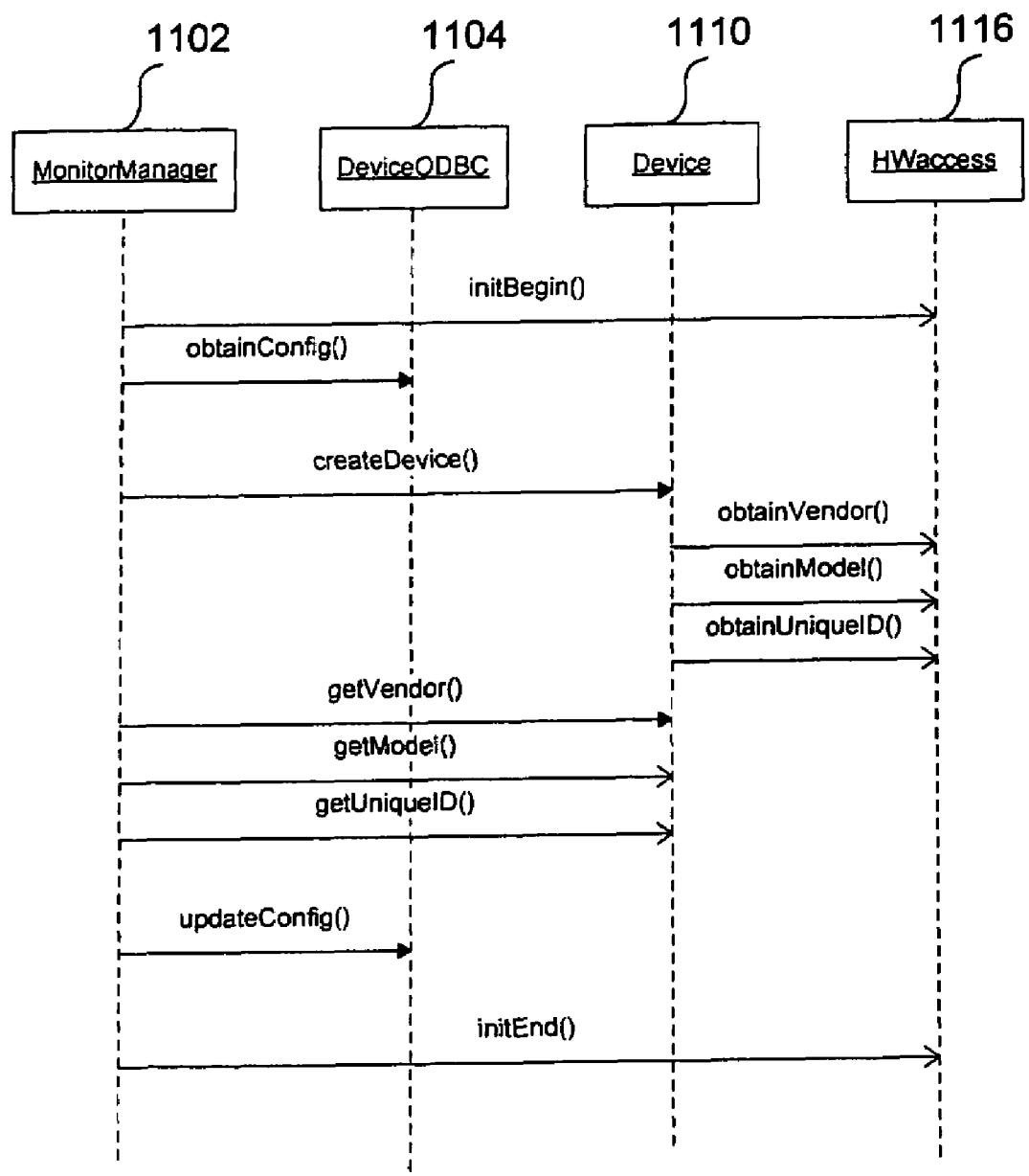
FIG. 12 shows the sequence of the init function of the Monitor module illustrated in FIG. 10.

FIG. 12 shows the sequence of the init( ) function to describe the calling sequence of Monitor module 1006 as illustrated in FIG. 10. The MonitorManager 1102 initializes the HWaccess module 1116 to start the initialization function. Subsequently, the MonitorManager 1102 obtains information about a monitored device and uses an IP address assigned to the monitored device to communicate with the monitored device. The MonitorManager 1102 accesses DeviceODBC 1104 to obtain configuration information of the monitored device. The configuration information returned to the MonitorManager 1102 includes, for example, an IP address of the monitored device, parameter names and associated values for each protocol, and vendor/manufacturer and model information of the monitored device. Once the IP address is obtained, the MonitorManager 1102 sets the IP address, parameter names and associated values for each protocol, to create a software object for the device in the Device Module 1110. When the device software object is successfully created, the HWaccess module 1116 is used to obtain Vendor, Model, and Unique ID from the monitored device to be stored in the created device software object.

Once the vendor, model information, and unique ID are obtained from the device software object, the MonitorManager 1102 updates the database (for example, DeviceODBC 1104) with information received from the monitored device. Although FIG. 12 shows one device, the steps from obtainConfig to updateConfig are repeated to cover all the devices specified in the external source. In addition, each protocol specified in FIGS. 21, 31, 32, and 33 are initialized. The database tables corresponding to ODBC in FIGS. 21, 31, 32, and 33 are accessed and necessary information for accessed devices are transferred from the external storage to the internal data structure so that the status information collection from the accessed devices is faster.

FIG. 13 shows the sequence of the status monitor function to determine the status of a monitored device by the MonitorManager module 1102, as illustrated in FIG. 11. When the obtainStatus function is issued from Device to HWaccess, the CHWaccess class in turn issues an obtainStatus function call to each protocol described in FIGS. 21, 31, 32, and 33 through the abstract class, with different parameters, as described below. Each protocol module has already cached information necessary to extract the status information from the monitored devices, which have already been accessed once during the initialization time described in FIG. 12. Therefore, the status information can be quickly extracted from the monitored devices without accessing the external source during the status monitoring. This process is repeated over all the monitored devices stored in the vector as shown in FIG. 14.

Figure 14:
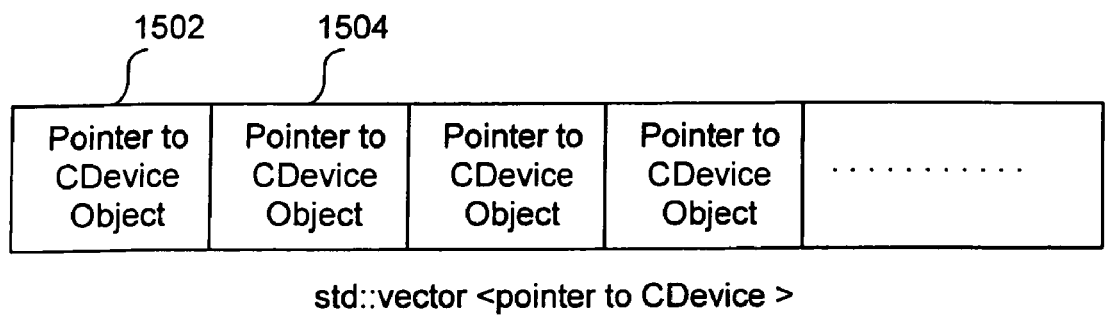
FIG. 14 shows a vector of the reference to the devices created by CDeviceFactory and used by the MonitorManager, as illustrated in FIG. 12.

Referring to FIG. 14, there is shown a vector 1500 having reference to the devices created within the Device Module 1110 of FIG. 11 and used by the MonitorManager 1102, as illustrated in FIGS. 12 and 13. MonitorManager 1102 stores device pointers, such as for example, Pointer to CDevice Object 1502, and Pointer to CDevice Object 1504 created within the Device Module 1110, in the vector. The vector sequence is iterated to obtain the status of a monitored device. Polling of monitored devices is performed over the device object by issuing an obtainStatus command. Once the status of each of the software objects is obtained, such status is updated through the DeviceODBC 1104. The status monitor sequence was described above at FIG. 13, and will not be repeated herein.

The DeviceInfo structure shown in Table I illustrates the information regarding one example monitored device. The DeviceInfo structure includes the e-mail address of the contact person, in addition to the telephone number.

TABLE 1

| Type | Name | Description |
|---|---|---|
| std::string | m_sVendor | A string representing the vendor of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |

Monitor Database

Figure 17:
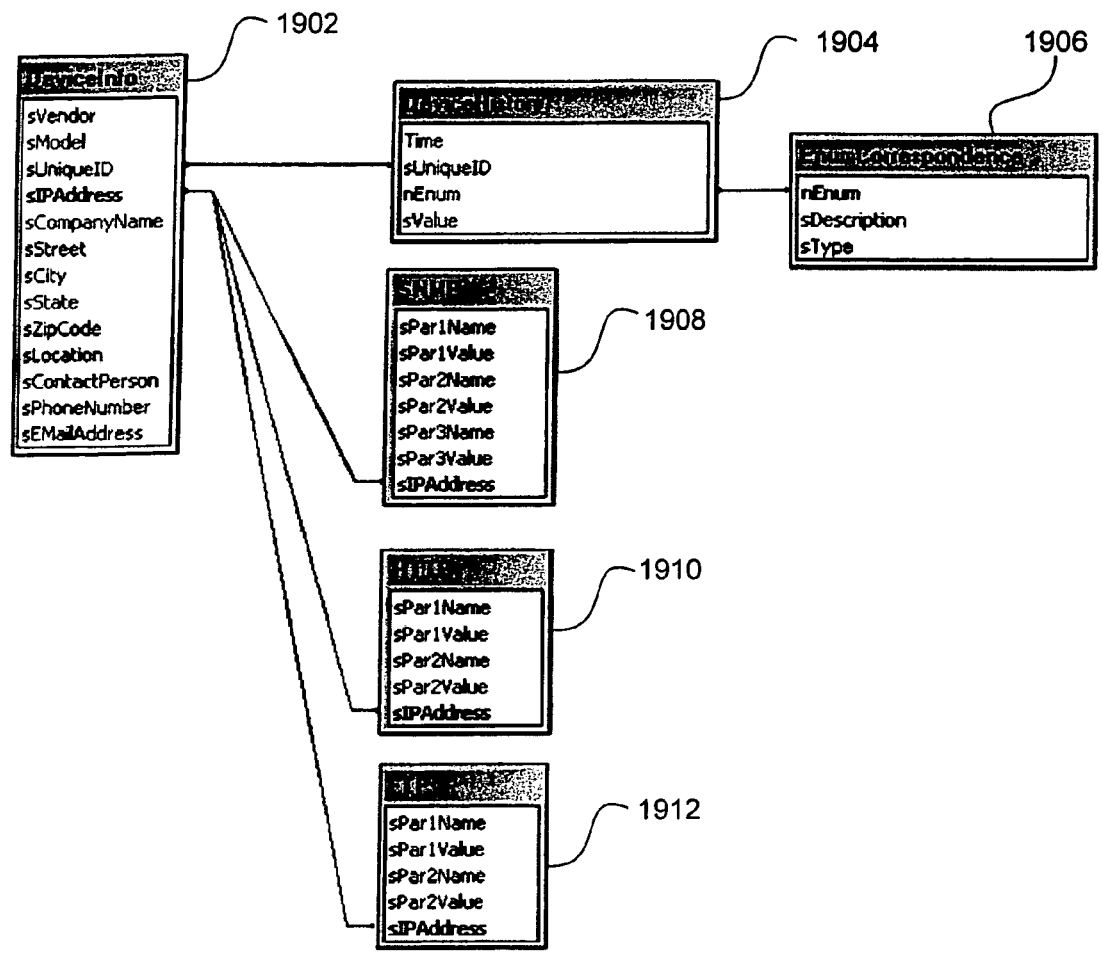
FIG. 17 illustrates the organization of the monitor database used in one embodiment of the present invention.

FIG. 17 illustrates the organization of the monitor database, which includes the device information for each monitored device (see also Table I). As shown in FIG. 17, a set of parameters, one set for each communication protocol (e.g., SNMP, HTTP, and FTP), is associated with the device information DeviceInfo 1902 for each monitored device. Moreover, each set of parameters for a particular protocol (e.g., SNMP 1908, HTTP 1910, and FTP 1912) is organized as a list of parameter name and value pairs, e.g., sPar1Name and sPar1Value. Note that the number of parameters for each protocol may be shorter or longer than the number shown in FIG. 17. For example, a username and password may be stored as FTP parameters, while a community name and a password may be stored as SNMP parameters for a given monitored device. As shown in FIG. 17, the monitor database also includes information related to the DeviceHistory 1904, which contains the status information of the monitored devices, and the EnumCorrespondence 1906.

Figure 15:
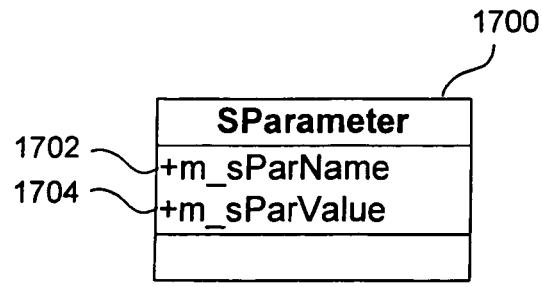
FIG. 15 illustrates the SParameter data structure used to store parameter values necessary to access monitored devices according to one embodiment of the present invention.

FIG. 15 illustrates the SParameter data structure 1700 used to pass the parameters used by the various communication protocols. SParameter includes two fields: m_sParName 1702 and m_sParValue 1704, which represent the name and value of the parameter, respectively.

Figure 16:
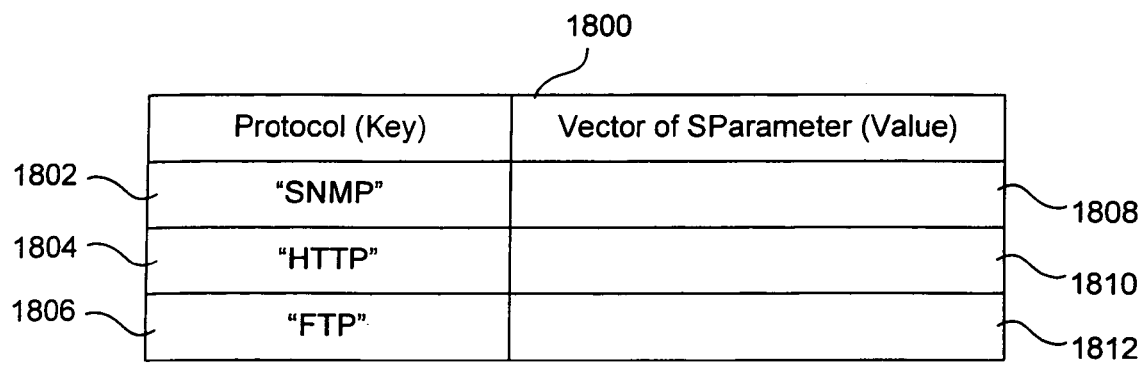
FIG. 16 illustrates a map structure used to store parameter values necessary to access monitored devices according to one embodiment of the present invention.

FIG. 16 illustrates the map structure 1800 used to pass a vector of parameters for each protocol obtained from the monitor database to a software object associated with each monitored device. The map structure 1800 associates each protocol/key field 1802, 1804, and 1806, with a corresponding vector of parameters 1808, 1810, and 1812, respectively, arranged according to the SParameter format shown in FIG. 15. For example, for the SNMP protocol 1802, the vector of parameters 1808 may include a list of parameter name, parameter value pairs that are used to access the monitored device with the SNMP protocol. For example, the SNMP parameter names stored in the vector 1808 might include "Community Name" and "Password", together with the corresponding parameter values. Note, however, that the organization of the map structure 1800 allows for any number of protocols and associated parameter vectors, and is not limited to the SNMP, HTTP, and FTP protocols shown in FIG. 16.

Support Database

Figure 18:
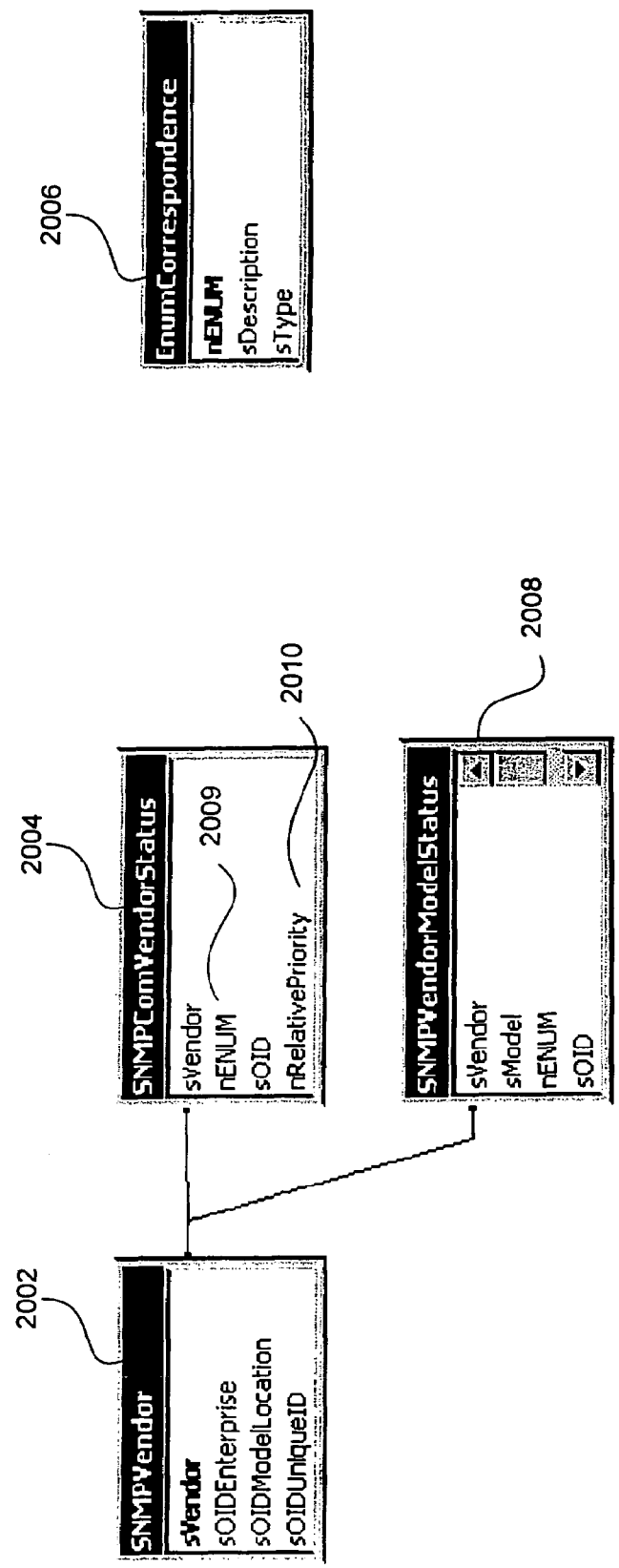
FIGS. 18 and 20 illustrate the organization of a support database arranged according to communication protocol according to one embodiment of the present invention.
Figure 19:
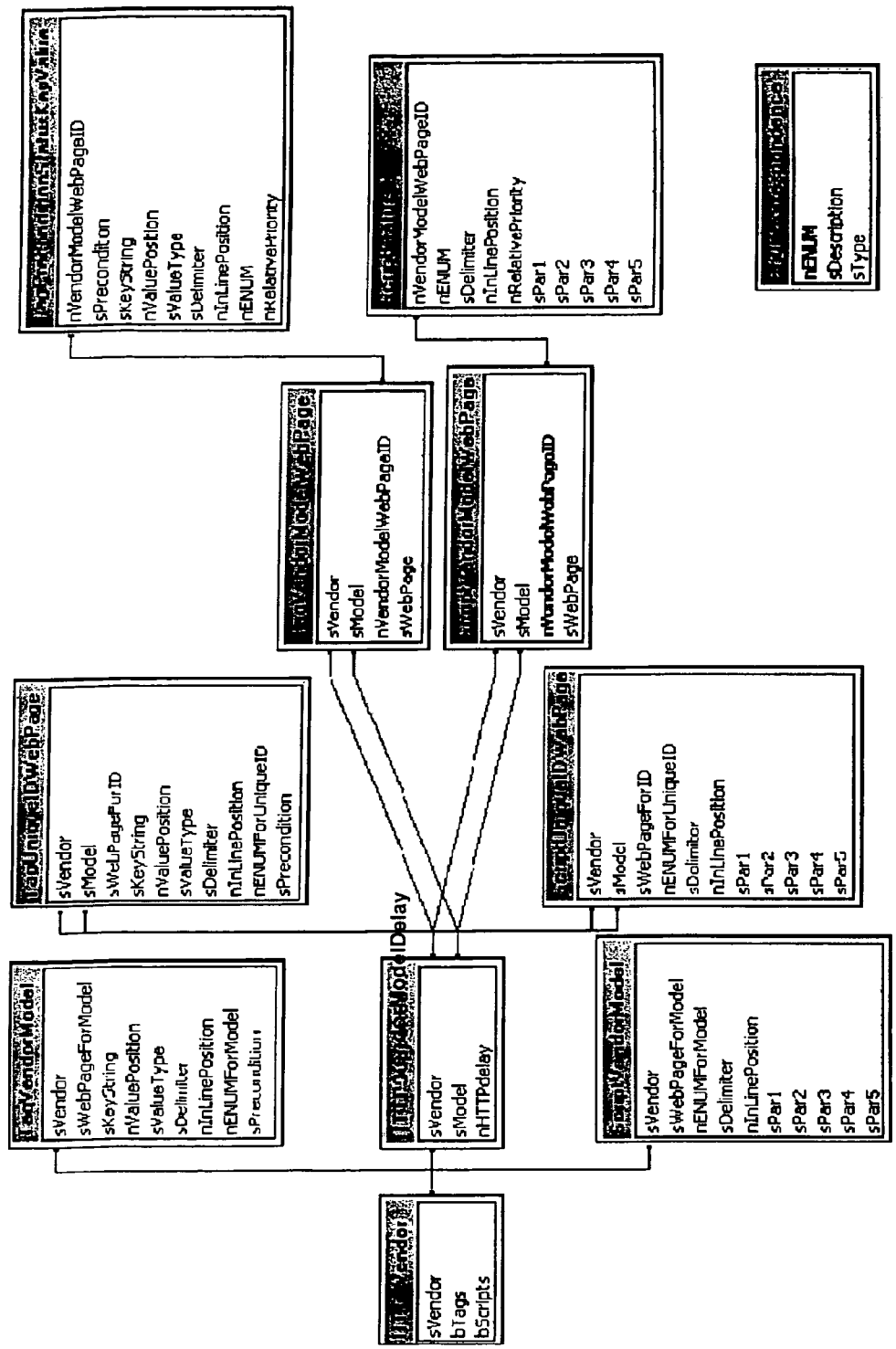
FIG. 19 is a diagram illustrating the organization of a support database for the HTTP protocol according to one embodiment of the present invention.
Figure 20:
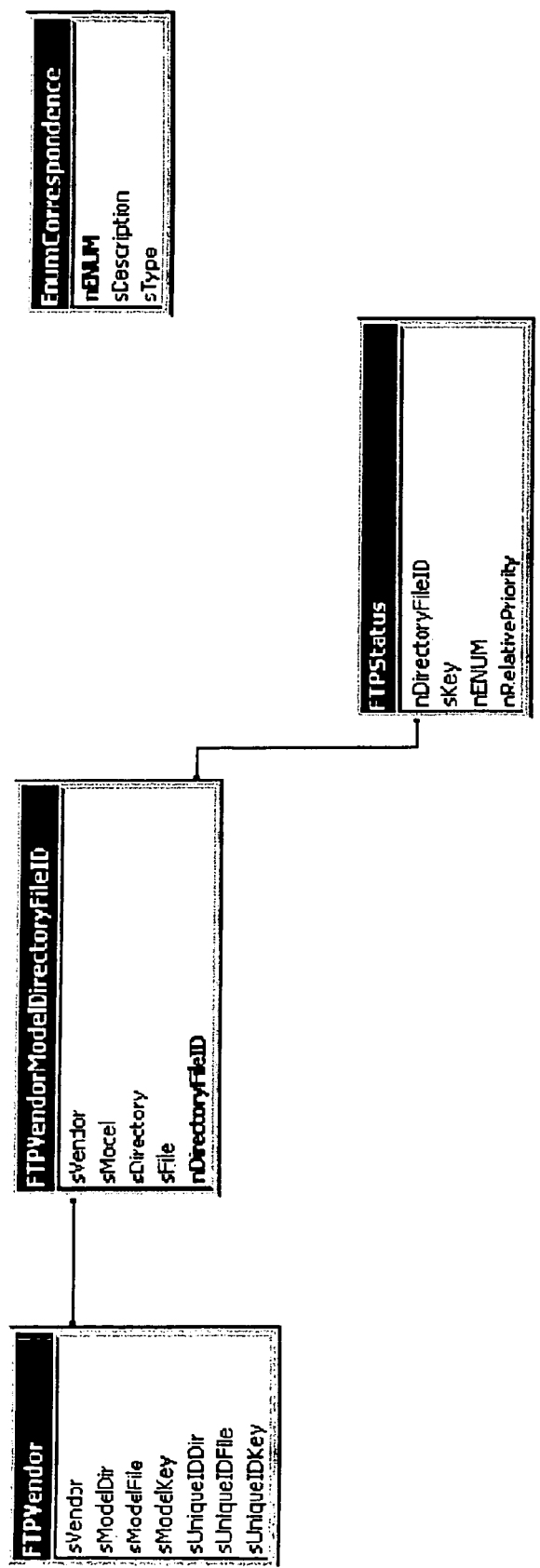

FIGS. 18-20 illustrate the organization of the support database 1024 shown in FIG. 10. The support database, which includes information necessary to extract status information from each monitored device, is organized by communication protocol. Moreover, the support database contains information for determining which protocols are supported by a given vendor and model. For example, FIG. 18, which illustrates the organization of the support database for SNMP-related support information used to extract information from a monitored device, includes SNMPVendor 2002, SNMPComVendorStatus 2004, EnumCorrespondence 2006, and SNMPVendorModelStatus 2008 data structures. A given data structure in the support database may include parameters that uniquely identify the type of status information to be extracted, along with parameters that control the extraction. For example, the SNMPComVendorStatus data structure 2004 include an nENUM field 2009, which identifies the type of information to be extracted (e.g., toner level), and an nRelativePriority field 2010, which indicates the weight or importance of the extracted information relative to other protocols. Thus, if the same information may be extracted from the monitored device using more than one protocol, the nRelativePriority value gives a relative indication of which protocol's extracted value should be used. For example, if HTTP is only able to extract information indicating whether the toner level is "high" or "low" while the SNMP protocol is able to extract the percentage level of toner remaining, the priority level for the toner level for SNMP would be higher than the corresponding value for HTTP. In addition, the support database may provide default priority values for an entire protocol. In one embodiment, the SNMP protocol is given a priority value of 10,000 in a system in which protocol values may range from 0 to 32,000.

FIGS. 19 and 20 illustrate the data structures included in the HTTP and FTP portions of the support database 1024 and includes data structures analogous to the data structures described above with regard to FIG. 18. The EnumCorrespondence data structure shown in FIGS. 18-20 is shared by the data structures for all of the protocols in the support database and is the same data structure shown in FIG. 17.

In FIG. 19, two sets of data structures are shown for using the HTTP protocol to obtain information from the monitored devices. One set, which is labeled using the "Tag" prefix, provides support information to extract information located between tags in web pages of a monitored device. The second set of data structures, which is labeled using the "Script" prefix, provides support information to extract information contained in Java scripts in web pages of a monitored device.

FIG. 20 shows data structures containing support information used to extract information from FTP files of a monitored device.

Exemplary enum types used by the present invention is the infoType defined below. (The enum types are merely exemplary and therefore should not be construed as limiting the present invention.)

infoType (typedef int infoType)

This section describes the definition of the infoType (int). The value range 0 through 99 is assigned to the data type. The value range 100 to 499 is assigned to Device Information. The value range 500 to 1999 is assigned to the common parameters including standard MIB parameters. The range 2000 to 3999 is assigned to Ricoh-specific information. The range 4000 to 4999 is assigned to Xerox. The range 5000 to 5999 is assigned to Lexmark. The range 6000 to 6999 is assigned to HP. The values are defined as follows:

infoType {eNotDefine=0, eDeviceInformation=1, eStatusInformation=2, eVendor=100, eModel, eUniqueID, eIPAddress, eCompanyName, eStreet, eCity, eState, eZipCode, eLocation, eContactPerson, ePhoneNumber, eEMailAddress, eDateTime=500, eHrDeviceErrors, eLowPaper, eNoPaper, eLowToner, eNoToner, eDoorOpen, eJammed, eOffline, eServiceRequested, ePrtGeneralConfigChanges=600, ePrtLifeCount, ePrtAlertDesc1, ePrtAlertDesc2, ePrtAlertDesc3, ePrtAlertDesc4, ePrtAlertDesc5, eBlack=700, eMagenta, eCyan, eYellow, eTonerCollector=800, eBlackDeveloper=810, eColorDeveloper, eFuser=820, eDrum=830, eTransfer=840, eMaintenanceKit=850, eOilKit=860, eStationInfo1=901, eStationInfo2, eStationInfo3, eStationInfo4, eStationInfo5, eRicohEngineCounterTotal=2000, eRicohEngineCounterPrinter, eRicohEngineCounterFax, eRicohEngineCounterCopier}.

EerrorCode

The following codes are merely exemplary, and more codes may be added to the existing set. The range 0-99 is reserved. The range 100-199 is for SMTP, 200-299 is for POP3, 300-399 is for Socket, and 400-499 is for HTTP, and 500-599 is for FTP. Other ranges not specified may be defined by a user, if needed.

enum EerrorCode(eNoError=0, eUnknownError=1, eSomeError, eCompleteFailure, eSomeDeviceCreationError=20, eCreateDeviceError, eNoDeviceCreated, eObtainConfigError, eSaveStatusError, eObtainUniqueIDError, eObtainStatusError, eStartSendError, eSomeDataSendError, eCompleteDataSendFailure, eEndSendError, eSendHeloCommandFailed=100, eSendMailCommandFailed, eSendRcptCommandFailed, eSendDataCommandFailed, eSendDataFailed, eSendQuitCommandFailed, eSendUserCommandFailed=200, eSendPassCommandFailed, eSendStatCommandFailed, eSendRetrCommandFailed, eSendDeleCommandFailed, eSendQuitPop3CommandFailed, eCreateSocketFailed=300, eConnectSocketFailed, eBadRequest=400, eUnauthorized, ePaymentRequired, eForbidden, eNotFound, eMethodNotAllowed, eNotAcceptable, eProxyAuthenticationRequired, eRequestTimeOut, eConflict, eGone, eLengthRequired, ePreconditionFailed, eRequestEntityTooLarge, eRequestURITooLarge, eUnsupportedMediaType, eRequestedRangeNotSatisfiable, eExpectationFailed, eInternalServerError=450, eNotImplemented, eBadGateway, eServiceUnavailable, eGatewayTimeOut, eHTTPVersionNotSupported, eMultipleChoices=480, eMovedPermanently, eFound, eSeeOther, eNotModified, eUseProxy, eTemporaryRedirect).

Abstract Classes in the HWaccess Module

Figure 21:
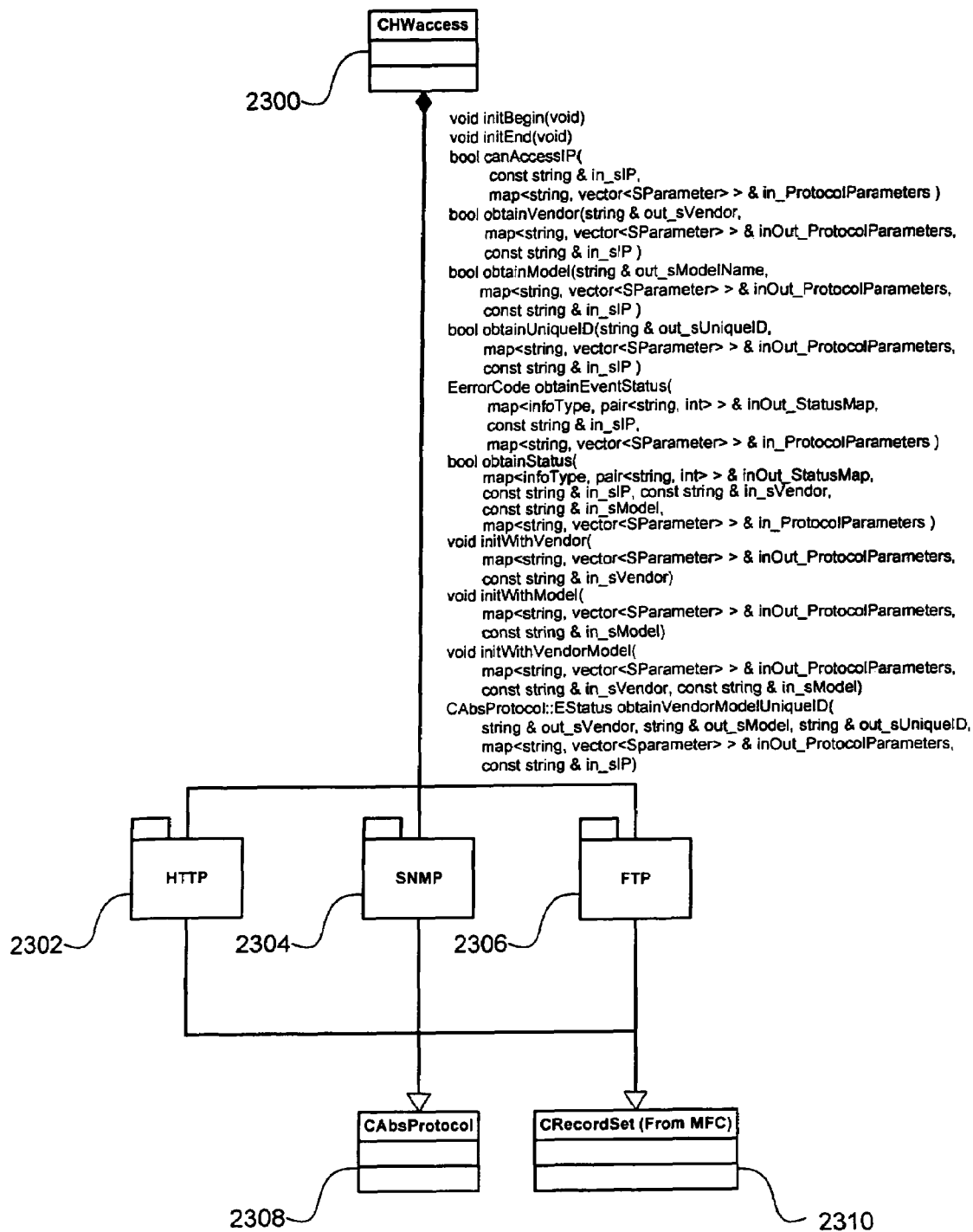
FIG. 21 illustrates the class structure of the HWaccess module according to one embodiment of the present invention.

FIG. 21 shows the package diagram for the HWaccess package. This package is responsible for identifying the network devices to be monitored and obtaining information about the network devices using various network protocols (e.g. SNMP, HTTP, and FTP). The package contains the packages HTTP 2302, SNMP 2304, and FTP 2306 and the classes CHWaccess 2300, CAbsProtocol 2308, and CRecordSet 2310. The packages HTTP 2302, SNMP 2304, and FTP 2306 implement the network protocols to access the network devices to obtain information from them. For example, the HTTP package 2302 implement the HTTP protocol to access the web pages of the network devices to obtain information from the web pages. The class CHWaccess 2300 manages all the protocol packages to obtain the necessary information from the network devices. The class CAbsProtocol 2308 is an abstract class representing any protocol. This class provides the interface between CHWaccess 2300 and the protocol packages. The class CAbsProtocol 2308 provides a set of common functions as shown in FIG. 21 to CHWaccess 2300 in which all protocols will provide CHWaccess 2300 the necessary information. The classes derived from CAbsProtocol 2308 as described in later figures will provide the method for each of the functions for the appropriate protocols. The class CRecordSet 2310 is a class of the Microsoft Foundation Class that provides each of the protocol package access to the database to obtain information about which vendor and model of network devices are supported and what information to obtain from those network devices. See Appendix 1 for the class specification of CAbsProtcol.

Each of the protocol packages, HTTP 2302, SNMP 2304, and FTP 2306, as described in FIG. 21, contain a class that manages the access to the network device to obtain information from the device. The class is derived from the abstract class CAbsProtocol 2308 which provides for the method of implementing the protocols to access information from the network device. An abstract class only provides the interface functions but does not perform any process. The classes derived from the abstract class provide the method to perform the process for the interface functions. There can be many derived classes of the abstract class so that the different derived classes can perform the process of the interface function differently. For example, an interface function of CAbsProtocol is obtainStatus( ). The derived class CSNMPProtocol shown in FIG. 31 will contain the function obtainStatus( ) which provides the method to obtain the status information of a network device using SNMP while the derived class CHTTPProtocol shown in FIG. 33 will contain the function obtainStatus( ) which provides the method to obtain the status information of a network device using HTTP. From the design of the HWaccess package, a new protocol can be added to the system by adding a new package that contains a derived class of CAbsProtocol that manages the new package to access the network device using the new protocol. The abstract class allows for the future expansion of the system.

FIG. 22 shows the data structure that is used in the HWaccess package of FIG. 21 to maintain all the protocols to access and to obtain information from the network devices. In FIG. 22, the data structure is a vector 500 of pointers to CAbsProtocol 2308. The class CHWaccess 2300 will contain and use this data structure. Even though the vector 500 will contain pointers to classes derived from CAbsProtocol 2308, CHWaccess 2300 will see the vector as containing pointers to CAbsProtocol 2308 and call the interface functions of CAbsProtocol 2308 through the virtual function call mechanism. In actuality, CHWaccess 2300 will call the interface functions of the derived classes of CAbsProtocol 2308. For example, the pointer to the CAbsProtocol 502 in the first entry in the vector may be a pointer to the derived class CSNMPProtocol shown in FIG. 31, the pointer to the CAbsProtocol 504 in the second entry in the vector may be a pointer to the derived class CHTTPProtocol shown in FIG. 33, and the pointer to the CAbsProtocol 506 in the third entry in the vector may be a pointer to the derived class CFTPProtocol shown in FIG. 32. So when CHWaccess 2300 calls the interface functions of CAbsProtocol 2308 in the vector, it is actually calling the interface functions of CSNMPProtocol, CHTTPProtocol, and CFTPProtocol. The use of the abstract class CAbsProtocol 2308 in the vector 500 allows any protocol to be used to access and obtain information from the network devices. The abstract class CAbsProtocol 2308 hides the detail of what protocol is being used.

Figure 23:
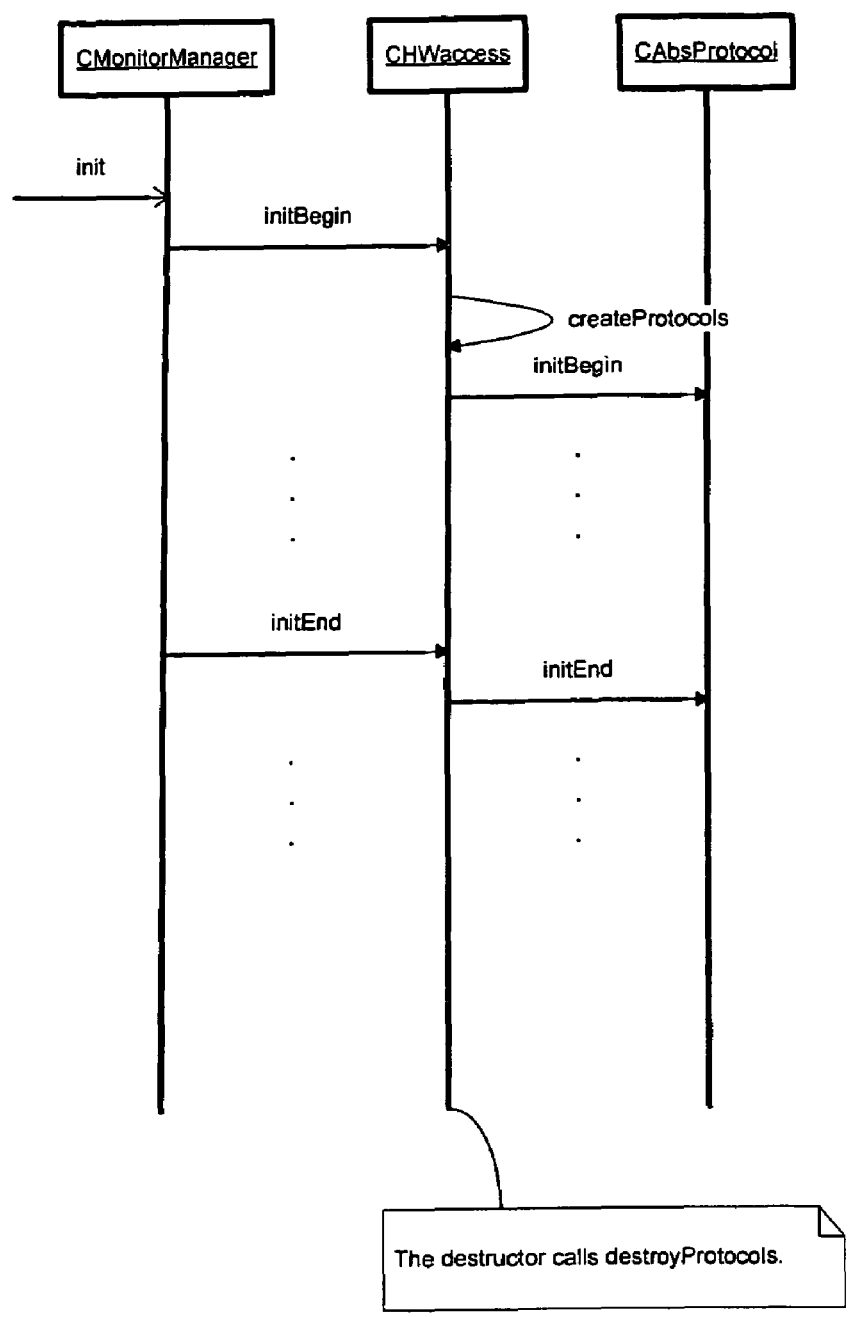
FIG. 23 is a sequence diagram of the initialization of the HWaccess package when init( ) of the Monitor package is called.

FIG. 23 is a sequence diagram that shows the initialization of the HWaccess package when init( ) of the Monitor package is called. All the protocol objects will be created and initialized to access information from the devices to be monitored. The calling of the function initBegin( ) of CHWaccess will create all the protocol objects (all derived from CAbsProtocol). initBegin( ) of each protocol object will be called to initialize its support information used to determine the vendor, model, and unique ID of the monitored devices. Before initEnd( ) of CHWaccess is called, functions of CHWaccess and the protocol objects will be called to access the device and obtain and initialize vendor, model, and unique ID information of the device for all the protocols. By the time initEnd( ) of CHWaccess is called, each protocol object has all the information it needs to obtain the status information for the monitored devices which the protocol supports. initEnd( ) of each protocol object will clean up all the data structures it does not need after its initialization.

Figure 24:
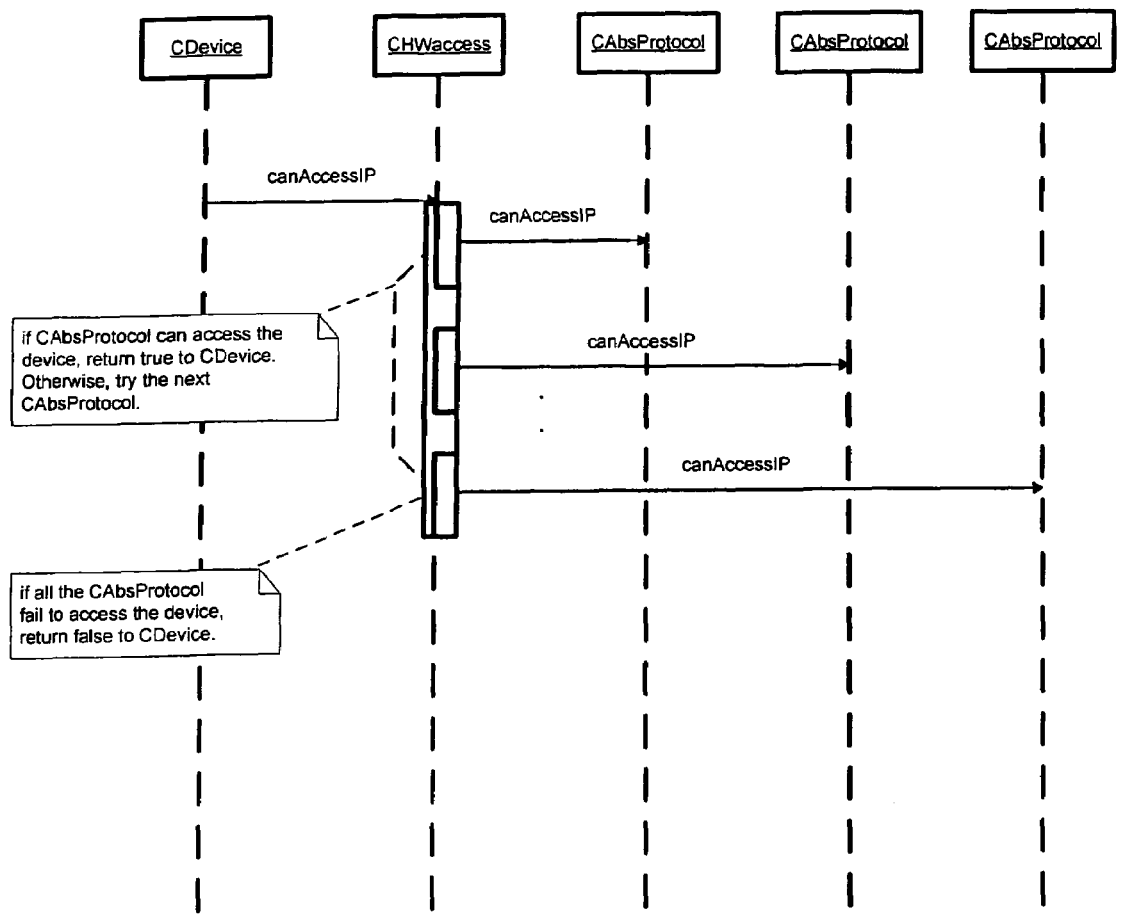
FIG. 24 is a sequence diagram of canAccessIP( ) of the HWaccess package to determine if the device is accessible by any protocol.

FIG. 24 is a sequence diagram that shows canAccessIP( ) of the HWaccess package to determine if the device is accessible by any protocol. CHWaccess will call canAccessIP( ) of each protocol object until one of the protocol objects can access the device corresponding to the IP address. If none of the protocol objects can access the device, canAccessIP( ) of CHWaccess returns false and the device will not be monitored.

Figure 25A:
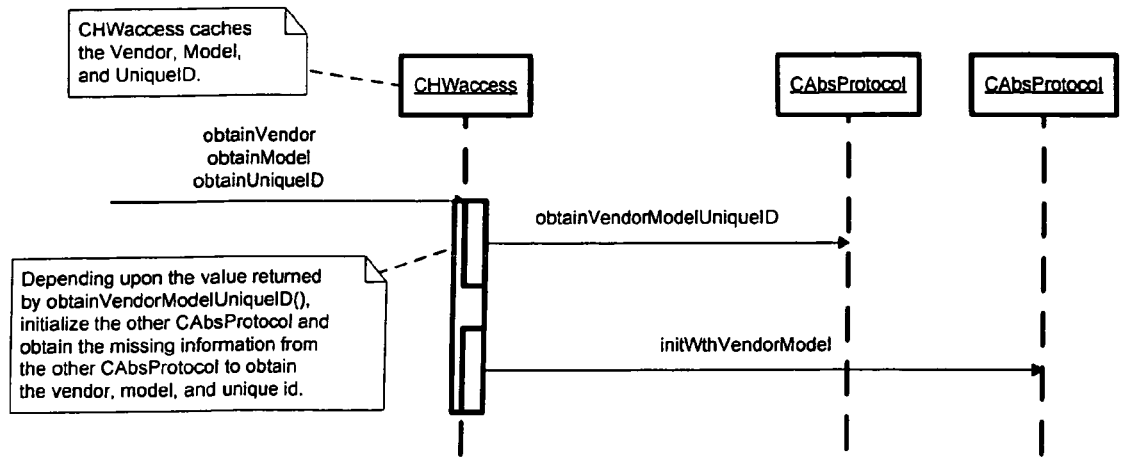
FIGS. 25A and 25B are the sequence diagrams of the obtainVendor( ), obtainModel( ), and obtainUniqueID( ) functions of the HWaccess package.
Figure 25B:
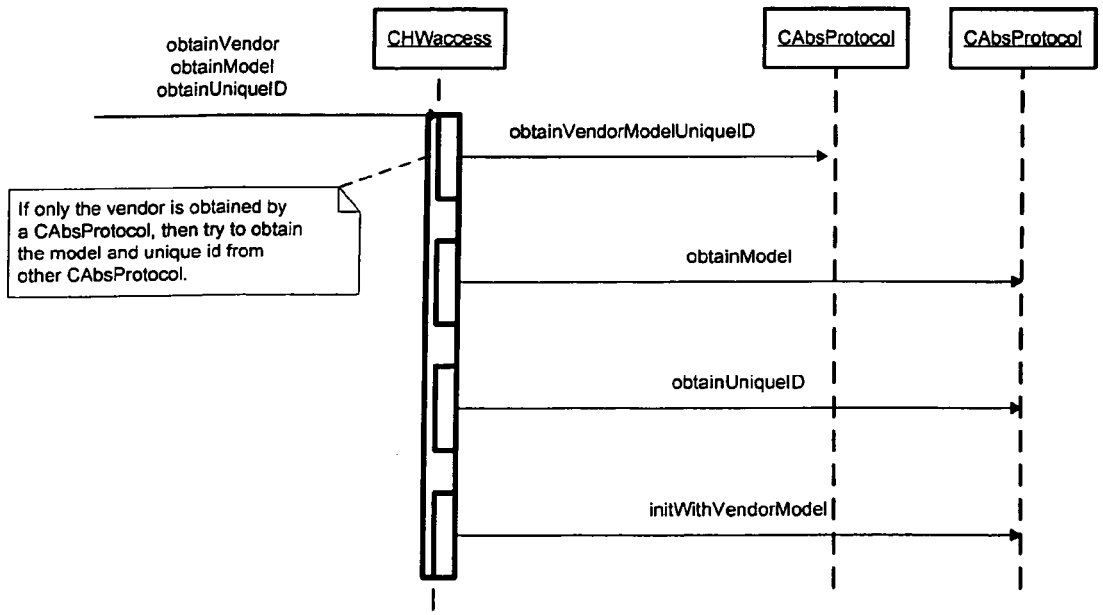

FIGS. 25A and 25B are two sequence diagrams that show two different scenarios for obtaining the vendor, model, and unique ID of the device from a protocol object and initializing the other protocol objects with vendor and model information. Once a protocol object obtains the vendor and model information of the device, the protocol object updates its support for the device so it can obtain status information from the device. The other protocol objects will need to receive information about the vendor and model of the device so they can update their support for the device so they can obtain status information from the device. obtainVendor( ), obtainModel ( ), and obtainUniqueID( ) of CHWaccess are called in both FIGS. 25A and 25B. CHWaccess will use as many of the protocol objects as necessary to obtain the vendor, model, and unique ID of the device and to initialize all the other protocol objects with vendor and model information. CHWaccess will keep the vendor, model, and unique ID information for a given IP address of the device. In one scenario of FIG. 25A, CHWaccess calls obtainVendorModelUniqueID( ) of a protocol object and gets all the information from the protocol object. CHWaccess will then initialize all the other protocol objects with the vendor and model information by calling initWithVendorModel( ) of all the other protocol objects. In another scenario of FIG. 25B, CHWaccess calls obtainVendorModelUniqueID( ) of a protocol object and gets only the vendor from the protocol object. Then CHWaccess calls obtainModel( ) and obtainUniqueID( ) of another protocol object to obtain the model and unique ID. CHWaccess will then initialize all the other protocol objects with the vendor and model information by calling initWithVendorModel( ) of all the other protocol objects.

Figure 26:
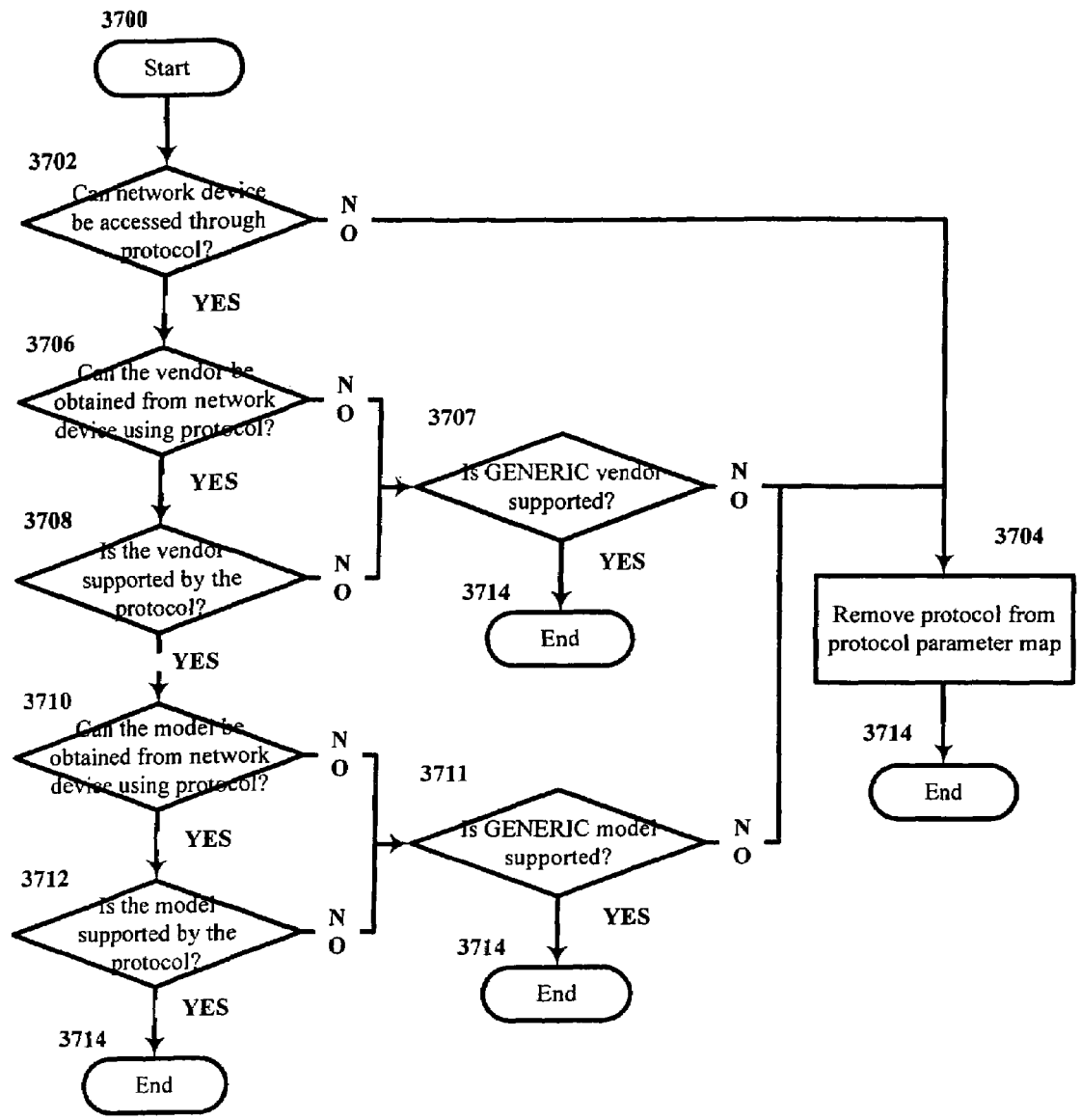
FIG. 26 shows a flowchart describing how the data structure used by the software objects representing the monitored devices is updated to determine which protocols are used to obtain status information for a monitored device according to one embodiment of the present invention.

FIG. 26 shows a flowchart describing how the Protocol Parameter Map 1800 of FIG. 16 is updated to determine which protocols are used to obtain the status information from a network device. The steps in FIG. 26 are performed to obtain the vendor name and the model name of a network device for a protocol. In step 3702, a check is made to determine if the network device can be accessed using a protocol. The network device is accessed through the protocol using the information in the map 1800. If the network device cannot be accessed through the protocol, the protocol is removed from the protocol parameter map 1800 in step 3704 and the updating of the map 1800 is completed in step 3714. If the network device can be accessed through the protocol, then in step 3706 a check is made to determine if the vendor of the network device can be obtained using the protocol. If the vendor cannot be obtained, then in step 3707 a check is made if GENERIC vendor is supported by the protocol. Support for GENERIC vendor for a protocol means that a protocol can obtain status information that is common to all devices (common status information) even if it cannot obtain or does not support the vendor of the devices. If GENERIC vendor is not supported by the protocol, then the protocol is removed from the protocol parameter map 1800 in step 3704 and the updating of the map 1800 is completed in step 3714. If GENERIC vendor is supported by the protocol, then the protocol remains in the protocol parameter map 1800 and the updating of the map is completed in step 3714. If the vendor can be obtained in step 3706, then in step 3708 a check is made to determine if the vendor of the network device is supported by the protocol. If the vendor is not supported by the protocol, then in step 3707 a check is made if GENERIC vendor is supported by the protocol. The sequence of steps following step 3707 is discussed above.

If the vendor is supported by the protocol, then in step 3710 a check is made to determine if the model of the network device can be obtained using the protocol. If the model cannot be obtained, then in step 3711 a check is made if GENERIC model is supported by the protocol. Support for GENERIC model for a protocol means that a protocol can obtain status information that is common to all devices of a vendor (vendor specific status information) even if it cannot obtain or does not support the model of the devices. If GENERIC model is not supported by the protocol, then the protocol is removed from the protocol parameter map 1800 in step 3704 and the updating of the map 1800 is completed in step 3714. If GENERIC model is supported by the protocol, then the protocol remains in the protocol parameter map 1800 and the updating of the map is completed in step 3714. If the model can be obtained in step 3710, then in step 3712 a check is made to determine if the model of the network device is supported by the protocol. If the model is not supported by the protocol, then in step 3711 a check is made if GENERIC model is supported by the protocol. The sequence of steps following 3711 is discussed above. If the model is supported by the protocol, then the protocol can be used to obtain status information for the network device and the updating of the protocol parameter map 1800 is completed in step 3714. If the vendor and model are not obtained or not supported, then the protocol is removed from the protocol parameter map 1800 and the protocol is not used to obtain status information. There are variations to the process shown in FIG. 26 depending on the protocol. Whereas HTTP and FTP follow the description in the flowchart, SNMP will be supported and used to obtain the status information even though the vendor is supported but the model and generic model are not supported.

As discussed above, status information can be obtained by SNMP from the network device even if the vendor and model are not obtained or supported. As long as the network device supports SNMP and can be accessed by SNMP, information can be obtained from the Management Information Base (MIB) of the network device. In step 3702, if the network device cannot be accessed through SNMP, then the SNMP protocol may be removed from the protocol parameter map 1800 in step 3704. However, if the network device can be accessed through SNMP, then the SNMP protocol remains in the protocol parameter map 1800 whether or not the vendor or model is obtained and supported. Network devices that support SNMP provide a MIB so that the remote system can always obtain information from the devices. However, the type and number of information that can be obtained from the network device depends upon if the vendor and model are obtained and supported. More information can be obtained from the network device by SNMP is the vendor and model are obtained and known. If the vendor and model cannot be obtained, SNMP is still able to obtain information that all devices can provide, such as the system description or the time the system has been running. SNMP can be used to obtain information from the network device under the three conditions: (1) vendor and model are supported, (2) vendor supported but model not supported, and (3) vendor and model are not supported. HTTP and FTP do not have the characteristics as SNMP. Where SNMP has a standard MIB that all network devices can follow so that information can be obtained, web pages and FTP files will vary among network devices of different vendors and models. There is no standard for web pages and FTP files which network devices follow to obtain information.

Figure 27:
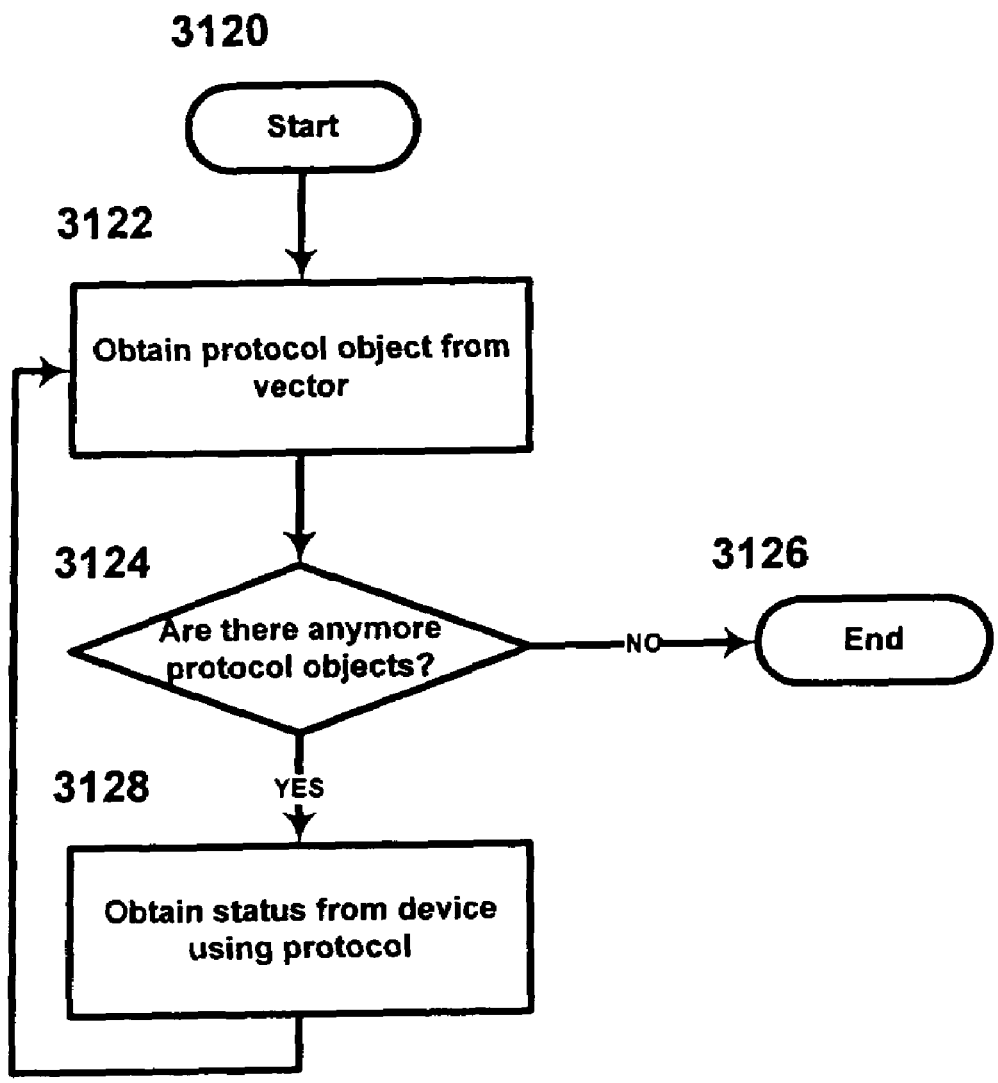
FIG. 27 shows a flowchart describing the process of obtaining status information from a monitored device using all of the communication protocols according to one embodiment of the present invention.

FIG. 27 shows a flowchart describing the process of obtaining status information about the network devices using all the protocols. After the protocol objects have been initialized with information about the vendor and model of network devices it supports as described in FIGS. 25A and 25B, the protocol objects can be used to obtain status information from the network devices. The protocol objects contain information about how to obtain status information for given vendors and models using the data structures containing information from the support database of FIGS. 18, 19, and 20. The vector of pointers to CAbsProtocol 2308 described in FIG. 22 is used to obtain the status information for all the protocol objects. The process of the flowchart will step through the vector once. In step 3122, a protocol object is obtained from the vector of pointers to CAbsProtocol. The protocol object corresponds to one of the network protocols to access the network device (e.g. SNMP, HTTP, and FTP). In step 3124, a check is done to see if there are any more protocol objects that can be obtained from the vector. This check is done by determining if the end of the vector has been reached. If no more protocol objects can be obtained, then the system is done in obtaining the status information from the network device using all the protocol objects in step 3126. If there is a protocol object obtained from the vector, then use the protocol object to obtain the status information of the network device in step 3128. After obtaining the status information using the protocol object, obtain more status information using another protocol object by going back to step 3122.

FIG. 28 shows the data structure used to maintain the status information obtained through the various protocols. It does not maintain information about which protocol was used to obtain the status information. The data structure is a map 724. The key 726 to the map 724 is an infoType. infoType is a number representing a type of information. The value 728 to the map 724 is a pair. The pair consists of a string and an integer. The string in the pair is the status information obtained from the network device that corresponds to the infoType. The integer in the pair is the weight or priority of the status information as obtained from a protocol. As an example, for the infoType of 700 that may represent the level of black toner in the printer cartridge, the pair may contain the string "75%" and integer 10000. The string "75%" indicates that 75% of the toner remains in the cartridge and the integer 10000 is the weight or priority of the status information.

CSNMPProtocol 2402, CHTTPProtocol 2502, and CFTP-Protocol 2602 adds status information that it obtains from the network devices to the map 724.

Figure 29:
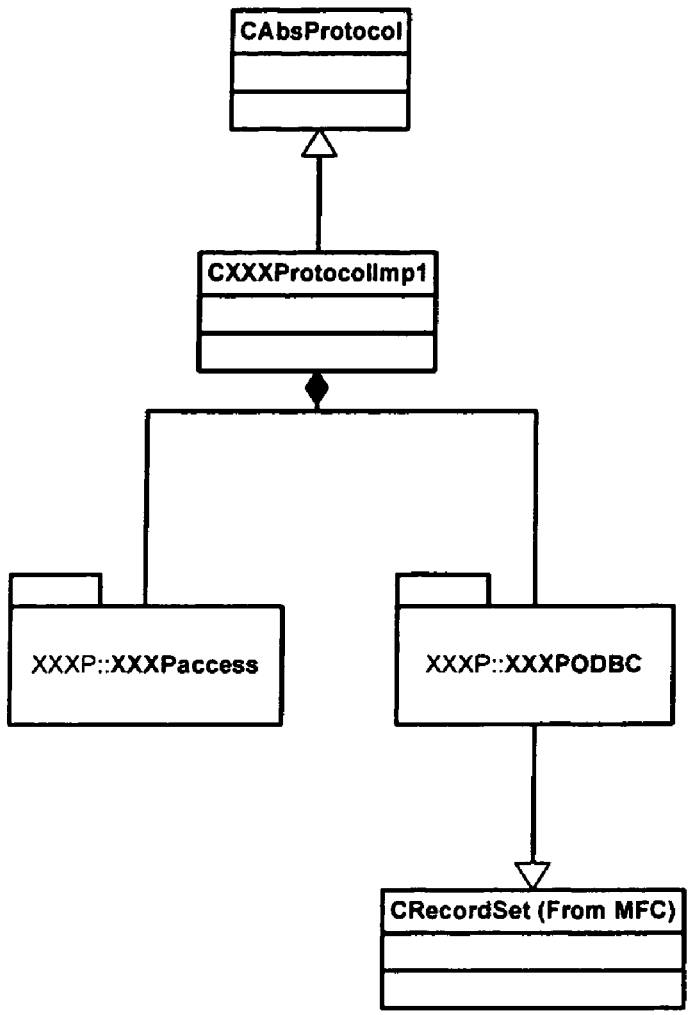
FIG. 29 illustrates a package diagram for each of the protocol packages of FIG. 21, wherein "XXX" refers to HTTP, FTP, or SNMP, for example.
Figure 31:
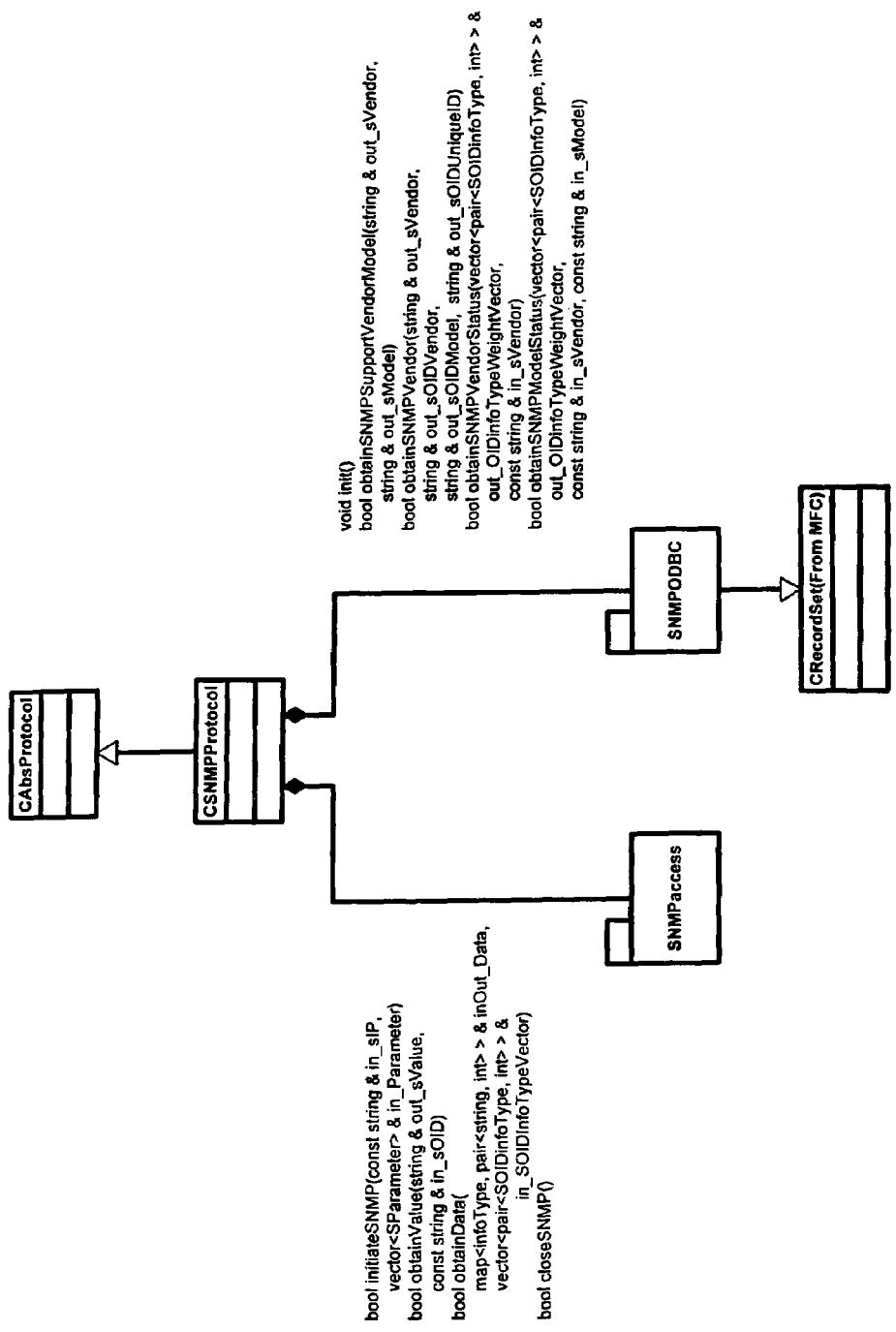
FIG. 31 illustrates the class structure of the SNMP package.
Figure 32:
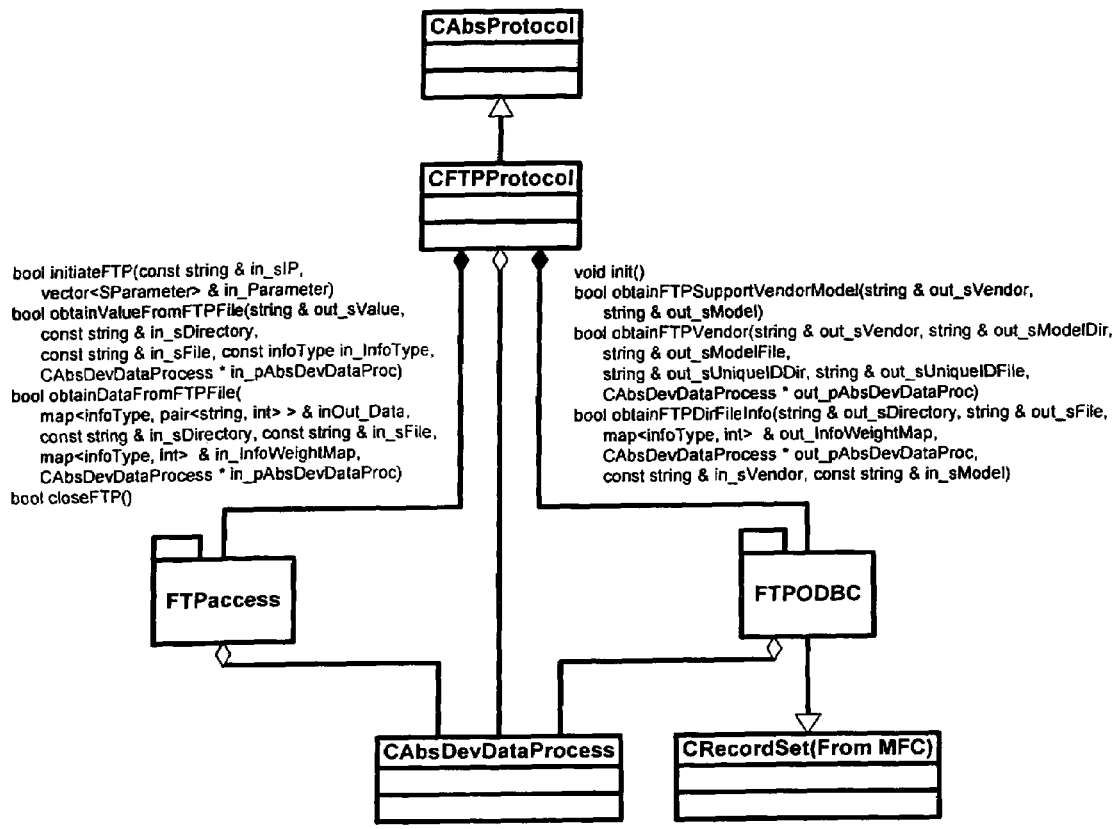
FIG. 32 shows the package diagram for the FTP package.

FIG. 29 shows the package diagram that is used within each of the protocol packages of FIG. 21 wherein XXX is either SNMP, HTTP, or FTP. The abstract class CAbsProtocol provides the interface functions for obtaining information from the devices, but does not provide the method to obtain the information. Classes derived from CAbsProtocol provide the method which makes it convenient to add new protocols for obtaining information from devices. The CXXXProtocolImp1 class is the interface for the XXX package and manages all other classes/packages within the package. Since CXXXProtocolImp1 is derived from CAbsProtocol, this class provides the method to obtain information from the devices for a given protocol. The XXXaccess package implements the protocol to access the device and to obtain information from the device. The XXXODBC package obtains the protocol support information from the support database. This information includes the vendor and the model information the protocol supports, how to obtain information about the vendor, model, and unique identifier from the device, and how to obtain the status information from the device. FIGS. 31 and 32 are specific uses of this package diagram for SNMP and FTP. Any new protocols used to obtain status information from the device will follow this structure for its package diagram. One such new protocol can be web services. Also, different implementations of a protocol can follow this structure for its package diagram.

Figure 30:
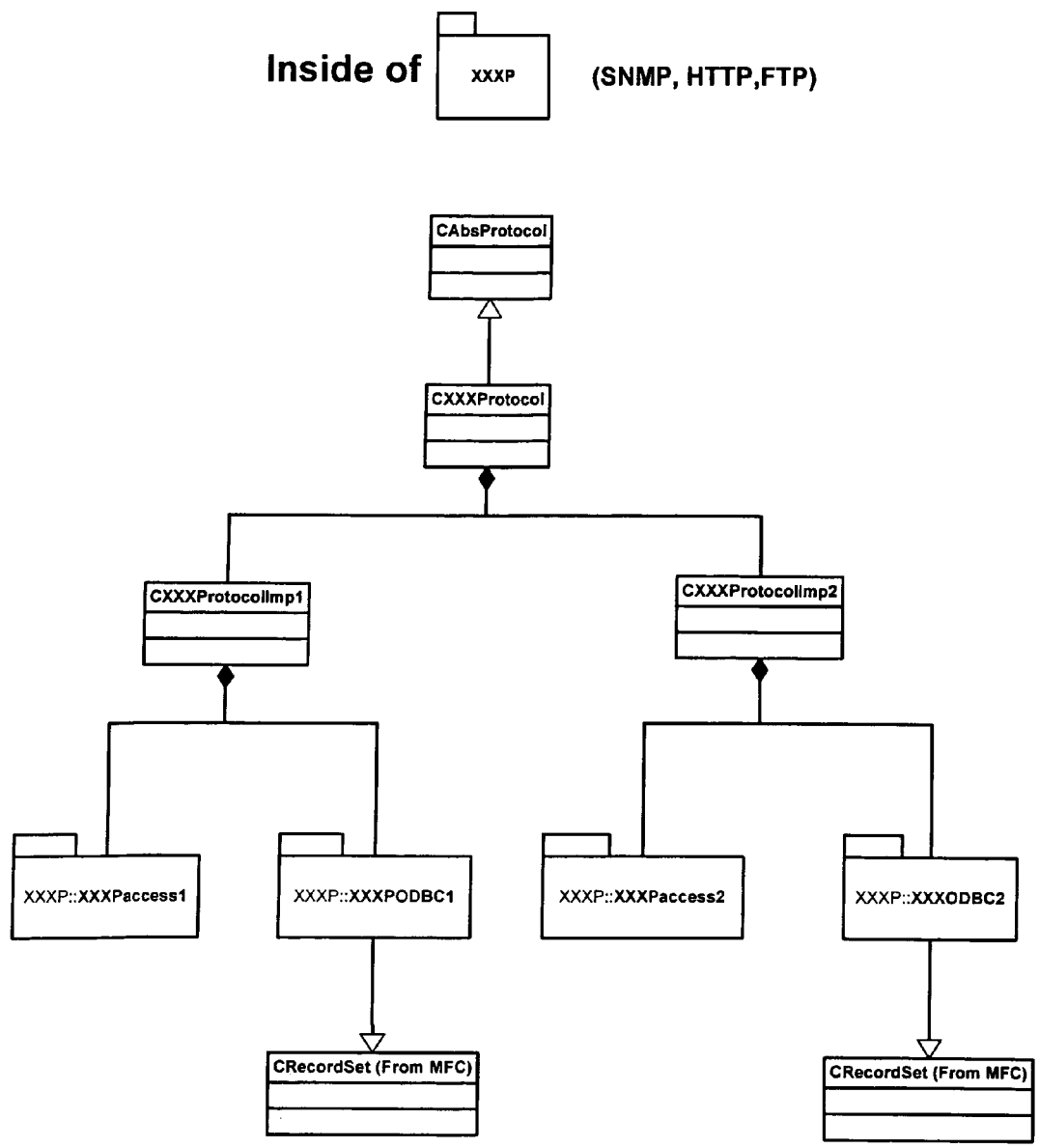
FIG. 30 illustrates an alternative package diagram for each of the protocol packages of FIG. 21, wherein "XXX" refers to HTTP, FTP, or SNMP, for example.
Figure 33:
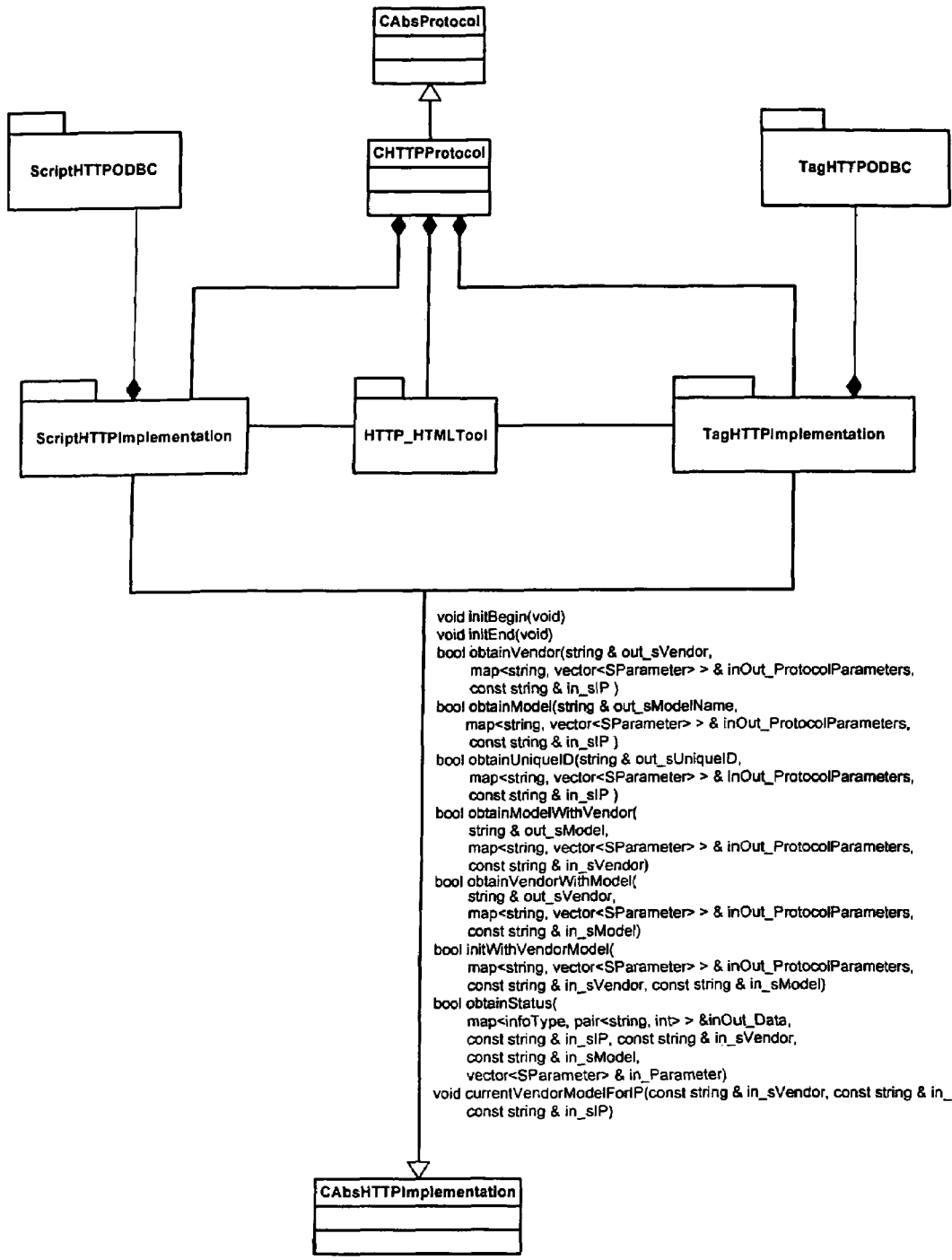
FIG. 33 is the package diagram of the HTTP package supporting the extraction of information from web pages within the script and between tags.

FIG. 30 shows an alternative package diagram that can be used within each of the protocol packages of FIG. 21 where again XXX is either SNMP, HTTP, or FTP. Even though this package diagram can be applied to any of the protocols, the HTTP protocol is used as an example as shown in FIG. 33. This package structure allows for the extension of new implementations of a protocol to obtain information from a device. This is necessary if the existing implementations of the protocols to obtain information do not work for new formats of the information, such as the example web pages of FIGS. 40 and 42 which require another implementation of HTTP. The abstract class CAbsProtocol is also used by this package diagram as shown in FIG. 29. The CXXXProtocol class is derived from CAbsProtocol. CXXXProtocol provides an interface for the XXX package and manages all the classes corresponding to different methods in obtaining information from the devices.

The classes CXXXProtocolImp1 and CXXXProtocolImp2 implement two different methods for obtaining information using the same protocol. The CXXXProtocolImp1 class provides one implementation to obtain information from a device and uses the packages XXXaccess1 and XXXODBC1. The XXXaccess1 package implements the protocol to access the device and to obtain information from the device. The XXXODBC1 package obtains the protocol support information from the database. This information includes the vendor and model that the protocol supports, how to obtain information the vendor, model, and unique identifier from the device, and how to obtain the status information from the device. The CXXXProtocolImp2 class provides another implementation to obtain information from the device using the same protocol as CXXXProtocolImp1. CXXXProtocolImp2 uses the packages XXXaccess2 and XXXODBC2. The XXXaccess2 package implements the protocol to access the device and to obtain information from the device. The XXXODBC2 package obtains the protocol support information from the database just as XXXODBC1. The design of this package allows for new implementations of the protocol. When a new implementation is needed, another implementation class will be added along with its supporting package for accessing the device using the protocol and obtaining information from the support database. Embodiments of the present system will work with the existing implementations to obtain information from devices it already supports along with the new devices with the new implementation.

The package diagrams for SNMP and FTP follow the package structure of FIG. 29 and are shown in FIG. 31 and FIG. 32. The package diagram for HTTP of this system follows the package structure of FIG. 30 and is shown in FIG. 33.

FIG. 31 shows the package diagram for a first embodiment of the SNMP package 2304. This package is responsible for determining the vendor and model of network devices supported by the SNMP protocol and the information to be obtained from the network devices by SNMP protocol, and for accessing the network device through the SNMP protocol to obtain information from the network devices. The package contains the packages SNMPaccess and SNMPODBC and the class CSNMPProtocol and uses the classes CAbsProtocol 2400 and CRecordSet 2408 as described in FIG. 21. The SNMPaccess package implements the SNMP protocol to access the network devices and to obtain information from the network devices. The SNMPODBC package accesses and obtains information from the database about vendor and model of network devices supported by the SNMP protocol and the information to be obtained from the network devices by SNMP protocol. The CSNMPProtocol class is a class derived from the CAbsProtocol class 2400. CSNMPProtocol obtains the necessary information from the network devices using the SNMP protocol. CSNMPProtocol provides the method for all the interface functions of CAbsProtocol 2400 as described in FIG. 21. FIG. 31 also shows the functions of the packages SNMPaccess and SNMPODBC that CSNMPProtocol uses. The SNMPODBC package uses the class CRecordSet to obtain information from the database.

FIG. 32 shows the package diagram for the FTP package 2306. This package is responsible for determining the vendor and model of network devices supported by the FTP protocol and the information to be obtained from the network devices by FTP protocol, and for accessing the network devices through the FTP protocol to obtain information from the network devices. The package contains the packages FTPaccess and FTPODBC and the class CFTPProtocol and uses the classes CAbsProtocol 2600 and CRecordSet 2608 as described in FIG. 21. The FTPaccess package implements the FTP protocol to access the network devices and to obtain information from the network devices. The FTPODBC package accesses and obtains information from the database about the vendor and the model of network devices supported by the FTP protocol and the information to be obtained from the network devices by FTP protocol. The CFTPProtocol class is a class derived from the CAbsProtocol class 2600. CFTPProtocol obtains the necessary information from the network devices using the FTP protocol. CFTPProtocol provides the method for all the interface functions of CAbsProtocol 2600 as described in FIG. 21. FIG. 32 also shows the functions of the packages FTPaccess and FTPODBC that CFTPProtocol uses. The FTPODBC package uses the class CRecordSet to obtain information from the database.

FIG. 33 shows a package diagram for the HTTP package, which is based on the package diagram shown in FIG. 30. The package contains two implementations of HTTP to obtain information from the web pages. This package uses the abstract class CAbsProtocol as describe in FIG. 21 above. The CHTTPProtocol class is derived from CAbsProtocol.

Figure 40:
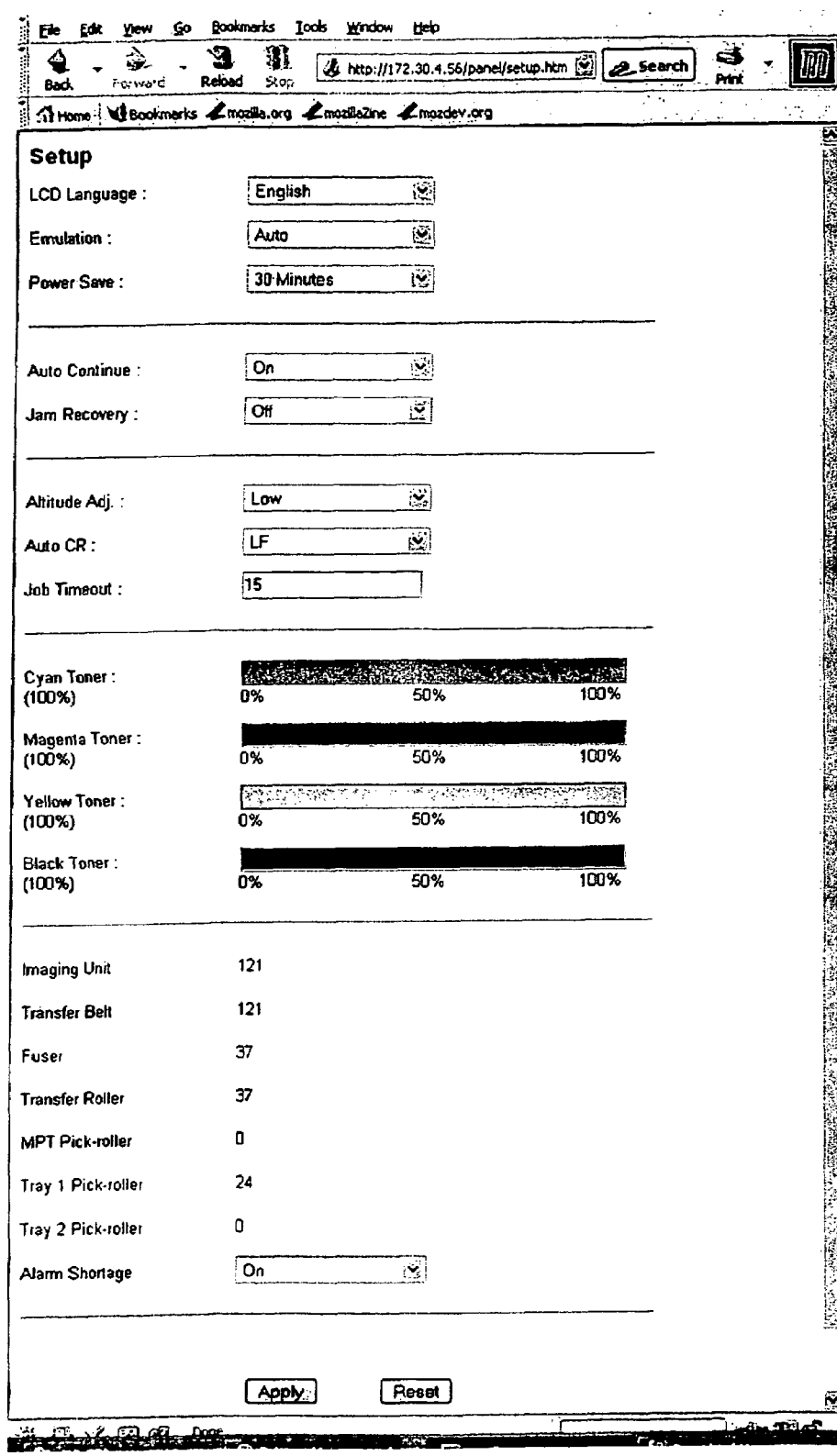
FIG. 40 is a sample of the web page of a device for which the system will extract the status information.
Figure 42:
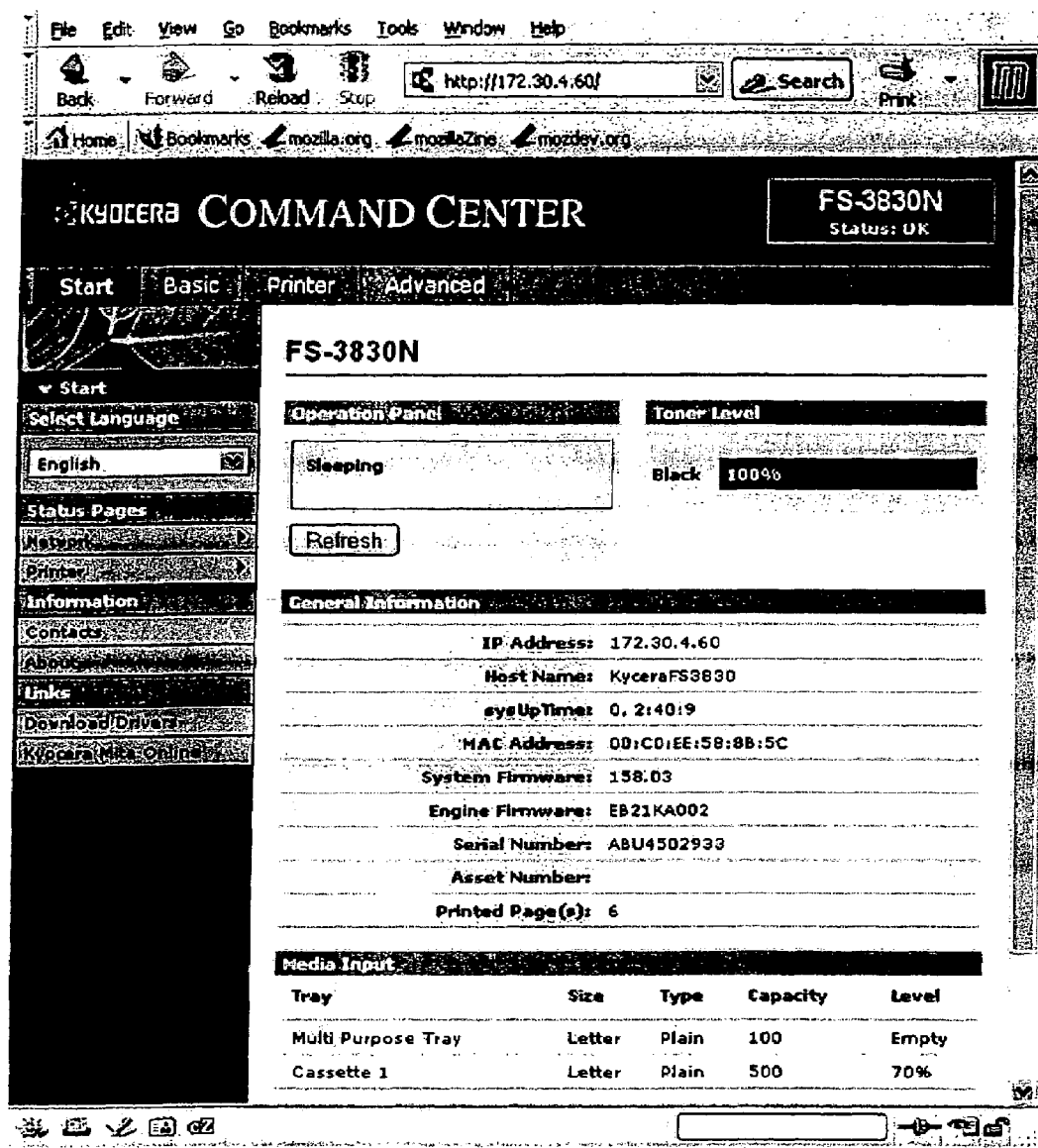
FIG. 42 is another sample of the web page of a device for which the system of the present invention will extract the status information.

CHTTPProtocol is the interface for the HTTP package and manages the packages corresponding to two different implementations of HTTP to obtain information from the devices. The TagHTTPImplementation package is the implementation of HTTP to obtain information from between the tags of the web page of a device. The TagHTTPImplementation package was described as an embodiment of related U.S. patent application Ser. No. 11/032,039, in which the package was called SecondHTTPImplementation. The TagHTTPImplementation package uses the TagHTTPODBC package to obtain support information from the database about the devices supported and how to obtain the information from the devices. The ScriptHTTPImplementation package provides another implementation of HTTP to obtain information from within the java script of the web page of a device, such as shown in FIGS. 40 and 42. The ScriptHTTPImplementation package uses the ScriptHTTPODBC package to obtain support information from the database about the devices supported and how to obtain the information from the device. The second implementation of HTTP by the ScriptHTTPImplementation package handles the problem of obtaining information from a device when the information is within the java script of the web page. HTTP_HTMLTool is shown as a package, but it is a namespace that contains objects that are used by the two implementation packages. By using a namespace, the objects it contains can be used within the HTTP package. This allows all the classes and packages of HTTP to share the objects of the namespace. The HTTP package contains the abstract class CAbsHTTPImplementation that provides the interface for obtaining information about the device by HTTP. Appendix 2 shows the class specification for CAbsHTTPImplementation. Classes derived from CAbsHTTPImplementation provide the method to actually obtain the information. The TagHTTPImplementation and ScriptHTTPImplementation packages contain a class derived from CAbsHTTPImplementation that defines the method to obtain the information. The design of the HTTP package allows for future extension. If the current implementations cannot obtain information from the web pages of a device, then the design for a new implementation can be added by adding an implementation and the ODBC package.

In FIG. 34, the map structure m_ImplementationMap of the CHTTPProtocol class is shown with sample entries. The key to the map structure m_ImplementationMap is a pointer to the CAbsHTTPImplementation class. Though the key is a pointer to the abstract class CAbsHTTPImplementation, the pointer will actually point to a derived class of CAbsHTTPImplementation. FIG. 34 shows two sample entries in the map corresponding to two derived classes of CAbsHTTPImplementation, CTagHTTPImplementation, and CScriptHTTPImplementation. The value to the map is a boolean indicating if the implementation class pointed to in the key will be used. This map is initialized when the constructor of CHTTPProtocol is called as the system starts up. The map is populated with all the different implementations of HTTP that obtains information and its boolean value is set to false. During the discovery process (initialization) of determining which devices are being monitored, it will be determined which implementations are needed. If an implementation is needed to obtain information from the devices, then the boolean value is set to true. After the discovery process is completed, if the boolean value corresponding to an implementation is false, the implementation is removed from the map.

In FIG. 35, the map structure m_VendorModelSupportMap of the CHTTPProtocol class is shown with sample entries. This map is used to determine which implementations of HTTP to use to obtain information for a specific vendor and model of a monitored device. The key to the map is a string containing the concatenation of the vendor and model name. The value corresponding to the key is a vector of pointers to the abstract class CAbsHTTPImplementation. The pointers actually point to one of the derived classes of CAbsHTTPImplementation. The vector contains all the implementations of HTTP to obtain status information for a vendor and model. The map m_VendorModelSupportMap is populated during the discovery process (initialization) of the system.

Figure 36A:
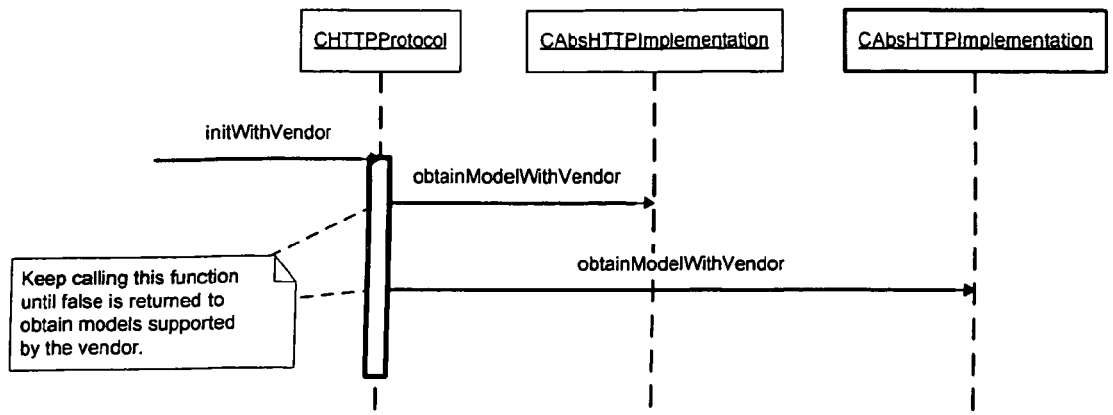
FIGS. 36A, 36B, and 36C illustrate the sequence diagram for the initWithVendor( ), initWithModel( ), and initWithVendorModel( ) function of CHTTPProtocol.
Figure 36B:
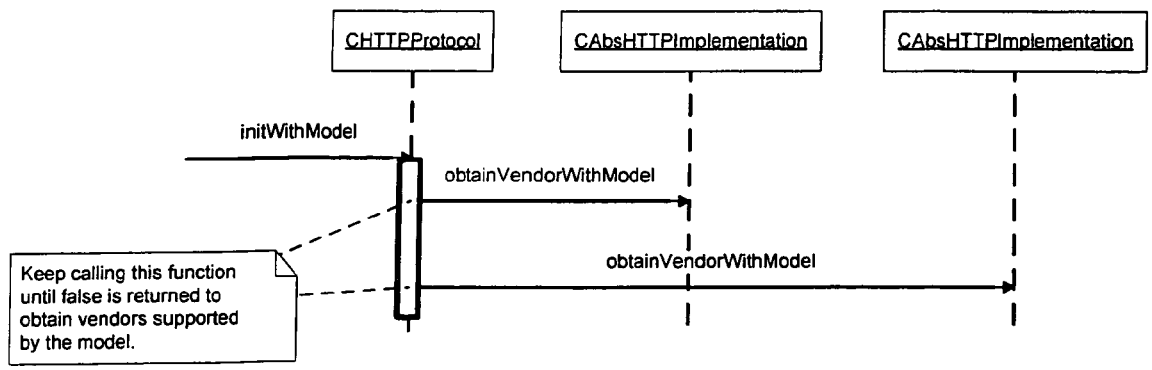
Figure 36C:
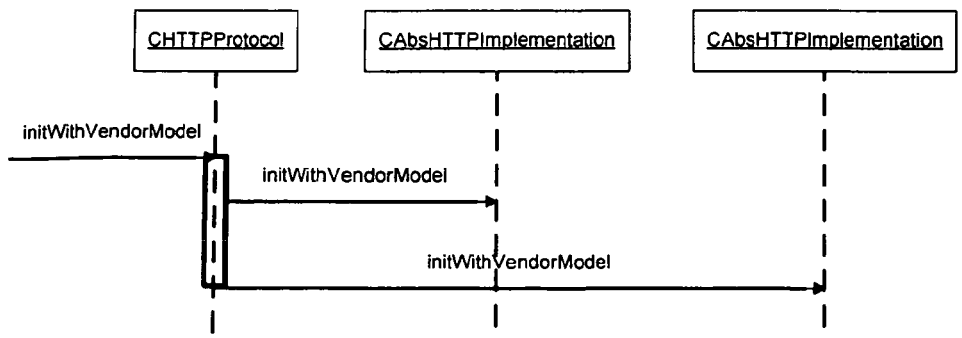

In FIGS. 36A, 36B, and 36C, the sequence diagrams show the process for the initWithVendor( ), initWithModel( ), and initWithVendorModel( ) function of CHTTPProtocol. These functions initialize all the implementations of the HTTP protocol so that each implementation will have information to obtain status of a device of a specific vendor, specific model, or specific vendor and model. These functions are called whenever another protocol such as SNMP or FTP discovers the vendor and/or model of the device and the HTTP protocol object needs to be initialized with the vendor and/or model to see if there is HTTP support for the device.

Figure 37:
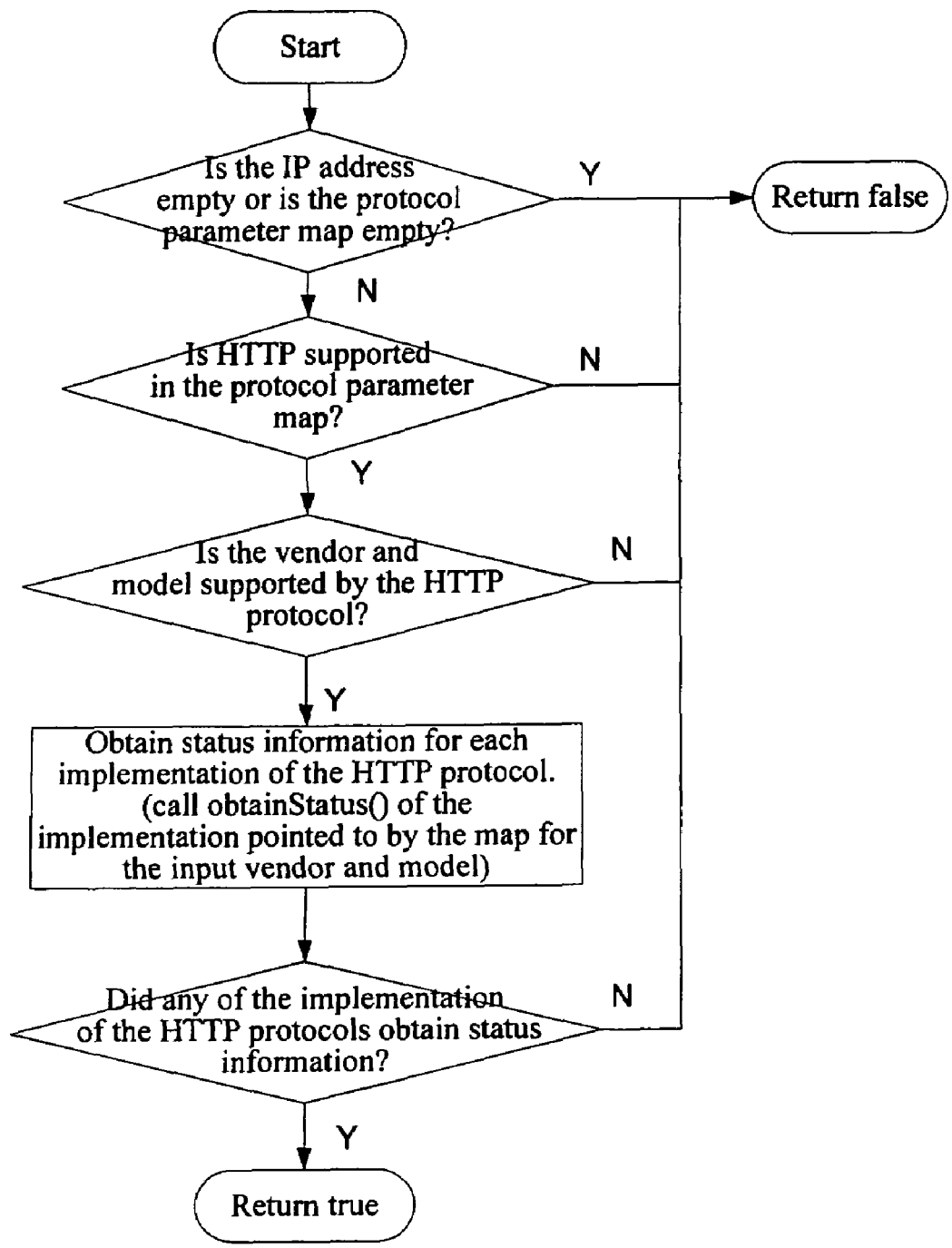
FIG. 37 is a flowchart for obtaining the status information of a device via HTTP.

In FIG. 37, the flowchart shows the process of the function obtainstatus( ) of CHTTPProtocol, which will use the map m_VendorModelSupportMap. The process will determine if the input to the function contains the appropriate information to obtain the status information. If not, then the function returns false. If the input to the function contains the appropriate information, then the process determines if there is HTTP support for the vendor and model. If not, then the function returns false. If the vendor and model are supported in HTTP, then all the implementations of HTTP that support the vendor and model will obtain the status information from the web pages of the device. If all the implementations of HTTP fail to obtain any status information from the device, then the function returns false. Otherwise, the function returns true.

Figure 38:
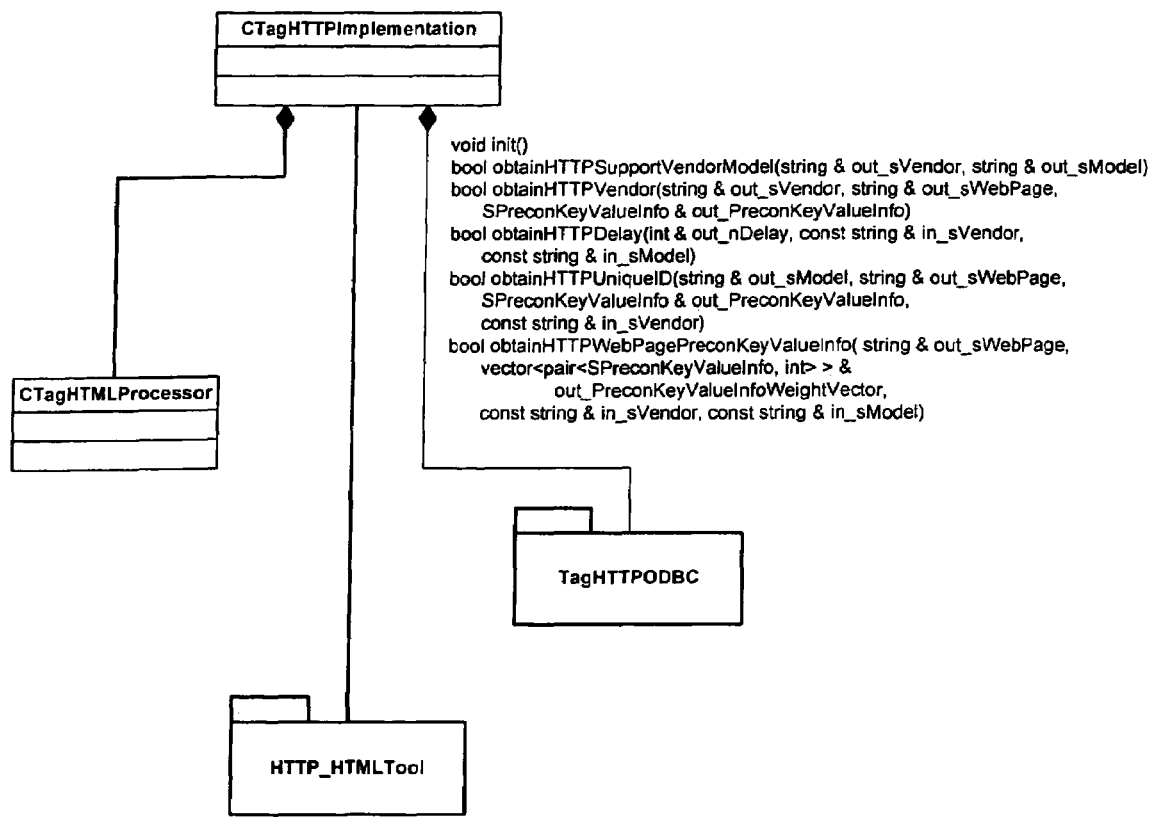
FIG. 38 is a package diagram of the TagHTTPImplementation package used to extract information from between the tags of a web page of a device.

In FIG. 38, a package diagram is shown for the TagHTTPImplementation package. This package will implement HTTP to obtain information from between the tags of the web page of a device. The class CTagHTTPImplementation is the interface for this package and manages the other classes and packages to implement the method of obtaining information from between the tags of the web pages of a device. CTagHTTPImplementation is a class derived from CAbsHTTPImplementation. The TagHTTPODBC package and HTTP_HTMLTool package are describe above with regard to FIG. 33. The class CTagHTMLProcessor processes the web page of a device to obtain the desired information. This class contains a method to process the text of the web pages of a specific format to obtain the desired information. More specifically, this class handles web pages in which the key word to locate the information occurs in multiple places on the web pages.

FIG. 39 shows the map structure m_VendorModelWebInfoMap of CTagHTTPImplementation, which is used by the tag implementation of HTTP to obtain status information of a device from the device's web pages. The key of the map is a string of the name of the vendor of the device. The value of the map is another map that contains information used to obtain status information from the device's web pages of a given model. The key of the inner map is a string for name of the model of the device and its value is a vector of structures, SWebPageInfo, containing information about the web pages and how to obtain status information from the web pages. The structure SWebPageInfo contains the structure SPreconKeyValueInfo which provides all the information that is needed to obtain a single piece of information from a web page. The map structure is populated with information from the tables of the support database for the tag implementation of HTTP.

The CTagHTTPImplementation uses the TagHTTPODBC package to obtain information from the tables of the database.

FIG. 40 is a sample of a web page of a device for which the system will extract the status information. This sample web page uses java script which contains status information of the device.

In FIG. 41, part of the HTML source file is shown that results in the web page being displayed in a browser as shown in FIG. 40. The file shows both HTML tags and java scripts. Information about the different toner levels in found in the java script.

FIG. 42 shows another sample of a web page of a device for which the system will extract the status information. This sample web page also uses java script which contains status information of the device.

In FIG. 43, part of the HTML source file is shown that results in the web page being displayed in a browser as shown in FIG. 42. The file shows both HTML tags and java scripts. Information about the black toner level is found in the java script.

Figure 44:
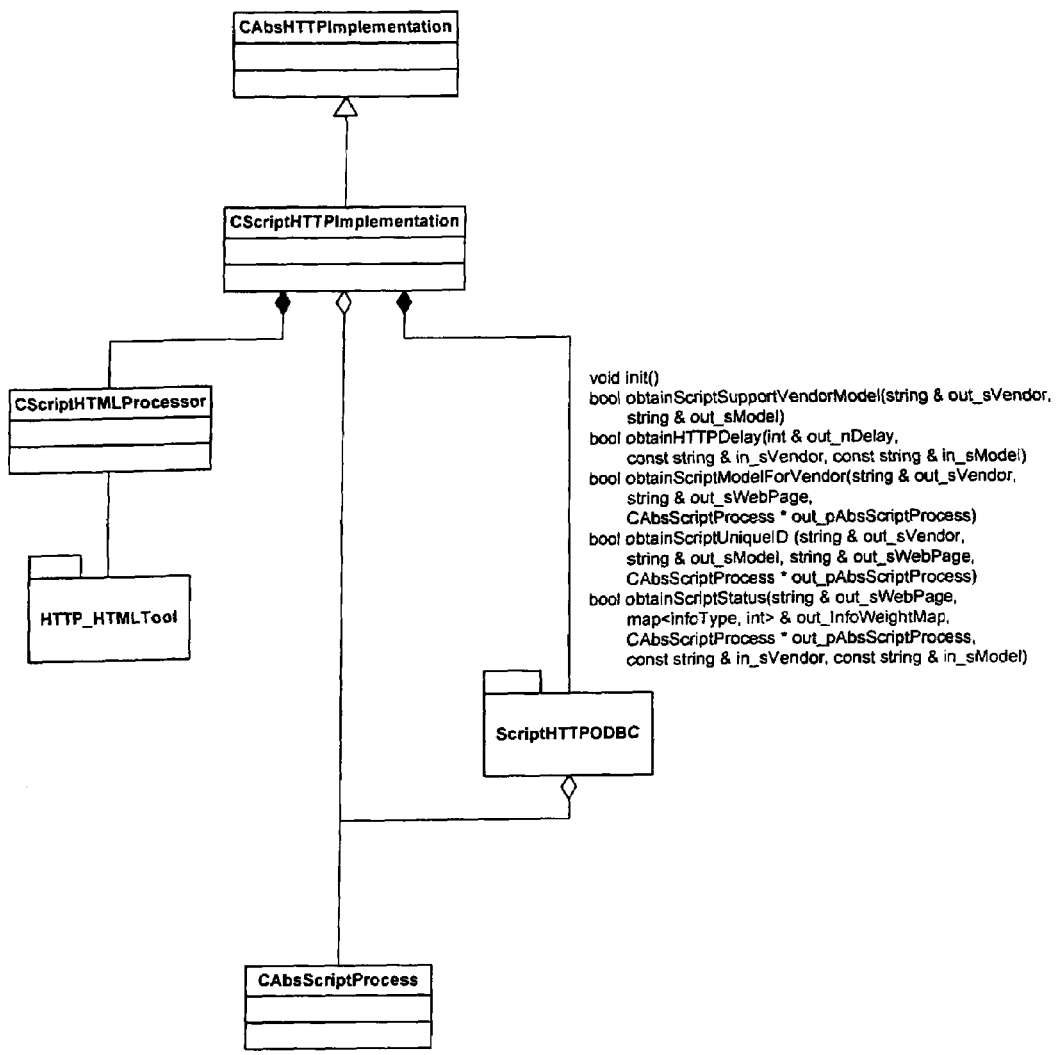
FIG. 44 shows the package diagram of the ScriptHTTPImplementation package, which extracts information from within the scripts of the web page of a device.

In FIG. 44, a package diagram is shown for the ScriptHTTPImplementation package. This package will implement HTTP to obtain information from within the java scripts of the web page of a device such as shown in FIGS. 40 and 42. The class CScriptHTTPImplementation is the interface for this package and manages the other classes and packages to implement the method of obtaining information from within the java script of the web pages of a device. CScriptHTTPImplementation is a class derived from CAbsHTTPImplementation. Appendix 3 shows the class specification of CScriptHTTPImplementation. The ScriptHTTPODBC package and HTTP_HTMLTool package are describe above with regard to FIG. 33. The class CScriptHTMLProcessor processes the web page of a device to obtain only the java script from the web pages of a device. The class CAbsScriptProcess is an abstract class for processing the java script to obtain the status information. Appendix 4 shows the class specification of CAbsScriptProcess. The class CAbsScriptProcess provides a set of common functions to initialize the data structure used to obtain information from within the java script of a web page and to obtain the information from within the java script of the web page. The classes derived from CAbsScriptProcess will provide the method for each of the functions. The method depends upon the vendor, model, and web page of the device. There can be many derived classes of the abstract class so that the different derived classes can perform the process of the interface function differently. The abstract class allows for new devices to be added in which the information exists within the java script of the web pages.

In FIG. 45, the map structure m_VendorModelInfoMap of CScriptHTTPImplementation is shown, which is used by the script implementation of HTTP to obtain the model name of the device from within the java script of the device's web page.

The key of the map is a string for the name of the vendor of the device. The value of the map is a vector of the structure SModelInfo. The structure SModelInfo contains a string for the vendor name of the device, a string for the web page of the device which contains the model name, and a pointer to the abstract class CAbsScriptProcess that will process the java script in the web page to obtain the model name of the device. The pointer will point to a derived class of CAbsScriptProcess.

In FIG. 46, the map structure m_UniqueIDInfoMap of CScriptHTTPImplementation is shown, which is used by the script implementation of HTTP to obtain the unique identifier of the device from within the java script of the device's web page. The unique identifier is a string that identifies the device, e.g., the serial number or the MAC address. The key to the map is a string that is the concatenation of the vendor and model name of the device. The value is a structure SUniqueIDInfo. The structure SUniqueIDInfo contains a string for the vendor name of the device, a string for the model name of the device, a string for the web page of the device which contains the unique identifier, and a pointer to the abstract class CAbsScriptProcess that will process the java script in the web page to obtain the unique identifier of the device. The pointer will point to a derived class of CAbsScriptProcess.

In FIG. 47, the map structure m_StatusMap of CScriptHTTPImplementation is shown, which is used by the script implementation of HTTP to obtain the status information of the device from within the java script of the device's web page. The key to the map is a string which is the concatenation of the vendor and model name of the device. The value is a vector of the structure SWebPageStatus. The structure SWebPageStatus contains a string for the web page, a map structure of the status information and its weight (priority) that can be obtained from the web page, and a pointer to the abstract class CAbsScriptProcess that will process the java script in the web page to obtain the status information of the device. The pointer will point to a derived class of CAbsScriptProcess.

The three map structures are populated during the initialization of the system, i.e., the discovery process. All the derived classes of CAbsScriptProcess are created and initialized during the initialization of the system. The derived classes are initialized with information needed to extract the desired information from the java script of a web page. After the initialization of the system, only the map structure m_StatusMap is needed to periodically obtain status information from the devices' web page. Therefore, the map structures m_VendorModelInfoMap and m_UniqueIDInfoMap are cleaned up after the initialization, since they are no longer needed.

Figure 48:
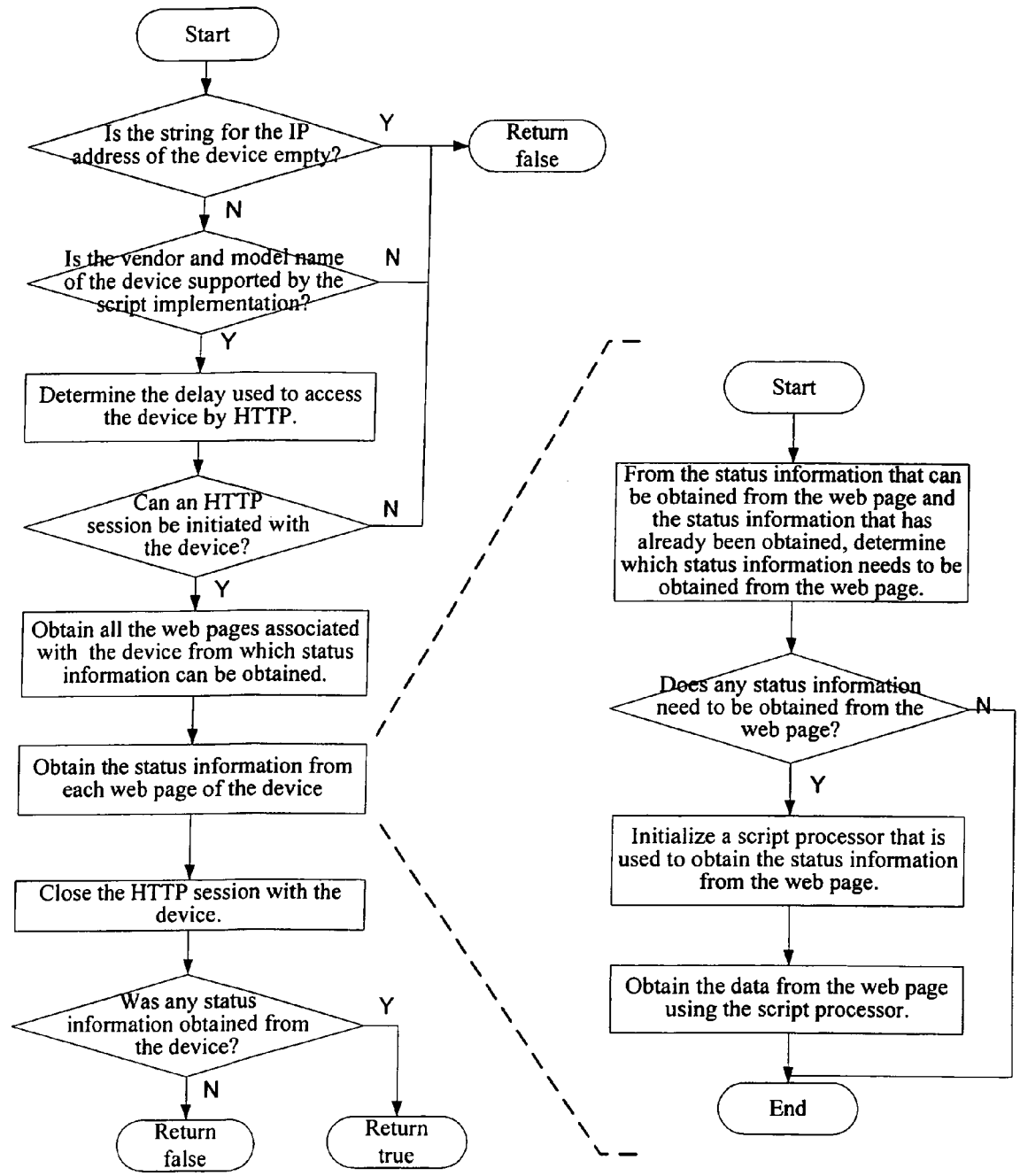
FIG. 48 is a flowchart describing the process of obtaining the status information by the ScriptHTTPImplementation package.

In FIG. 48, a flowchart is shown describing the process of obtaining the status information by the ScriptHTTPImplementation package. The first step tests if the IP address is empty. If the IP address is empty, then the process returns false. Otherwise, the method determines if the vendor and model name of the device is supported by the script implementation of HTTP. If the vendor and model are not supported, then the process returns false. Otherwise the method obtains the delay used to access the web pages of the device by HTTP. Next, an HTTP session is initiated with the device. If the HTTP session cannot be initiated, then the process returns false. Otherwise, the process obtains all the web pages of the device for which the status information is contained within the java script of the web pages. For each web page, the process obtains the status information within the java script using the steps described below. After obtaining the status information from the web pages, the process closes the HTTP session with the device. If no status information was obtained from the device by the script implementation of HTTP, then the process returns false. Otherwise, the process returns true.

Figure 49:
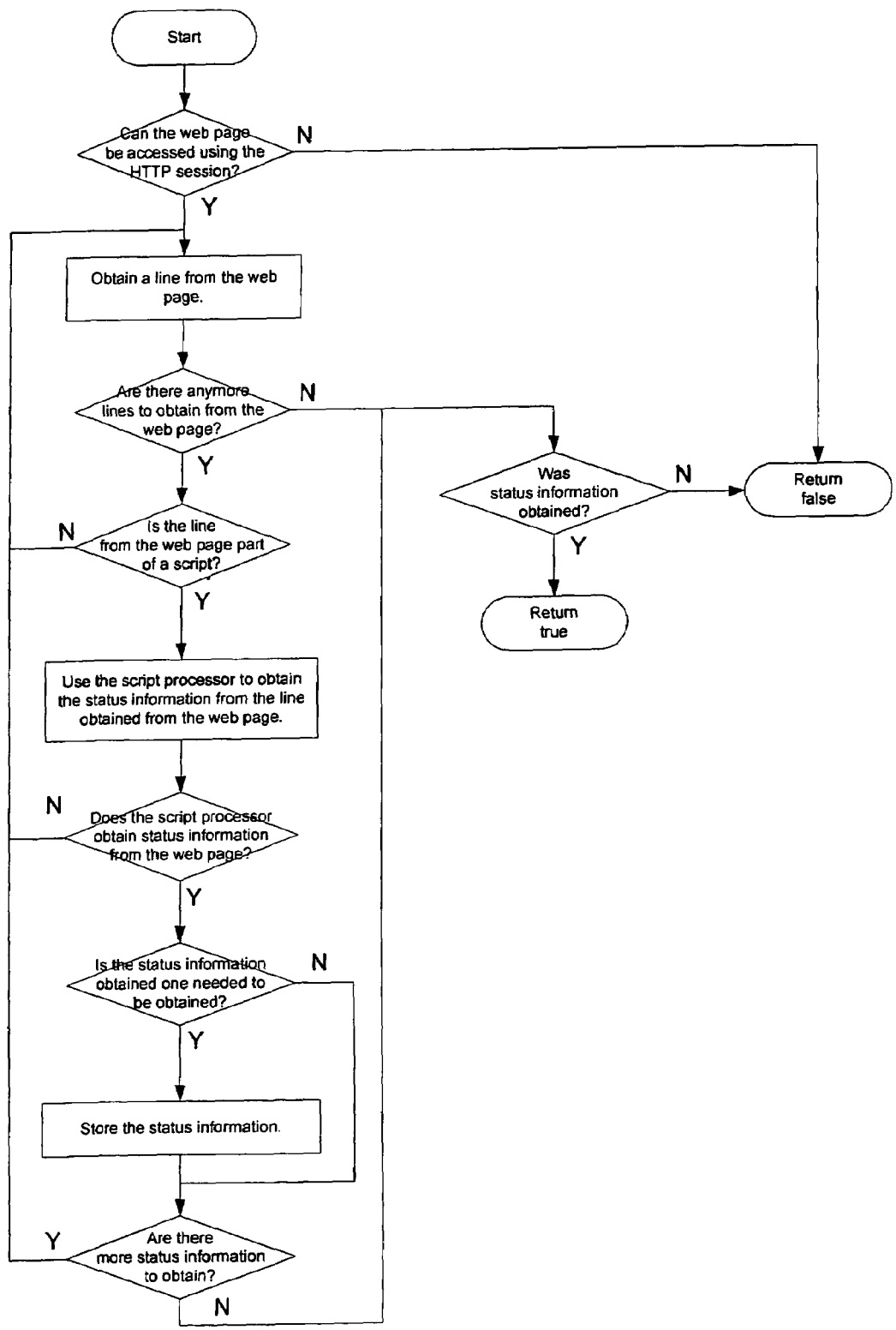
FIG. 49 is a flowchart describing the process of obtaining the status information from within the script of a web page by the ScriptHTTPImplementation package.

In obtaining the status information from within a java script of a web page, the process determines which status information needs to be obtained. This is done by checking the status information that has already been obtained by other protocols or by other implementations of HTTP. If the status information to be obtained from the web page has not been obtained or has been obtained but has a lower weight (or priority), then the process obtains the status information. If all the status information has already been obtained, then obtaining status information from the web page is complete. Otherwise, the process initializes the script processor to obtain status information. This initialization involves calling the start( ) function of CAbsScriptProcess. Then the process obtains the status information using the script processor. Obtaining the status information involves calling the transformData( ) function of CAbsScriptProcess. FIG. 49 provides details of obtaining the status information using the transformData( ) function. After obtaining status information using the script processor, the process of obtaining status information from a web page is complete.

In FIG. 49, a flowchart is shown describing the process of obtaining the status information from within the script of a web page by the ScriptHTTPImplementation package. First, the process attempts to access the web page using the HTTP session. If the web page cannot be accessed, then the process returns false. Otherwise, the process obtains a line from the web page. If a line is obtained from the web page, the process determines if the line is part of the java script. If not, then the system obtains the next line from the web page. Otherwise, the process uses the script processor to obtain the status information from the java script. If the script processor does not obtain status information from the line of the java script, then the system obtains the next line from the web page. Otherwise, the process determines if the status information obtained from the script processor is needed (the status information may not be needed if it has already been obtained by another protocol or by another implementation of HTTP with a weight greater than or equal to that which was obtained by the script processor). If the status information is needed, then the process stores the status information. The status information is put into the map structure described in FIG. 28. After storing the status information or if the status information is not needed, the process determines if more status information needs to be obtained from the java script of the web page. If more status information is needed to be obtained, the system obtains the next line from the web page. If there is no more status information to be obtained or if there are no more lines that can be obtained from the web page, the process determines if there was any status information obtained from within the java script. If no status information was obtained, then the process returns false. Otherwise, the process returns true.

Figure 50:
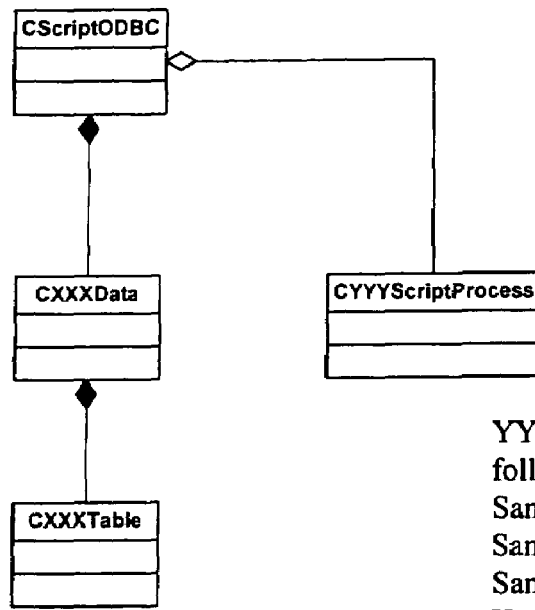
FIG. 50 show the class diagram of the ScriptHTTPODBC package.

In FIG. 50, a class diagram is shown of the ScriptHTTPODBC package. This package interfaces with the support database to obtain information used to extract the model name, unique identifier, and status information from within the java script of a web page of a device. The CScriptHTTPODBC class is the interface for this package and manages the other classes to obtain the appropriate information from the tables of the support database. Appendix 5 shows the class specification of CScriptHTTPODBC. The CXXXData classes and its corresponding CXXXTable classes provide access to the XXX tables of the support database shown in FIG. 19 to obtain information from the tables. This package contains all the derived classes, CYYYScriptProcess, of CAbsScriptProcess that will be used to process the java scripts of the web pages of different devices. Each derived class provides methods to set the data structures used to obtain the status information (putParameters( ) function), to initialize the process to obtain the status information (start( ) function), to obtain the status information from the java script (transformData( ) function), and to complete the process to obtain the status information (end( ) function). Adding new devices which are supported by the script implementation of HTTP may require adding new classes derived from CAbsScriptProcess for the devices. The function setupCreateFunctionMap( ) of CScriptHTTPODBC creates and sets the data structures for all the derived classes of CAbsScriptProcess.

Figure 51:
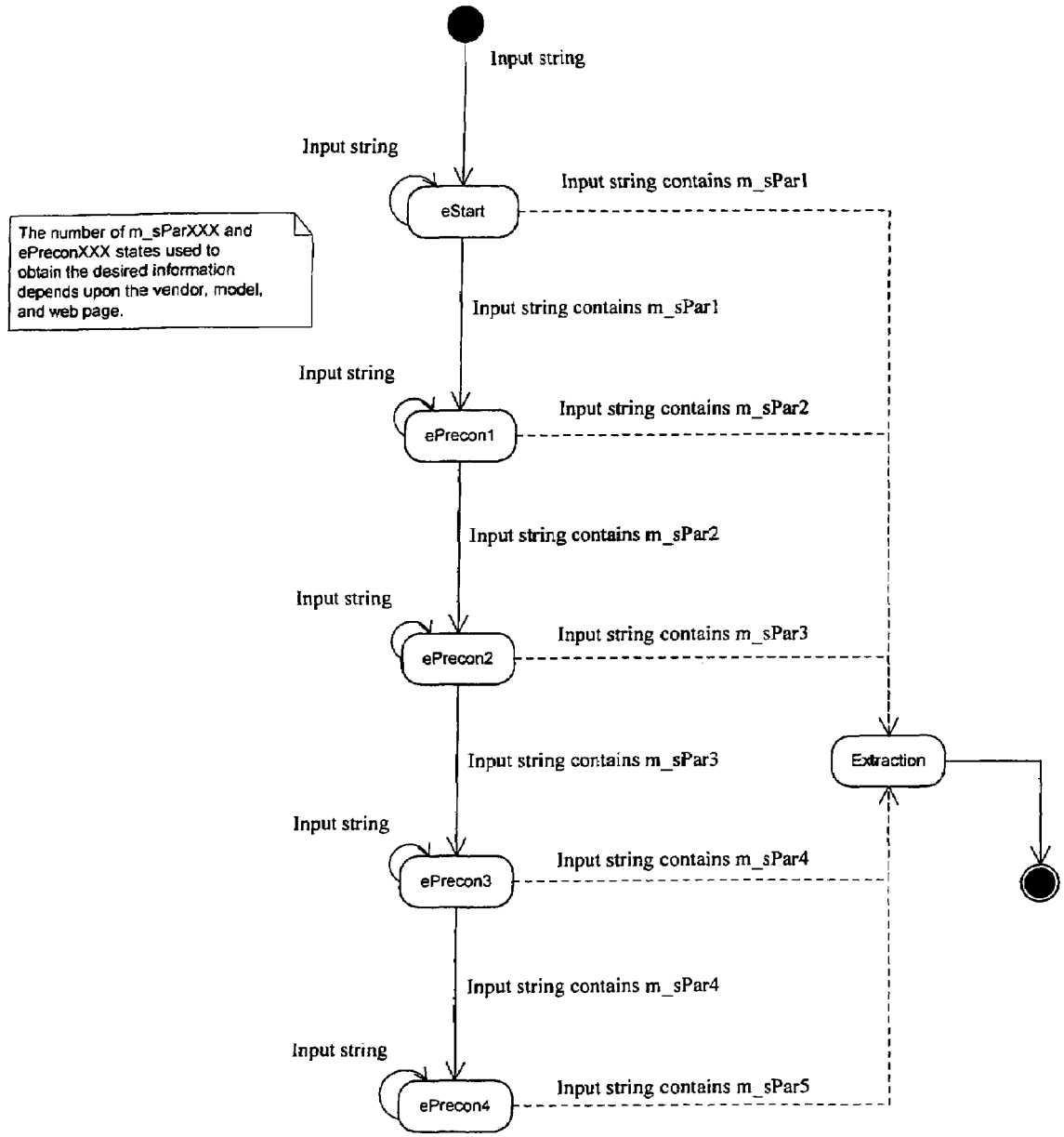
FIG. 51 shows the state diagram for processing the java script of a web page of a device by derived classes of CAbsScriptProcess.

For FIG. 51, a state diagram is shown for processing the java script of a web page of a device by derived classes of CAbsScriptProcess to obtain information. This state diagram corresponds to the transformData( ) function of CAbsScriptProcess. Appendix 4 shows the class specification of CAbsScriptProcess. There are two enums (enumerations) and one structure defined in CAbsScriptProcess. The enum EReturn is used by the transformData( ) function to return the results of the function in obtaining information from the java script of the web page of a device. The enum EState is used by the transformData( ) function to determine the state of the process in obtaining the information from the java script. Most of the states in the state diagram correspond to the enum EState. The structure SInfoStructure is used to obtain information from the java script of a web page. The derived classes of CAbsScriptProcess vary in its use of these enums and structure. Some derived classes may use only two values of the enum EReturn in transformData( ) whereas some derived classes may use all four. Some derived classes may use only two value of enum EState to obtain the desired information whereas some derived classes may use only three or four. Some derived classes may contain an attribute member which is of type SInfoStructure to obtain information from the web page whereas some derived classes may contain an attribute member which is a vector of SInfoStructure to obtain multiple information from the web page.

In the state diagram, even though all five states corresponding to the value of enum EState are shown, not all will be used in obtaining the desired information from the java script for all devices. The number of states and the number of m_sPar in the structure SInfoStructure used for transitioning between the states depends upon the vendor, model, and web page. The state diagram starts in state eStart. The process remains in the eStart state until the string m_sPar1 of the struct SInfoStructure is found in the line of the java script. If the process corresponding to the vendor, model, and web page only requires m_sPar1 to be found before extracting the data, then the next state is the Extraction state where the information is extracted from the line of the java script. Then the process is complete. Otherwise, the next state is ePrecon1. The process remains in the ePrecon1 state until the string m_sPar2 of the struct SInfoStructure is found in the line of the java script. If the process corresponds to a vendor, model, and web page that requires m_sPar2 to be found before extracting the data, then the next state is the Extraction state where the information is extracted from the line of the java script. Then the process is complete. Otherwise, the next state is ePrecon2. The transitions for states ePrecon2 and ePrecon3 are similar to that of state ePrecon1 except the strings m_sPar3 and m_sPar4 of the struct SInfoStructure causes the transitioning of states to occur. When the process is in state ePrecon5, the process remains in the state until m_sPar5 of structure SInfoStructure is found in the line of the java script. The next state is the Extraction state and the process is complete. In obtaining information from the java script, five strings, m_sPar1 through m_sPar5, should be the most strings needed to obtain the desired information.

FIG. 52 shows sample data structures used by two derived classes of CAbsScriptProcess. The first derived class of CAbsScriptProcess, CSamsungStatusCLP550ScriptProcess, uses a vector of struct SInfoStructure to obtain the color toner level from java script of the web page of the device. Each toner level requires three strings m_sPar1 through m_sPar3 to obtain the status information. Therefore, the process to obtain the information will go through three states—eStart, ePrecon1, and ePrecon2—before the status information will be extracted from the java script. The second derived class, CSamsungStatusML2550ScriptProcess, uses the struct SInfoStructure by itself to obtain the black toner level from the java script of the web page of the device. The toner level requires two strings m_sPar1 and m_sPar2 to obtain the black toner level. Therefore, the process to obtain the information will go through two states—eStart and ePrecon1—before the black toner level will be extracted from the java script. Appendices 6 and 7 show the class specification of CSamsungStatusCLP550ScriptProcess and CSamsungStatusML2550ScriptProcess, respectively.

In FIG. 53, a sample web page is used to show how a derived class of CAbsScriptProcess processes the web page of a device containing a java script. The sample value of the struct SInfoStructure is shown below the web page. In this example, the status information that is being obtained is the cyan toner level. Three strings (parameters) m_sPar1, m_sPar2, and m_sPar3 of struct SInfoStructure, are needed to locate the status information. The EState m_State of struct SInfoStructure is used to keep track of the strings that have been encountered. The delimiter m_sDelimiter of struct SInfoStructure and the position m_nInLinePosition of struct SInfoStructure are needed to extract the status information from the line containing the status information. Each line of the web page is read until all the status information is obtained or the end of the web page is encountered. Only the lines that are part of the java script will be passed into transformData( ) of CAbsScriptProcess. The initial value of m_State of struct SInfoStructure is eStart. Lines of the java script are passed into transformData( ) of CAbsScriptProcess. When the line "function RemainTonerOption( )" is passed in, m_sPar1 of struct SInfoStructure is found in the line. m_State of struct SInfoStructure is ePrecon1. More lines of the java script are passed in with no changes to m_State. When the line "else" is passed in, m_sPar2 of struct SInfoStructure is found in the line. m_State of struct SInfoStructure is ePrecon2. More lines of the java script are passed with no changes to m_State until the line "var CyanTonerPer=100" is passed in. m_sPar3 of struct SInfoStructure is found in the line and the status information is extracted from the line using the values m_sDelimiter and m_nInLinePosition of struct SInfoStructure. m_sDelimiter are characters that delimit the status information and m_nInLinePosition is a number that determines how many delimiters occur before the status information is encountered. 0 for m_nInLinePosition is when the status information occurs before the first delimiter. A value of "100" is obtained from the java script for the cyan toner level and no more lines of the web page needs to be obtained.

Figure 54:
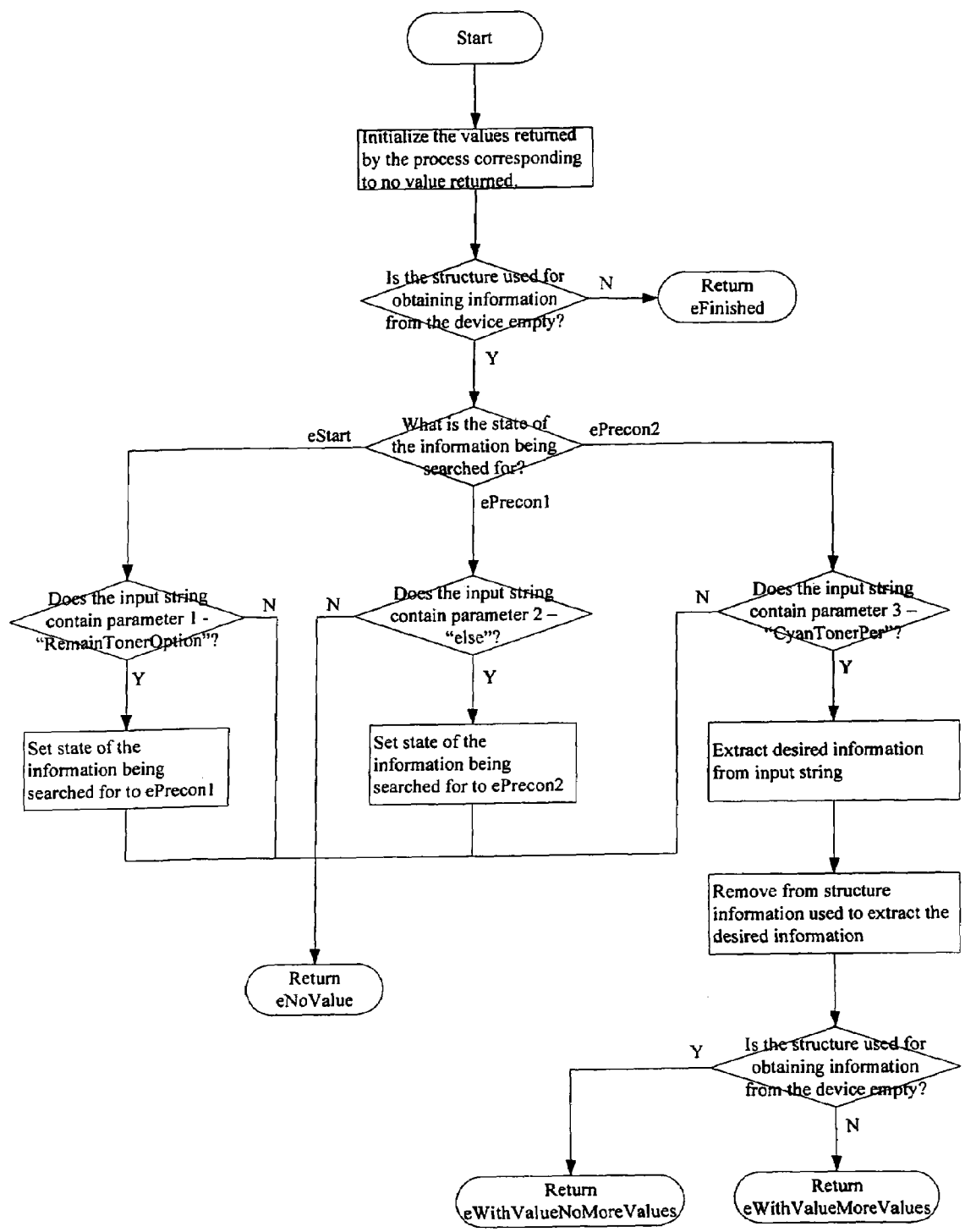
FIG. 54 is a flowchart of the process of a derived class of CAbsScriptProcess to extract information from the web page of a device.

FIG. 54 is a flowchart showing the process of a derived class of CAbsScriptProcess to extract information from the web page of a device. This flowchart is a sample process used to extract the cyan toner level, as described in FIG. 53. This process corresponds to transformData( ) of CAbsScriptProcess. Though the method of transformData( ) of the derived classes of CAbsScriptProcess vary among vendors and models, the use of states to locate the status information is the common method to obtain the status information.

FIG. 55A shows the members of the structure SInfoStructure that are used to extract information from a web page. This structure is defined in CAbsScriptProcess shown in Appendix 4 and can be used by all the derived classes of CAbsScriptProcess. The strings m_sParXXX are used by the derived classes of CAbsScriptProcess to locate the line of the web page that contains the desired information. Not all the strings are needed to locate the desired information, but having five strings m_sParXXX available allows flexibility for future devices that may require all five strings to locate the desired information. The string m_sDelimiter and integer m_nInLinePosition are used to extract the desired information from the line of the web page that contains it. The infoType m_nENUM is a number representing the type of information to be extracted, such as eCyan, which represents the cyan toner level, or ePrtLifeCount, which represents the total pages printed by the device. The EState m_State is used to keep track of the state of the structure as it locates the desired information from the web page. It is initialized at the start state eState and changes state as each string m_sParXXX is encountered.

Although the description and use of CAbsScriptProcess, its derived class, and its structure SInfoStructure has been focused on obtaining data from within the script of the web page, the use of these structures and methods can also be applied to obtaining data from between the tags of the web page where the m_sParXXX may correspond to certain tags to obtain the data.

FIG. 55B shows the sample values of the member of the structure SInfoStructure of FIG. 55A. This structure is used to locate the cyan toner level (m_nENUM=ecyan) of the device from its web page. Only three strings, m_sPar1 through m_sPar3, are needed to locate the desired information. The remaining two strings, m_sPar4 and m_sPar5, are empty and will not be used. The characters '=' and ';' of m_sDelimiter and 1 for m_nInLinePosition will be used to extract the desired information from the line where it exists.

Although the present invention is shown to include a few devices, which require monitoring, connected to a network, it will be appreciated that any number of devices may be connected to the network without deviating from the spirit and scope of the invention. Also, the present invention may also be applied in a home environment wherein various devices need to be monitored and controlled.

Embodiments of the present invention enables the monitoring of the various devices in a multi-vendor environment and further facilitates retrieving and displaying detailed information in a user-comprehensible or user-friendly manner even without having specific private management information base (MIB) information. Furthermore, the information can be redistributed using various methods such as SMTP, FTP, or Web Services.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product residing on a storage medium including instructions that can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Numerous modifications and variations of the present invention are possible in light of the above teachings. It is therefore to be understood that within the scope of the appended claims, the invention may be practiced otherwise than as specifically described herein.

APPENDIX 1

6.6.3 CAbsProtocol Class Specification
6.6.3.1 Base Class
    None
6.6.3.2 Function List
public:
    CAbsProtocol( );
    virtual ~CAbsProtocol( );
    virtual void initBegin(void) = 0;
    virtual void initEnd(void) = 0;
    virtual bool canAccessIP(const std::string& in_sIP, std::map<std::string, std::vector<SParameter> >& in_ProtocolParameters) = 0;
    virtual bool obtainVendor(std::string& out_sVendor, std::map<std::string, std::vector<SParameter> >& inOut_ProtocolParameters, const std::string& in_sIP) = 0;
    virtual bool obtainModel(std::string& out_sModelName, std::map<std::string, std::vector<SParameter> >& inOut_ProtocolParameters, const std::string& in_sIP) = 0;
    virtual bool obtainUniqueID(std::string& out_sUniqueID, std::map<std::string, std::vector<SParameter> >& inOut_ProtocolParameters, const std::string& in_sIP) = 0;
    virtual EerrorCode obtainEventStatus(std::map<infoType, std::pair<std::string, int> >& inOut_StatusMap, const std::string& in_sIP, std::map<std::string, std::vector<SParameter> >& in_ProtocolParameters) = 0;
    virtual bool obtainStatus(std::map<infoType, std::pair<std::string, int> >& inOut_StatusMap, const std::string& in_sIP, const std::string& in_sVendor, const std::string& in_sModel, std::map<std::string, std::vector<SParameter> >& in_ProtocolParameters) = 0;
    virtual void initWithVendor(std::map<std::string, std::vector<SParameter> >& inOut_ProtocolParameters, const std::string& in_sVendor) = 0;
    virtual void initWithModel(std::map<std::string, std::vector<SParameter> >& inOut_ProtocolParameters, const std::string& in_sModel) = 0;
    virtual void initWithVendorModel(std::map< std::string, std::vector<SParameter> > & inOut_ProtocolParameters, const std::string & in_sVendor, const std::string & in_sModel) = 0;
    virtual CAbsProtocol::EStatus obtainVendorModelUniqueID(std::string & out_sVendor, std::string & out_sModel, std::string & out_sUniqueID, std::map<std::string, std::vector<SParameter> >& inOut_ProtocolParameters, const std::string & in_sIP) = 0;
6.6.3.3 Defined Type List
public:
    enum EStatus {
        eAll = 0,
        eVendorModel,
        eVendorUniqueID,
        eModelUniqueID,
        eVendorOnly,
        eModelOnly,
        eUniqueIDOnly,
        eNone
    };
6.6.3.4 Class Attributes
    None
6.6.3.5 Function Definitions
////////////////////////////////////////////////////
// Function:        CAbsProtocol( )
// Description:     Constructor
// Preconditions:   None.
// Postconditions:  None.
// Algorithm:       Default.
////////////////////////////////////////////////////
////////////////////////////////////////////////////
// Function:        ~CAbsProtocol( )
// Description:     Destructor
// Preconditions:   None.
// Postconditions:  None.
// Algorithm:       Default.
////////////////////////////////////////////////////

APPENDIX 2

6.6.5.5 CAbsHTTPImplementation Class Specification
6.6.5.5.1 Base Class
    None
6.6.5.5.2 Function List
public:
    CAbsHTTPImplementation( );
    virtual ~CAbsHTTPImplementation( );
    virtual void initBegin(void) = 0;
    virtual void initEnd(void) = 0;
    virtual bool obtainVendor(std::string & out__sVendor, std::map<std::string, std::vector<SParameter> > & inOut__ProtocolParameters, const std::string & in__sIP) = 0;
    virtual bool obtainModel(std::string & out__sModel, std::map<std::string, std::vector<SParameter> > & inOut__ProtocolParameters, const std::string & in__sIP) = 0;
    virtual bool obtainUniqueID(std::string & out__sUniqueID, std::map<std::string, std::vector<SParameter> > & inOut__ProtocolParameters, const std::string & in__sIP) = 0;
    virtual bool obtainModelWithVendor(std::string & out__sModel, std::map<std::string, std::vector<SParameter> > & inOut__ProtocolParameters, const std::string & in__sVendor) = 0;
    virtual bool obtainVendorWithModel(std::string & out__sVendor, std::map<std::string, std::vector<SParameter> > & inOut__ProtocolParameters, const std::string & in__sModel) = 0;
    virtual bool initWithVendorModel(std::map<std::string, std::vector<SParameter> > & inOut__ProtocolParameters, const std::string & in__sVendor, const std::string & in__sModel) = 0;
    virtual bool obtainStatus(std::map<infoType, std::pair<std::string, int> > & inOut__Data, const std::string & in__sIP, const std::string & in__sVendor, const std::string & in__sModel, std::vector<SParameter> & in__Parameter) = 0;
    virtual void currentVendorModelForIP(const std::string& in__sVendor, const std::string & in__sModel, const std::string & in__sIP)=0;
6.6.5.5.3 Defined Type List
    None
6.6.5.5.4 Class Attributes
    None
6.6.5.5.5 Function Definitions

```
///////////////////////////////////////////////////////
// Function:        CAbsHTTPImplementation( )
// Description:     Constructor
// Preconditions:   None.
// Postconditions:  None.
// Algorithm:       Default.
///////////////////////////////////////////////////////
///////////////////////////////////////////////////////
// Function:        ~CAbsHTTPImplementation( )
// Description:     Destructor
// Preconditions:   None.
// Postconditions:  None.
// Algorithm:       Default.
///////////////////////////////////////////////////////
```

APPENDIX 3

6.6.5.6.2 CScriptHTTPImplementation Class Specification
    Add .h files that contain the HTTP__HTMLTool namespace definition and CAbsScriptProcess declaration.
6.6.5.6.2.1 Base Class
    public CAbsHTTPImplementation
6.6.5.6.2.2 Function List
public:
    CScriptHTTPImplementation( );
    ~CScriptHTTPImplementation( );
    virtual void initBegin(void);
    virtual void initEnd(void);
    virtual bool obtainVendor(std::string & out__sVendor, std::map<std::string, std::vector<SParameter> > & inOut__ProtocolParameters, const std::string & in__sIP);
    virtual bool obtainModel(std::string & out__sModel, std::map<std::string, std::vector<SParameter> >& inOut__ProtocolParameters, const std::string & in__sIP);
    virtual bool obtainUniqueID(std::string & out__sUniqueID,

APPENDIX 3-continued

```
        std::map<std::string, std::vector<SParameter> > & inOut_ProtocolParameters,
const std::string & in_sIP) ;
        virtual bool obtainModelWithVendor(std::string & out_sModel,
std::map<std::string, std::vector<SParameter> > & inOut_ProtocolParameters,
const std::string & in_sVendor) ;
        virtual bool obtainVendorWithModel(std::string & out_sVendor,
std::map<std::string, std::vector<SParameter> > & inOut_ProtocolParameters,
const std::string & in_sModel) ;
        virtual bool initWithVendorModel(std::map<std::string,
std::vector<SParameter> > & inOut_ProtocolParameters, const std::string &
in_sVendor, const std::string & in_sModel);
        virtual bool obtainStatus(std::map<infoType, std::pair<std::string,
int> > & inOut_Data, const std::string & in_sIP, const std::string &
in_sVendor, const std::string & in_sModel, std::vector<SParameter> &
in_Parameter) ;
        virtual void currentVendorModelForIP(const std::string & in_sVendor,
const std::string & in_sModel, const std::string & in_sIP);
private:
        bool obtainDeviceInfo(const std::string& in_sIP,
std::vector<SParameter> & in_Parameter);
        void updateStatusMap(const std::string& in_sVendor, const
std::string& in_sModel);
        void selectEntries(std::map<infoType, int> & out_InfoTypeMap,
std::map<infoType, std::pair<std::string, int> > & in_StatusMap,
std::map<infoType, int> & in_InfoTypeMap);
        bool obtainSupportedModel(std::string& out_sModel, const std::string&
in_sModelString, const std::string& in_sVendor);
        bool initiateHTTP(const std::string & in_sIP, std::vector<SParameter> &
in_Parameter, int in_nDelay = HTTPDefaultDelay);
        bool obtainDataFromHTMLFile(std::map<infoType,
std::pair<std::string,int> > & inOut_Data, const std::string &
in_sWebPage, std::map<infoType, int> & in_InfoTypeMap, CAbsScriptProcess
* in_pScriptProcess);
        bool closeHTTP( );
6.6.5.6.2.3 Defined Type List
private:
        struct SWebPageStatus {
                std::string              m_sWebPage;
                std::map<infoType, int>  m_InfoTypeMap;
                CAbsScriptProcess *      m_pScriptProcess;
        };
        struct SModelInfo {
                std::string              m_sVendor;
                std::string              m_sWebPage;
                CAbsScriptProcess *      m_pScriptProcess;
        };
        struct SUniqueIDInfo{
                std::string              m_sVendor;
                std::string              m_sModel;
                std::string              m_sWebPage;
                CAbsScriptProcess *      m_pScriptProcess;
        };
6.6.5.6.2.4 Class Attributes
private:
```

| Type | Attribute Name | Description |
| --- | --- | --- |
| CScriptHTMLProcessor | m_ScriptHTMLProcessor | This attribute member provides HTML processing. |
| CScriptHTTPODBC * | m_pHTTPODBC | This attribute member is created in initBegin and destroyed in initEnd |
| std::map<std::string, int> | m_DelayMap | The first entry of the map is Vendor + Model and the second entry is delay. |
| std::map<std::string, std::vector<SWebPageStatus > > | m_StatusMap | This entry contains the key of Vendor + Model string and vector of SWebPageStatus structure used to obtain the status |
| std::map<std::string, std::vector<std::string> > | m_VendorModelSupport Map | This entry contains the key of vendor and the value of vector of models. |
| std::map<std::string, std::vector<std::string> > | m_ModelVendorSupport Map | This entry contains the key of model and the value of vector of vendors. |

APPENDIX 3-continued

| | | |
|---|---|---|
| std::map<std::string, std::vector<SModelInfo> > | m_VendorModelInfoMap | This map contains information of how to get the model for the given vendor in the key. |
| std::map<std::string, SUniqueIDInfo > | m_UniqueIDInfoMap | This map contains key of Vendor + Model and structure to obtain the unique ID. |
| std::map<CAbsScriptProcess *, int> | m_InitAbsScriptProcessMap | This map keeps track of the addresses functions to get models and unique ID's |
| std::map<CAbsScriptProcess *, int> | m_StatusAbsScriptProcessMap | This map keeps track of the addresses functions to get status. |
| std::vector<std::string>::iterator | m_ModelIter | This attribute is used to iterate over the vector of models in m_VendorModelSupportMap. This is used by obtainModelWithVendor( ). |
| std::vector<std::string>::iterator | m_VendorIter | This attribute is used to iterate over the vector of vendors in m_ModelVendorSupportMap. This is used by obtainVendorWithModel( ) |
| std::string | m_sCachedIP | This attribute member contains the cached IP address. |
| std::string | m_sCachedVendor | This attribute member contains the vendor obtained corresponding to the Cached IP address. |
| std::string | m_sCachedModel | This attribute member contains the model obtained corresponding to the Cached IP address. |
| std::string | m_sCurrentVendor | This attribute member contains the vendor used by obtainModelWithVendor( ). |
| std::string | m_sCurrentModel | This attribute member contains the model used by obtainVendorWithModel( ). |
| std::vector<SParameter> | m_ParameterVector | This attribute is a place holder for the future use of the parameters. |

APPENDIX 4

6.6.5.6.5 CAbsScriptProcess Class Specification
6.6.5.6.5.1 Base Class
    None
6.6.5.6.5.2 Function List
public:
    CAbsScriptProcess( );
    virtual ~CAbsScriptProcess( );
    virtual void start(void) = 0;
    virtual CAbsScriptProcess::EReturn transformData(std::string & out_sValue, infoType & out_nInfoType, const std::string in_sString) = 0;
    virtual void putParameters(std::vector<std::string> in_ParameterVector, const infoType in_InfoType)=0;
    virtual bool end(std::string & out_sValue, infoType & out_nInfoType);
6.6.5.6.5.3 Defined Type List
public:
    enum EReturn{
        eWithValueMoreValues = 0,
        eWithValueNoMoreValue,
        eNoValue,
        eFinished
};
protected:
    enum EState{
      eStart = 0,
      ePrecon1,
      ePrecon2,
      ePrecon3,
      ePrecon4

APPENDIX 4-continued

```
        };
        struct SInfoStructure {
                std::string    m_sPar1;
                std::string    m_sPar2;
                std::string    m_sPar3;
                std::string    m_sPar4;
                std::string    m_sPar5;
                std::string    m_sDelimiter;
                int            m_nInlinePosition;
                infoType       m_nENUM;
                EState         m_State;
                SInfoStructure( );
                ~SInfoStructure( );
                void init( );
        };
```

6.6.5.6.5.4 Class Attributes
    None
6.6.5.6.5.5 Function Definitions

////////////////////////////////////////////////////////////
// Function:          CAbsScriptProcess( )
// Description:       Constructor
// Preconditions:     None.
// Postconditions:    None.
// Algorithm:         Default.
////////////////////////////////////////////////////////////
////////////////////////////////////////////////////////////
// Function:          ~CAbsScriptProcess( )
// Description:       Destructor
// Preconditions:     None.
// Postconditions:    None.
// Algorithm:         Default.
////////////////////////////////////////////////////////////
////////////////////////////////////////////////////////////
// Function:          end(std::string & out_sValue, infoType &
//                        in_infoType)
// Description:       This function perform the final processing of
//                    data after the last call to transformData( ).
//                    This function will return true, a data string, and
//                    an infoType if there is any final data to
//                    return.
//                    This function does nothing but returns false,
//                    an empty data string, and eNotDefine for the
//                    infoType. The derived classes can override
//                        this function.
// Preconditions:     None.
// Postconditions:    None.
// Algorithm:         1.   clear out_sValue and set out_nInfoType to
//                    eNotDefine.
//                    2.   return false.
////////////////////////////////////////////////////////////
////////////////////////////////////////////////////////////
// Function:          SInfoStructure::SInfoStructure( )
// Description:       Constructor
// Preconditions:     None.
// Postconditions:    None.
// Algorithm:         1    calls init( ).
////////////////////////////////////////////////////////////
////////////////////////////////////////////////////////////
// Function:          SInfoStructure::~SInfoStructure( )
// Description:       Destructor
// Preconditions:     None.
// Postconditions:    None.
// Algorithm:         Default.
////////////////////////////////////////////////////////////
////////////////////////////////////////////////////////////
// Function:          SInfoStructure::init( )
// Description:       This function initializes the attribute members
//                    of SInfoStructure.
// Preconditions:     None.
// Postconditions:    None.
// Algorithm:         1    set all the strings to null
//                    2    set m_nInlinePosition to −1
//                    3    set m_State to eStart
//                    4    set m_nENUM to eNotDefine.
////////////////////////////////////////////////////////////

APPENDIX 5

6.6.5.6.5.2 CScriptHTTPODBC Class Specification
  This class requires
    typedef CAbsScriptProcess * (*createScriptProcess)(void);
before using createScriptProcess as a type. Also, the following functions
should be declared on the top of .cpp file as global functions.
    CAbsScriptProcess * createSamsungPrinterDetail(void);
    CAbsScriptProcess * createSamsungStatusCLP550(void);
    CAbsScriptProcess * createSamsungStatusML2550(void);
    CAbsScriptProcess * createKyoceraModel(void);
    CAbsScriptProcess * createKyoceraUniqueID(void);
    CAbsScriptProcess * createKyoceraFS3830(void);
All the objects created by this class are not destroyed in this class. The
calling class should manage the object destruction.
6.6.5.6.5.2.1  Base Class
  None
6.6.5.6.5.2.2  Function List
public:
  CScriptHTTPODBC( );
  ~CScriptHTTPODBC( );
  void init( );
  bool obtainScriptSupportVendorModel(std::string& out_sVendor,
std::string& out_sModel);
  bool obtainHTTPDelay(int& out_nDelay, const std::string& in_sVendor,
const std::string& in_sModel);
  bool obtainScriptModelForVendor(std::string & out_sVendor, std::string
& out_sWebPage, CAbsScriptProcess *& out_pAbsScriptProcess);
  bool obtainScriptUniqueID(std::string & out_sVendor, std::string &
out_sModel, std::string & out_sWebPage, CAbsScriptProcess *&
out_pAbsScriptProcess);
  bool obtainScriptStatus(std::string& out_sWebPage, std::map<infoType,
int> & out_InfoTypeMap, CAbsScriptProcess *& out_pAbsScriptProcess, const
std::string& in_sVendor, const std::string& in_sModel);
private:
  void setupCreateFunctionMap(void);
  bool extractVendorModel (std::string & out_sVendor, std::string &
out_sModel, const std::string & in_sString);
6.6.5.6.5.2.3 Defined Type List
private:
  struct SWebPageCreateScriptProcess {
    std::string    m_sWebPage;
    int    m_nWebPageID;
    std::map<infoType, int>  m_InfoTypeWeightMap;
    createScriptProcess  m_createScriptProcess;
    CAbsScriptProcess *  m_pScriptProcess;
  };
6.6.5.6.5.2.4 Class Attributes
private:

| Type | Attribute Name | Description |
| --- | --- | --- |
| CScriptVendorModelData | m_VendorModelData | This attribute member accesses the database table containing information used to obtain the model of the device. |
| CHTTPSupportedVendorModelDelayData | m_VendorModelDelayData | This attribute member accesses the database table containing information about the vendor and model of the device supported and the delay associated with it |
| CScriptUniqueIDWebPageData | m_UniqueIDWebPageData | This attribute member accesses the database table containing information used to obtain the unique ID of the device. |
| CscriptVendorModelWebPageData | m_VendorModelWebPageData | This attribute member accesses the database table containing information about the web pages of the device that contain status information. |
| CScriptStatusData | m_ScriptStatusData | This attribute member accesses the database table containing information used to obtain the status information from the web pages of the device. |

APPENDIX 5-continued

| | | |
|---|---|---|
| std::map<std::string, createScriptProcess> | m_ModelCreateScript ProcessMap | This attribute member contains createScriptProcess functions for obtaining the model corresponding to the key of a vendor |
| std::map<std::string, createScriptProcess> | m_UniqueIDCreateScript ProcessMap | This attribute member contains createScriptProcess function for obtaining the Unique ID corresponding to the key of Vendor + separator + Model |
| std::map<std::string, std::vector< SWebPageCreateScriptProcess > > | m_StatusCreateScript ProcessMap | This attribute member contains a vector of SWebPageCreateScriptProcess corresponding to the key of Vendor + separator + Model |
| std::map<std::string, int> | m_VendorModelDelayMap | This attribute member contains a delay corresponding to the key of Vendor + separator + Model |
| std::map<std::string, std::vector< SWebPageCreateScriptProcess > > ::iterator | m_StatusCreateScript ProcessMapItr | This attribute is used to iterate m_StatusCreateScriptProcessMap used in the function obtainScriptSupportVendorModel( ). |
| std::vector< SWebPageCreateScriptProcess> ::iterator | m_WebPageScriptProc VectorItr | This attribute member keeps SWebPageCreateScriptProcess vector used in the function obtainScriptStatus( ). |
| std::string | m_sCachedCombine | This attribute member tracks if the call has the same Vendor and Model or not. |

APPENDIX 6

6.6.5.6.5.14 CSamsungStatusCLP550ScriptProcess Class Specification
  This process extracts the toner status from Samsung CLP550 printers.
  The data is located in the web page, /panel/setup.htm in the following format.

```
function RemainTonerOption( )
{
    if((modelVer != 0x0701)&&(modelVer != 0x0702)&&(modelVer != 0x0703)&&(modelVer != 0x0711))
    {
        document.write('<tr><td width="10" height="35"></td><td width="263" height="35"><font size="2" face="Arial">Remain Toner :(0%)</font></td>');
        document.write('<td width="381" height="35" colspan="2"><table border="1" width="300" cellspacing="0" cellpadding="0"><tr><td width="300" height="17">');
        document.write('<table border="0" height="100%" width="300" cellspacing="0" cellpadding="0"><tr>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('</tr></table></td></tr></table><table border="0" width="300" cellspacing="0" cellpadding="0">');
        document.write('<tr><td width="100"><font face="Arial" size="2">0%</font></td>');
        document.write('<td width="100" align="center"><font face="Arial"
```

APPENDIX 6-continued

```
size="2">50%</font></td>');
            document.write('<td width="100" align="right"><font face="Arial"
size="2">100%</font></td></tr></table></td></tr>');
        }
        else
        {
            var CyanTonerPer = 100;
            var MagentaTonerPer = 100;
            var YellowTonerPer = 100;
            var BlackTonerPer = 100;
            BeforeTonerPerOption("Cyan");
            document.write('<font size="2"
face="Arial">('+CyanTonerPer+'%)</font>');
            BeforeRemainTonerOption( );
            DisplayReminedToner(CyanTonerPer,"#00FFFF");
            AfterRemainTonerOption( );
            BeforeTonerPerOption("Magenta");
            document.write('<font size="2"
face="Arial">('+MagentaTonerPer+'%)</font>');
            BeforeRemainTonerOption( );
            DisplayReminedToner(MagentaTonerPer,"#FF00FF");
            AfterRemainTonerOption( );
            BeforeTonerPerOption("Yellow");
            document.write('<font size="2"
face="Arial">('+YellowTonerPer+'%)</font>');
            BeforeRemainTonerOption( );
            DisplayReminedToner(YellowTonerPer,"#FFFF00");
            AfterRemainTonerOption( );
            BeforeTonerPerOption("Black");
            document.write('<font size="2"
face="Arial">('+BlackTonerPer+'%)</font>');
            BeforeRemainTonerOption( );
            DisplayReminedToner(BlackTonerPer,"#000000");
            AfterRemainTonerOption( );
        }
}
.
.
.
sDelimiter = "=;", nInlinePosition =1 , sPar1 = "RemainTonerOption", sPar2
= "else", sPar3 = "var CyanTonerPer", nENUM = eCyan
sDelimiter = "=;", nInlinePosition =1 , sPar1 = "RemainTonerOption", sPar2
= "else", sPar3 = "var MagentaTonerPer", nENUM = eMagenta
sDelimiter = "=;", nInlinePosition =1 , sPar1 = "RemainTonerOption", sPar2
= "else", sPar3 = "var YellowTonerPer", nENUM = eYellow
sDelimiter = "=;", nInlinePosition =1 , sPar1 = "RemainTonerOption", sPar2
= "else", sPar3 = "var BlackTonerPer", nENUM = eBlack
```

6.6.5.6.5.14.1 Base Class
    public CAbsScriptProcess
6.6.5.6.5.14.2 Function List
public:
    CSamsungStatusCLP550ScriptProcess( );
    virtual ~CSamsungStatusCLP550ScriptProcess( );
    virtual void start(void);
    virtual CAbsScriptProcess::EReturn transformData(std::string &
out__sValue, infoType & out__nInfoType, const std::string in__sString);
    virtual void putParameters(std::vector<std::string> in__ParameterVector,
const infoType in__InfoType);
6.6.5.6.5.14.3 Defined Type List
    None
6.6.5.6.5.14.4 Class Attributes
private:

| Type | Attribute Name | Description |
|---|---|---|
| std::vector<SInfoStructure> | m__InfoStructureVector | This attribute keeps the vector of information used to extract the status information. |
| std::vector<SInfoStructure> | m__VendorModelDelayData | This attribute is used to extract the information. As the value is obtained, the entry is deleted from the vector. start( ) function copies the entries from m__InfoStructureVector. |

APPENDIX 6-continued 6.6.5.6.5.14.5 Function Definitions

```
////////////////////////////////////////////////////////
// Function:        CSamsungStatusCLP550ScriptProcess( )
// Description:     Constructor
// Preconditions:   None.
// Postconditions:  None.
// Algorithm:       1    default
////////////////////////////////////////////////////////
////////////////////////////////////////////////////////
// Function:        ~CSamsungStatusCLP550ScriptProcess( )
// Description:     Destructor
// Preconditions:   None.
// Postconditions:  None.
// Algorithm:       1    default
////////////////////////////////////////////////////////
////////////////////////////////////////////////////////
// Function:        start(void)
// Description:     This function copies the m_InfoStructureVector
//                  to m_InfoStructureSearchVector.
// Preconditions:   None
// Postconditions:  None
// Algorithm:       1    m_InfoStructureSearchVector =
//                       m_InfoStructureVector
////////////////////////////////////////////////////////
////////////////////////////////////////////////////////
// Function:        transformData(std::string & out_sValue, infoType &
//                      out_nInfoType, const std::string in_sString)
// Description:     This function processes the input string to
//                  extract the value and its corresponding
//                  infoType.
// Preconditions:   None.
// Postconditions:  None.
// Algorithm:       1    set out_sValue to Null and out_nInfoType to
//                          eNotDefine
//                  2    if m_InfoStructureSearchVector is empty,
//                       return eFinished
//                  3    declare iterator loc_Itr of
//                       m_InfoStructureSearchVector and set to
//                            m_InfoStructureSearchVector.begin( )
//                  4    while loc_Itr <
//                       m_InfoStructureSearchVector.end( )
//                    4.1 switch on (*loc_Itr).m_State
//                          4.1.1 case eStart:
//                              4.1.1.1 if (*loc_Itr).m_sPar1 is found in
//                                   in_sString, (*loc_Itr).m_State = ePrecon1
//                              4.1.1.2 increment loc_Itr
//                              4.1.1.3 break
//                          4.1.2 case ePrecon1:
//                              4.1.2.1 if (*loc_Itr).m_sPar2 is found in
//                                   in_sString, (*loc_Itr).m_State = ePrecon2
//                              4.1.2.2 increment loc_Itr
//                              4.1.2.3 break
//                          4.1.3 case ePrecon2:
//                              4.1.3.1 if (*loc_Itr).m_sPar3 is not found
//                                       in in_sString,
//                                  4.1.3.1.1 increment loc_Itr
//                                  4.1.3.1.2 break
//                              4.1.3.2 using CExtractValueFromLine, if
//                                       operator( ) with out_sValue,
//                                       m_sDelimiter, m_nInlinePosition of the
//                                       iterator and in_sString passed
//                                       in returns false,
//                                  4.1.3.2.1 ASSERT
//                                  4.1.3.2.2 increment loc_Itr
//                                  4.1.3.2.3 break
//                              4.1.3.3 out_nInfoType = (*loc_Itr).m_nENUM;
//                              4.1.3.4 remove the entry from the vector
//                              4.1.3.5 if the vector is empty, return
//                                        eWithValueNoMoreValue
//                              4.1.3.6 else return eWithValueMoreValues
//                          4.1.3 default
//                              4.1.3.1 ASSERT
//                              4.1.3.2 increment loc_Itr
//                              4.1.3.3 break
//                  5    return eNoValue
////////////////////////////////////////////////////////
////////////////////////////////////////////////////////
// Function:        putParameters(std::vector<std::string>
//                      in_ParameterVector, const infoType in_InfoType)
```

APPENDIX 6-continued

| | | |
|---|---|---|
| // Description: | This function put the parameter vector to the | |
| // | structure and push the structure into | |
| // | m_InfoStructureVector. | |
| // Preconditions: | Input Vector is not empty. | in_InfoType is not |
| // | eNotDefine | |
| // Postconditions: | None | |
| // Algorithm: | 1 | if precondition are not met, return |
| // | 2 | declare SInfoStructure loc_InfoStructure |
| // | 3 | Assign the corresponding parameter values in |
| // | | in_ParameterVector to loc_InfoStructure |
| // | | Note: convert from string to int for |
| // | | m_nInlinePosition |
| // | 4 | push_back loc_InfoStructure to |
| // | | m_InfoStructureVector |
| ///////////////////////////////////////////////////////////// | | |

APPENDIX 7

6.6.5.6.5.15 CSamsungStatusML2550ScriptProcess Class Specification
    This process extracts the toner status from the Samsung printers.
    The data is located in the web page, /panel/setup.htm in the following format.

```
function RemainTonerOption( )
{
    if((modelVer != 0x0701)&&(modelVer != 0x0702)&&(modelVer != 0x0703)&&(modelVer != 0x0711))
    {
        document.write('<tr><td width="10" height="35"></td><td width="263" height="35"><font size="2" face="Arial">Remain Toner :(100%)</font></td>');
        document.write('<td width="381" height="35" colspan="2"><table border="1" width="300" cellspacing="0" cellpadding="0"><tr><td width="300" height="17">');
        document.write('<table border="0" height="100%" width="300" cellspacing="0" cellpadding="0"><tr>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('<td width="15" bgcolor="#FFFFFF"></td><td width="15" bgcolor="#FFFFFF"></td>');
        document.write('</tr></table></td></tr></table><table border="0" width="300" cellspacing="0" cellpadding="0">');
        document.write('<tr><td width="100"><font face="Arial" size="2">0%</font></td>');
        document.write('<td width="100" align="center"><font face="Arial" size="2">50%</font></td>');
        document.write('<td width="100" align="right"><font face="Arial" size="2">100%</font></td></tr></table></td></tr>');
    }
.
.
.
sDelimiter = ":(%", nInlinePosition =1 , sPar1 = "RemainTonerOption", sPar2
= "Remain Toner", nENUM = eBlack
```

6.6.5.6.5.15.1 Base Class
    public CAbsScriptProcess
6.6.5.6.5.15.2 Function List
public:
    CSamsungStatusML2550ScriptProcess( );
    virtual ~CSamsungStatusML2550ScriptProcess( );
    virtual void start(void);
    virtual CAbsScriptProcess::EReturn transformData(std::string & out_sValue, infoType & out_nInfoType, const std::string in_sString);

APPENDIX 7-continued

```
        virtual void putParameters(std::vector<std::string> in_ParameterVector,
const infoType in_InfoType);
6.6.5.6.5.15.3 Defined Type List
    None.
6.6.5.6.5.15.4 Class Attributes
private:
```

| Type | Attribute Name | Description |
|---|---|---|
| SInfoStructure | m_InfoStructure | This attribute keeps the information used to extract the status information. |

```
6.6.5.6.5.15.5 Function Definitions
////////////////////////////////////////////////////////////
// Function:      CSamsungStatusML2550ScriptProcess( )
// Description:   Constructor
// Preconditions: None.
// Postconditions: None.
// Algorithm:     1     default
////////////////////////////////////////////////////////////
////////////////////////////////////////////////////////////
// Function:      ~CSamsungStatusML2550ScriptProcess( )
// Description:   Destructor
// Preconditions: None.
// Postconditions: None.
// Algorithm:     1     default
////////////////////////////////////////////////////////////
////////////////////////////////////////////////////////////
// Function:          start(void)
// Description:   This function sets the state to eStart
// Preconditions: None
// Postconditions: None
// Algorithm:     1     m_InfoStructure.m_State to eStart
////////////////////////////////////////////////////////////
////////////////////////////////////////////////////////////
// Function:      transformData(std::string & out_sValue, infoType
//                  & out_nInfoType, const std::string in_sString)
// Description:   This function processes the input string to
//                extract the value and its corresponding
//                infoType. If Abnormal condition happens
//                the function returns eFinished.
// Preconditions: None.
// Postconditions: None.
// Algorithm:     1     set out_sValue to Null and out_nInfoType to
//                        eNotDefine
//                2     declare size_t loc_Pos
//                3     switch on m_InfoStructure.m_State
//                       3.1 case eStart:
//                          3.1.1 if m_InfoStructure.m_sPar1 is found in
//                                  in_sString, m_InfoStructure.m_State =
//                                  ePrecon1
//                          3.1.2 break
//                       3.2 case ePrecon1:
//                          3.2.1 loc_Pos =
//                                  in_sString.find(m_InfoStructure.m_sPar2)
//                          3.2.2 if loc_Pos EQ std::string::npos, break
//                          3.2.3 declare loc_sLine =
//                                  in_sString.substr(loc_Pos)
//                          3.2.4 using CExtractValueFromLine, if
//                                  operator( )
//                                     passing out_sValue, loc_sLine and
//                                       other information passed in return
//                                       false,
//                             3.2.4.1 ASSERT
//                             3.2.4.2 start( )
//                             3.2.4.3 return eFinished
//                          3.2.5 out_nInfoType =
//                                  m_InfoStructure.m_nENUM;
//                          3.2.6 start( )
//                          3.2.7 return eWithValueNoMoreValue
//                       3.3 default
//                          3.3.1 ASSERT
//                          3.3.2 start( )
//                          3.3.3 return eFinished
//                4     return eNoValue
////////////////////////////////////////////////////////////
////////////////////////////////////////////////////////////
```

APPENDIX 7-continued

```
// Function:        putParameters(std::vector<std::string>
//                    in__ParameterVector, const infoType
//                    in__InfoType)
// Description:     This function put the parameter vector to the
//                    structure
// Preconditions:   Input Vector is not empty.    in__InfoType is not
//                    eNotDefine
// Postconditions:  None
// Algorithm:       1   if precondition are not met, return
//                  2   Assign the corresponding parameter values in
//                      in__ParameterVector to m__InfoStructure
//                      Note: convert from string to int for
//                      m__nInlinePosition
//////////////////////////////////////////////////////////
```

The invention claimed is:

1. A method of extracting status information related to a monitored device communicatively coupled to a network using an HTTP communication protocol, comprising:

retrieving, from a first memory, vendor and model information of the monitored device;

retrieving, based on the vendor and model information, at least one implementation identifier, each implementation identifier identifying a corresponding access function configured to access the monitored device using the HTTP protocol to obtain the status information, wherein the at least one implementation identifier identifies at least one of (1) a first access function configured to obtain the device information from between tags in a web page stored on the monitored device, and (2) a second access function configured to obtain the device information from within a script in the web page;

selecting an implementation identifier of the at least one implementation identifier;

retrieving, from the first memory based on the vendor and model information and the selected implementation identifier, parameter values used to obtain the status information from the web page using the access function corresponding to the implementation identifier;

accessing the monitored device using the HTTP protocol, the parameter values, and the access function corresponding to the implementation identifier to attempt to obtain the status information;

storing, in a second memory, the status information obtained in the accessing step, in association with the vendor and model information;

storing, in a third memory, all implementation identifiers for the HTTP protocol in association with a corresponding boolean value, wherein the boolean value for each identifier is initialized to a value of false; and for each implementation identifier in the retrieved at least one implementation identifier, setting the boolean value associated with the implementation identifier to a value of true.

2. The method of claim 1, wherein the second access function is configured to obtain the device information within a JAVA script in an HTML file stored on the monitored device.

3. The method of claim 1, wherein the first access function is configured to obtain the device information from an HTML file stored on the monitored device.

4. A computer-implemented system for extracting status information related to a monitored device communicatively coupled to a network using an HTTP communication protocol, comprising:

a monitoring device including
means for retrieving, from a first memory, vendor and model information of the monitored device;
means for retrieving, based on the vendor and model information, at least one implementation identifier, each implementation identifier identifying a corresponding access function configured to access the monitored device using the HTTP protocol to obtain the status information, wherein the at least one implementation identifier identifies at least one of (1) a first access function configured to obtain the device information from between tags in a web page stored on the monitored device, and (2) a second access function configured to obtain the device information from within a script in the web page;
means for selecting an implementation identifier of the at least one implementation identifier;
means for retrieving, from the first memory based on the vendor and model information and the selected implementation identifier, parameter values used to obtain the status information from the web page using the access function corresponding to the implementation identifier;
means for accessing the monitored device using the HTTP protocol, the parameter values, and the access function corresponding to the implementation identifier to attempt to obtain the status information;
means for storing, in a second memory, the status information obtained by the means for accessing, in association with the vendor and model information;
means for storing, in a third memory, all implementation identifiers for the HTTP protocol in association with a corresponding boolean value, wherein the boolean value for each identifier is initialized to a value of false; and
for each implementation identifier in the retrieved at least one implementation identifier, means for setting the boolean value associated with the implementation identifier to a value of true.

5. The system of claim 4, wherein the second access function is configured to obtain the device information within a JAVA script in an HTML file stored on the monitored device.

6. The system of claim 4, wherein the first access function is configured to obtain the device information from an HTML file stored on the monitored device.

7. A computer-readable storage medium having embedded therein computer executable instructions, which when executed by a processor cause the processor to perform a method for extracting status information related to a monitored device communicatively coupled to a network using an HTTP communication protocol, the method comprising:

retrieving, from a first memory, vendor and model information of the monitored device;

retrieving, based on the vendor and model information, at least one implementation identifier, each implementation identifier identifying a corresponding access function configured to access the monitored device using the HTTP protocol to obtain the status information, wherein the at least one implementation identifier identifies at least one of (1) a first access function configured to obtain the device information from between tags in a web page stored on the monitored device, and (2) a second access function configured to obtain the device information from within a script in the web page;

selecting an implementation identifier of the at least one implementation identifier;

retrieving, from the first memory based on the vendor and model information and the selected implementation identifier, parameter values used to obtain the status information from the web page using the access function corresponding to the implementation identifier;

accessing the monitored device using the HTTP protocol, the parameter values, and the access function corresponding to the implementation identifier to attempt to obtain the status information;

storing, in a second memory, the status information obtained by the accessing, in association with the vendor and model information;

storing, in a third memor7, all implementation identifiers for the HTTP protocol in association with a corresponding boolean value, wherein the boolean value for each identifier is initialized to a value of false; and for each implementation identifier in the retrieved at least one implementation identifier, setting the boolean value associated with the implementation identifier to a value of true.

8. The method of claim 7, wherein the second access function is configured to obtain the device information within a JAVA script in an HTML file stored on the monitored device.

9. The method of claim 7, wherein the first access function is configured to obtain the device information from an HTML file stored on the monitored device.

10. A computer-implemented system for extracting status information related to a monitored device communicatively coupled to a network using an HTTP communication protocol, comprising:

a monitoring device including an information retrieving unit configured to retrieve, from a first memory, vendor and model information of the monitored device;

an identifier retrieving unit configured to retrieve, based on the vendor and model information, at least one implementation identifier, each implementation identifier identifying a corresponding access function configured to access the monitored device using the HTTP protocol to obtain the status information, wherein the at least one implementation identifier identifies at least one of(1) a first access function configured to obtain the device information from between tags in a web page stored on the monitored device, and (2) a second access function configured to obtain the device information from within a script in the web page;

a selecting unit configured to select an implementation identifier of the at least one implementation identifier;

a parameter retrieving unit configured to retrieve, from the first memory based on the vendor and model information and the selected implementation identifier, parameter values used to obtain the status information from the web page using the access function corresponding to the implementation identifier;

an accessing unit configured to access the monitored device using the HTTP protocol, the parameter values, and the access function corresponding to the implementation identifier to attempt to obtain the status information;

a status information storing unit configured to store, in a second memory, the status information obtained by the accessing unit, in association with the vendor and model information;

an implementation identifier storing unit configured to store, in a third memory, all implementation identifiers for the HTTP protocol in association with a corresponding boolean value, wherein the boolean value for each identifier is initialized to a value of false; and for each implementation identifier in the retrieved at least one implementation identifier, a setting unit configured to set the boolean value associated with the implementation identifier to a value of true.

\* \* \* \* \*